(12) United States Patent
Terrell et al.

(10) Patent No.: US 7,200,144 B2
(45) Date of Patent: Apr. 3, 2007

(54) ROUTER AND METHODS USING NETWORK ADDRESSES FOR VIRTUALIZATION

(75) Inventors: William C. Terrell, Thousand Oaks, CA (US); Tracy Edmonds, Camarillo, CA (US); Wayland Joeng, Agoura Hills, CA (US); Eric Russell Peterson, Camarillo, CA (US); Jean Kodama, Cerritos, CA (US); Harun Muliadi, Thousand Oaks, CA (US); Norman Chan, Diamond Bar, CA (US); Rexford Hill, San Diego, CA (US); Michael Nishimura, San Diego, CA (US); Stephen How, San Diego, CA (US)

(73) Assignee: Qlogic, Corp., Aliso Viejo, CA (US)

( * ) Notice: Subject to any disclaimer, the term of this patent is extended or adjusted under 35 U.S.C. 154(b) by 938 days.

(21) Appl. No.: 10/120,266

(22) Filed: Oct. 18, 2001

(65) Prior Publication Data

US 2003/0210686 A1 Nov. 13, 2003

(51) Int. Cl.
*H04L 12/28* (2006.01)

(52) U.S. Cl. ...................... 370/389; 370/392
(58) Field of Classification Search ............... None
See application file for complete search history.

(56) References Cited

U.S. PATENT DOCUMENTS

| | | | |
|---|---|---|---|
| 5,226,039 A | 7/1993 | Frank et al. | |
| 5,239,653 A | 8/1993 | Cubero-Castan et al. | |
| 5,341,483 A | 8/1994 | Frank et al. | |
| 5,388,099 A | 2/1995 | Poole | |
| 5,432,907 A | 7/1995 | Picazo, Jr. et al. | |
| 5,485,455 A | 1/1996 | Dobbins et al. | |
| 5,511,166 A | 4/1996 | Travaglio et al. | |
| 5,550,816 A | 8/1996 | Hardwick et al. | |
| 5,560,038 A | 9/1996 | Haddock | |
| 5,590,285 A * | 12/1996 | Krause et al. | 709/218 |
| 5,596,569 A | 1/1997 | Madonna et al. | |
| 5,615,360 A | 3/1997 | Bezek et al. | |
| 5,655,140 A | 8/1997 | Haddock | |
| 5,790,770 A | 8/1998 | McClure et al. | |
| 5,802,278 A | 9/1998 | Isfeld et al. | |

(Continued)

FOREIGN PATENT DOCUMENTS

WO WO 03/027886 4/2003

*Primary Examiner*—Doris H. To
*Assistant Examiner*—Thien D. Tran

(57) ABSTRACT

A router for use in a network includes a scalable architecture and performs methods for implementing quality of service on a logical unit behind a network port; and for implementing storage virtualization. The architecture includes a managing processor, a supervising processor; and a plurality of routing processors coupled to a fabric. The managing processor has an in-band link to a routing processor. A routing processor receives a frame from the network, determines by parsing the frame, the protocol and logical unit number, and routes the frame to a queue according to a traffic class associated with the logical unit number in routing information prepared for the processors. An arbitration scheme empties the queue in accordance with a deficit round robin technique. If a routing processor detects the frame's destination is a virtual entity, and so is part of a virtual transaction, the router conducts a nonvirtual transaction in concert with the virtual transaction. The nonvirtual transaction accomplishes the intent of the virtual transaction but operates on an actual network port, for example, a storage device.

6 Claims, 24 Drawing Sheets

U.S. PATENT DOCUMENTS

| | | |
|---|---|---|
| 5,884,040 A | 3/1999 | Chung |
| 5,915,104 A | 6/1999 | Miller |
| 5,940,390 A | 8/1999 | Berl et al. |
| 5,940,597 A | 8/1999 | Chung |
| 5,951,649 A | 9/1999 | Dobbins et al. |
| 5,982,749 A | 11/1999 | Daniel et al. |
| 5,983,278 A | 11/1999 | Chong et al. |
| 5,991,824 A | 11/1999 | Strand et al. |
| 6,029,212 A | 2/2000 | Kessler et al. |
| 6,044,402 A | 3/2000 | Jacobson et al. |
| 6,065,087 A | 5/2000 | Keaveny et al. |
| 6,067,301 A | 5/2000 | Aatresh |
| 6,094,686 A | 7/2000 | Sharms |
| 6,101,193 A | 8/2000 | Ohba |
| 6,104,700 A | 8/2000 | Haddock et al. |
| 6,115,751 A | 9/2000 | Tam et al. |
| 6,118,776 A | 9/2000 | Berman |
| 6,157,951 A | 12/2000 | Vasa |
| 6,157,955 A | 12/2000 | Narad et al. |
| 6,185,221 B1 | 2/2001 | Aybay |
| 6,189,078 B1 | 2/2001 | Bauman et al. |
| 6,260,120 B1 | 7/2001 | Blumenau et al. |
| 6,400,730 B1 | 6/2002 | Latif et al. |
| 6,553,446 B1 | 4/2003 | Miller |
| 6,683,885 B1 | 1/2004 | Sugai et al. |
| 6,717,943 B1 * | 4/2004 | Schwering ................. 370/389 |
| 6,874,033 B1 * | 3/2005 | Sugai et al. ................ 709/238 |
| 6,907,469 B1 | 6/2005 | Gallo et al. |
| 6,980,549 B1 | 12/2005 | Shabtay et al. |
| 2002/0027917 A1 | 3/2002 | Sugai et al. |
| 2003/0204618 A1 | 10/2003 | Foster et al. |
| 2005/0169281 A1 * | 8/2005 | Ko et al. .................... 370/400 |

* cited by examiner

US 7,200,144 B2

ROUTER AND METHODS USING NETWORK ADDRESSES FOR VIRTUALIZATION

FIELD OF THE INVENTION

Embodiments of the present invention relate to improved networks having routers that perform routing functions and to methods for routing network traffic.

BACKGROUND OF THE INVENTION

In a conventional network, data is transferred between computers and peripherals to accomplish the data processing demands of the computers and peripherals. Demands for data to be transferred via the network may arise in any particular computer or peripheral in a manner unsynchronized with demands that arise on other computers and peripherals of the network. Data transfer to accomplish delivery is generally between respective ports of the computers and peripherals and may pass through switches having ports as well. Such switches have numerous ports and generally retransmit data (also called routing network traffic) from one port to another according to address information associated with the data to be transferred. A pair of ports communicate via a link between the ports.

Demands generally vary widely in the amount of data to be delivered over the network and the manner in which the delivery is to be made. For example, some demands may be made for a relatively large amount of data without regard to the order in which the data is delivered via the network. Other demands may require that the data be delivered in a particular order. Some demands may have no use for data that is presented outside of an expected time for delivery. Other demands may be met at any time, though system efficiency may suffer if delivery is made outside of an expected time for delivery.

With a large number of network links, use of the network may be regulated to some extent by establishing a priority for each link. In particular, when attempts to meet demands result in delivery of data in bursts between pairs of computers and/or peripherals, network performance may exhibit several undesirable results. Network capacity (sometimes colloquially referred to as bandwidth) for servicing lower priority links may be unavailable. Delivery of data may be noticeably delayed. More out of order deliveries may be made. And, service between ports on particular links may be denied intermittently, causing queues to fill and network capacity to be used for overhead messages regarding the control of network traffic as opposed to actually routing the traffic.

Traditional approaches to improving a network's ability to deliver data which would otherwise be delivered in bursts and to decreasing the likelihood of the undesirable results described above have focused on increasing network data transfer speed, increasing the depth of queues for data awaiting processing before or after transfer via the network, and increasing the instruction processing speed for processors (e.g., per-port processors) that accomplish delivery over the network. In a conventional architecture, each port may be implemented with a processor and memory dedicated to servicing all forms of traffic for that port.

In another known approach to solving some of the problems discussed above, a traffic stream having a traffic profile is affected by provisioning a facility for traffic conditioning as described in Request For Comment "An Architecture for Differentiated Services," RFC2475 by S. Blake of Torrent Networking Technologies. A traffic profile is a set of desired temporal properties for a traffic stream (i.e., packet rate and burst size). A traffic stream is an administratively significant set of microflows that traverse a path segment as selected by a particular classifier. Provisioning includes mapping traffic streams to per hop behaviors, and specifying methods of traffic conditioning. Per hop behaviors are effected by shaping. Traffic conditioning is defined as classifying, metering, marking, shaping, and dropping packets. A microflow classifier selects packets (e.g., for marking) based on an arbitrary number of header fields including source address, destination address, protocol (e.g., IP), fields (e.g., DS field in IP header), source port, and destination port. Marking is defined (for IP) as setting the value of the DS field. Metering is defined as measuring temporal properties of a traffic stream. Shaping is delaying packets to conform a traffic stream to a desired traffic profile. Shaping includes enqueueing a marked packet and holding the packet in queue until transmitting the packet would not exceed a desired traffic profile. The basic architecture assumes that traffic conditioning functions are accomplished at each ingress and egress node (i.e., at each port of an edge node) of the network. According to a first conventional hardware architecture, all traffic conditioning functions would be accomplished by a central processing unit (CPU) serving a group of ports at an ingress and egress node. Such a CPU would not be capable of significant bandwidth. According to a second conventional hardware architecture, each port of an edge node would be implemented with a processor and memory dedicated to performing traffic conditioning functions by servicing all forms of traffic for that port.

A large portion of network traffic is associated with reading or writing data storage media. The data delivery problems described above are evident in networks that provide shared access to data storage devices. Managing data for improved access according to traditional approaches has included introducing servers between data storage devices and the network. Such server technology impedes network traffic flow, and may facilitate unexpected denial of access or damage to data due to failure mechanisms with a single point of failure.

Without the present invention, data delivery cannot be further improved without unreasonably increasing the cost per port of the network and the computers and peripherals that use the network. Increased costs stem from increased memory for queues and sophisticated processing instructions to be executed by the port processors, from increased processing speed, and from circuits that operate at higher frequencies to provide increased network data transfer speed. The comparatively high cost of circuits that operate at increased frequency stems from difficulties in designing such circuits and difficulties in fabrication.

SUMMARY OF THE INVENTION

A router, in one embodiment of the present invention, routes frames in a network. The router includes means for participating as a virtual target in a virtual transaction initiated by an initiator of the network and means for initiating a nonvirtual transaction with a target of the network to accomplish an intent of the virtual transaction.

By analyzing at least a portion of a received frame, and preparing an outbound frame back to the requester, a router operating according to various aspects of the present invention provides a logical interface between the requester and resources. An additional outbound frame to a resource may be prepared by the router to fulfill the request. A logical interface facilitates management of the resources for improved efficiency and reliability of data transfers; and, supports demanding levels of quality of service as to order and timeliness of deliveries.

In another embodiment a router includes a processor that stores a virtual resource identifier and routes a frame that includes indicia of a nonvirtual resource identifier. The nonvirtual resource identifier may be determined by the processor with reference to an association between the nonvirtual resource identifier and the virtual resource identifier. The association may be made by an administrating process and communicated to the processor as routing information.

A router, in another embodiment of the present invention, includes a processor that stores a resource identifier determined from a first frame and routes a second frame in accordance with the resource identifier. For example, the second frame may be received without indication of the resource identifier and received after the first frame is received.

In another embodiment of the present invention, a router includes a processor that routes a frame in accordance with a policy value to implement a quality of service. The policy value is determined at least in part by parsing the frame to determine a resource identifier and recalling an association of the policy value and indicia of the resource identifier. The association may be made by an administrating process and communicated to the processor as routing information.

By analyzing at least a portion of a received frame, and identifying more than one field value, a router operating according to various aspects of the present invention selectively controls the quality of service as applied to particular data transfers and frames having particular sets of field values. Quality of service may effectively be controlled for a predetermined protocol and/or predetermined group of resources. Quality of service may include specifications regarding order and timeliness of deliveries, or in other words, bandwidth allocation, maximum delays, and reduction in network congestion. Statistics may be collected and analyzed for a subflow.

A router, in another embodiment of the present invention, includes a managing processor, a supervising processor, and a routing processor. The managing processor performs a proxy process that responds to a control frame directed to a virtual entity. The supervising processor performs a control process that responds to a control frame directed to the router. The routing processor routes data frames directed respectively to virtual and to nonvirtual entities via the network.

A router, in another embodiment of the present invention, includes two processors. The first processor performs a proxy process for a virtual member of the network. The proxy process responds to a control frame having a first network port identifier. The virtual member corresponds to at least one nonvirtual member or resource of the network. The nonvirtual member responds to a data frame having a second (i.e., different) network port identifier. The second processor performs a routing process that routes frames having the first network port identifier to the proxy process, routes frames having the second network port identifier to the nonvirtual member, and on receiving a data frame having the first network port identifier, routes a substitute data frame having the second network port identifier. For example, data frames originally addressed to the virtual member are readdressed and routed to a corresponding nonvirtual (e.g., actual) member.

The modular architecture provided according to various aspects of the present invention permits scaling of the router design and scaling of the network, lowering the cost for competitive router products and improving network maintenance.

A router, in another embodiment of the present invention, routes a frame received from a network. The router includes a routing processor. The routing processor includes: a frame processor, a parser, a plurality of queues, a submitter, and a memory circuit. The parser prepares a flow lookup in response to the frame received from the network. The memory circuit performs a flow lookup and provides a result as directed by the submitter and a first entry in a first queue, the first entry having been enqueued by the parser. The memory circuit also performs a subflow lookup and provides a result as directed by the submitter and a second entry, the second entry having been enqueued in a second queue by the frame processor in accordance with the result of the flow lookup. The frame processor routes the frame in accordance with the result of the subflow lookup.

A router, in another embodiment of the present invention, includes: a plurality of physical ports, a managing processor, and at least one routing circuit coupled to the manager by a first bus. Each routing circuit includes: a supervising processor, a memory, a second bus, and a plurality of port logic circuits. The memory includes indicia of a routing table. The memory is coupled to the supervising processor by the second bus. The plurality of port logic circuits is coupled to the supervising processor by a third bus. Each port logic circuit provides a multiplicity of the physical ports. Each port logic circuit is coupled to other port logic circuits for data transfer between physical ports. At least one physical port of the plurality is coupled to the managing processor.

By providing in-band access to the managing processor, virtualization functions are less complex and more efficient. Wire speed virtualization is facilitated.

A router, in another embodiment of the present invention, includes: a plurality of physical ports; a managing processor having a first memory; and at least one routing circuit coupled to the managing processor by a first bus. Each routing circuit includes a supervising processor and a plurality of port logic circuits. The supervising processor has a second memory. Each routing circuit further includes a third memory. The third memory includes indicia of a routing table. The third memory is coupled to the supervising processor by a second bus. The plurality of port logic circuits are coupled to the supervising processor by a third bus. Each port logic circuit provides a multiplicity of the physical ports. Each port logic circuit is coupled to other port logic circuits for data transfer between physical ports. Each port logic circuit has a frame processor that includes a respective fourth memory. The managing processor updates the second memory via the first bus. The supervising processor updates the third memory and the fourth memory via the second bus.

By loading and updating routing information tailored to particular frame processors and tailored to particular routing processors, the computational burden of performing virtualization functions may be distributed among routers of a network.

A method, in another embodiment of the present invention, is performed by a router for routing frames in a network. The router includes a plurality of network ports, a fabric, and a plurality of routing processors coupled between the fabric and the network ports. Each routing processor includes an ingress buffer for receiving frames from a network port and for transmitting frames to the fabric; an egress buffer for receiving frames from the fabric and for transmitting frames to the network port; and a frame processor. On receiving from a requester a data frame directed to a virtual participant, the frame processor modifies the data frame in the ingress buffer for routing to a nonvirtual participant. On receiving from the fabric a data frame not directed to a nonvirtual requester, the frame processor modifies the data frame in the egress buffer for routing to a nonvirtual requester. Further, the frame processor may, on receiving from the fabric a data frame not directed to a nonvirtual requester for which the frame processor does not have sufficient modification information, route the data frame via the fabric to another routing processor of the plurality.

A router, in another embodiment of the present invention, includes a first routing processor and a second routing processor and a fabric. Each routing processor includes: an ingress buffer coupled to an input port, an egress buffer coupled to an output port, a parser, and a memory that stores routing information. The ingress buffer is coupled between the input port and the fabric to transfer frames from the ingress buffer to the fabric. The egress buffer is coupled between the fabric and the output port to transfer frames from the fabric to the output port. The first routing processor parses a frame received from its input port to determine a virtual destination identifier, determines a nonvirtual transaction identifier in response to the virtual destination identifier, prepares a second frame having the nonvirtual transaction identifier, and transmits the second frame to the fabric. The second routing processor receives the transmitted second frame from the fabric and transmits the second frame to its output port. The second processor, on receiving a third frame on its input port parses the third frame to determine a nonvirtual transaction identifier, marks the third frame for modification, and transmits the third frame to the fabric. The first processor receives the transmitted third frame from the fabric, parses the third frame to access the routing information from its memory, modifies the third frame in accordance with the accessed routing information, and transmits the modified frame from its output port.

By operating on frames in the ingress buffer and egress buffer, a lower complexity router design results. For example, less memory is needed for maintaining virtual context tables.

A router, in another embodiment of the present invention, includes a plurality of ports and a routing processor. The routing processor includes: at least a portion of a fabric, an ingress buffer, an egress buffer. The ingress buffer is coupled between the fabric and a first port of the plurality to transfer frames from the fabric to the first port. The egress buffer includes a plurality of queues, an arbitrating circuit coupled between the egress buffer and the first port, and a counter associated with each queue. Each counter has a respective current count. The arbitrating circuit (a) adds received grants to a grant pool for the plurality of queues; (b) transfers a frame from a selected queue to the fabric when sufficient grants exist in the grant pool; (c) decrements the grant pool in response to the transfer; (d) adds transmitted frame size to the counter associated with the selected queue; and tests whether the counter associated with the selected queue is greater than a threshold. If so, the arbitrating circuit: (a) sets an overrun amount to the current count of the counter associated with the selected queue; (b) resets the counter associated with the selected queue; (c) subtracts the overrun amount from a current count of each other counter; (d) clears all asserted stalled flags; and (e) stalls the selected queue.

A router, in another embodiment of the present invention, includes a plurality of routing processors each having at least a portion of a distributing circuit. Each distributing circuit portion has a crossbar switch that completes a plurality of point-to-point connections between routing processors. The crossbar switch operates in response to at least one of: an input that indicates a number of routing processors that have been installed, and an input that indicates a position of the routing processor among the number of routing processors. A second crossbar switch may provide a termination for a point-to-point connection according to at least one of: an input that indicates a number of routing processors that have been installed, and an input that indicates a position of the routing processor among the number of routing processors.

Combinations of the various aspects of the present invention provide solutions to the problems described in the background section and mitigate other problems. For example, stall and continue capabilities on a subflow basis accommodate bursty network traffic from various applications sharing a network link. Further, accommodating quality of service differences (e.g., in the time or ordering of data) on a subflow basis better accommodates performance variations among processes and storage functions in any member or within the network (e.g., an interswitch link). A router operating according to various aspects of the present invention efficiently allocates bandwidth without completely stalling a low priority flow or unreasonably fragmenting a high priority flow. Routers that provide a logical resource interface provide more efficient and more reliable networks for application service providers and storage service providers, thereby lowering the cost of operating and lowering the cost of these services to the consumer.

According to various aspects of the present invention, sophisticated network functions are accomplished without a general purpose processor per port. Such functions include, inter alia, mirroring, third party copy, arbitration based on subflows, subflow stalls, statistics gathering, provision of a logical resource interface, and maintaining caches in the router for read and write operations.

By maintaining one or more pointers to the original copy of a snapshot and possibly to revised portions of the snapshot, the time to initially support use of a snapshot may be reduced and the interruption due to taking time to prepare a full copy of the snapshot may be avoided.

By maintaining a cache in the router, more efficient data transfer to a member of the network results. Egress from the cache is provided to meet the needs of the resource as opposed to the resource being forced to accommodate operation of the network or operation of another network member.

By maintaining a cache in the router, a multicast write is accomplished with fewer data transfers. More efficient network operation results.

In a router architecture according to various aspects of the present invention, memory is provided where it can be effectively used and the cost of router circuits can be decreased by avoiding large amounts of memory that are infrequently accessed. Operations limit the need to synchronize redundant copies of information in separate parallel processors within the router. Such an architecture supports frame disposition at the maximum rate on all ports and full mesh connectivity at wire speed. Routers based on scaling and reusable design (e.g., a reconfigurable full mesh circuit) help control the overall router cost and reduce dependency on higher cost processors and memory. Furthermore, routers with different quantities of ports may be economically assembled with a greater reliance on common designs and subassemblies, lowering the cost of manufacturing.

According to various aspects of the present invention, processors that are in the data path execute frame preparation functions with reference to commands and information prepared by processors that are not in the data path. Such functions include, for example, access control from a centralized administration processor; providing security from rogue processes (e.g., identifier translation tables (e.g., used for resource mapping or frame routing) are not directly accessible from the port interface); or gathering statistics on a subflow so that control decisions may be based on use of the network by a particular type of process (e.g., Virtual Interface (VI) communication having priority over SCSI communication from the same port of the network) or a particular type of storage device (e.g., streaming audio access having priority over data processing transactional file access). A managing processor in a router may filter statistics and more efficiently report to an administrating processor for management of virtual resources.

An administrating processor updates the configuration (e.g., routing tables) of several routers uniformly. An administrating process may assign network port identifiers to be used for virtual members, virtual resources, and proxy processes. Proxy processes may receive control frames for a virtual member or virtual resource.

As router products are developed with varying need for processing, the ratio of the various processors to the number of ports may be economically scaled while continuing to benefit from the investment in circuit and firmware design. The following are but a few examples. The number of buses made active in the mesh may scale with the quantity and bandwidth of the ports. Port protocol support may be downloaded to the processor(s) responsible for particular ports. Supervisory processing may scale with the quantity of ports in part due to the bus interface between a plurality of port processing slices and the supervisory processor(s). Managing processor(s) scale with the number of ports in part due to use of one or more in-band links to the supervising processor(s). Processing responsibility scales with the amount of available memory due in part to the shared nature of memory between port logic circuits. RAID device control may be implemented at the device cluster level from processor(s) in one or more routers or from processor(s) that is(are) part of a member. Multiple protocol capability scales with different demands for different protocols. Multiple zone capability for load balancing scales by performance and extent of physical, logical, and virtual resources.

A router according to various aspects of the present invention detects in a virtual data frame a page boundary crossing, initiates nonvirtual data frames to accomplish the operation intended, and routes the nonvirtual data frames to corresponding nonvirtual storage. A page boundary crossing occurs, for example, when reference is made in a data frame to a portion of a virtual storage device, and the reference when mapped to nonvirtual storage would include more than one page of one or more nonvirtual storage devices.

By detecting page boundary crossings and initiating data frames, a requester may operate on a virtual resource without knowledge of the structure and organization of the corresponding nonvirtual resource, simplifying such operations from the point of view of the requester.

BRIEF DESCRIPTION OF THE DRAWING

Embodiments of the present invention will now be further described with reference to the drawing, wherein like designations denote like elements, and.

DETAILED DESCRIPTION OF PREFERRED EMBODIMENTS

Figure 1:
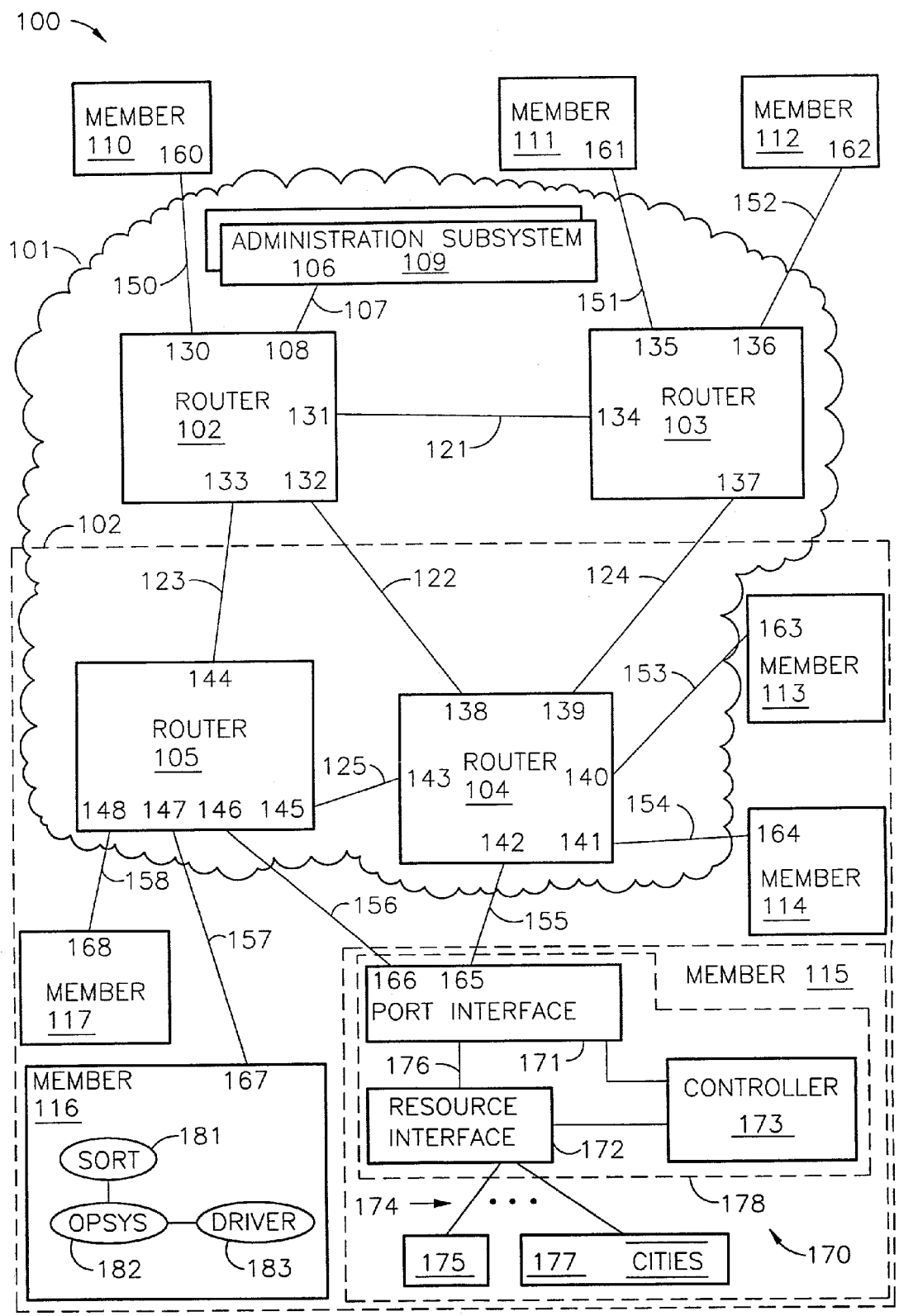
FIG. 1 is a functional block diagram of a system according to various aspects of the present invention.
Figure 2:
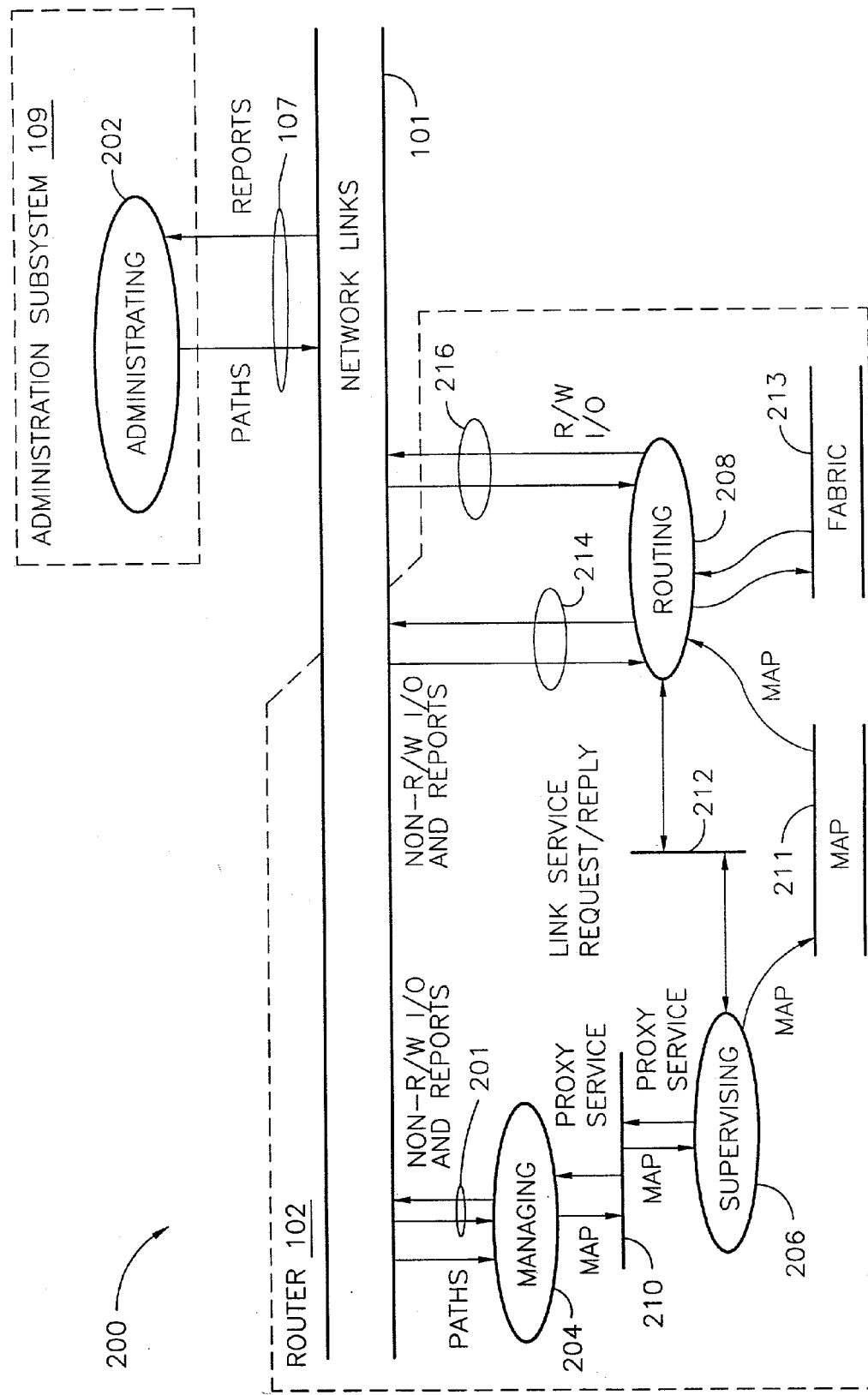
FIG. 2 is a data flow diagram of processes in the system of FIG. 1.
Figure 3:
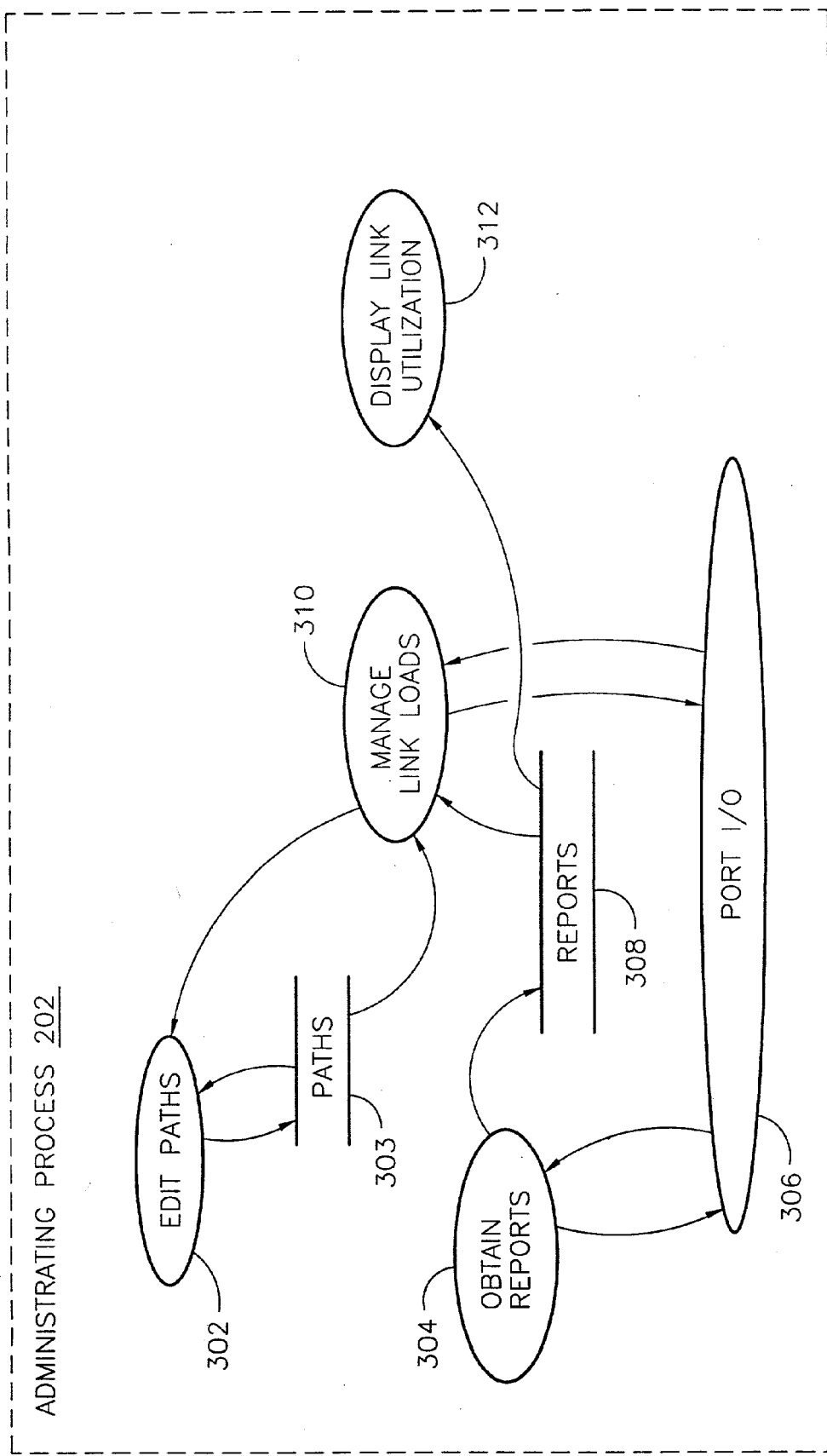
FIG. 3 is a data flow diagram of the administrating process of FIG. 2.
Figure 4:
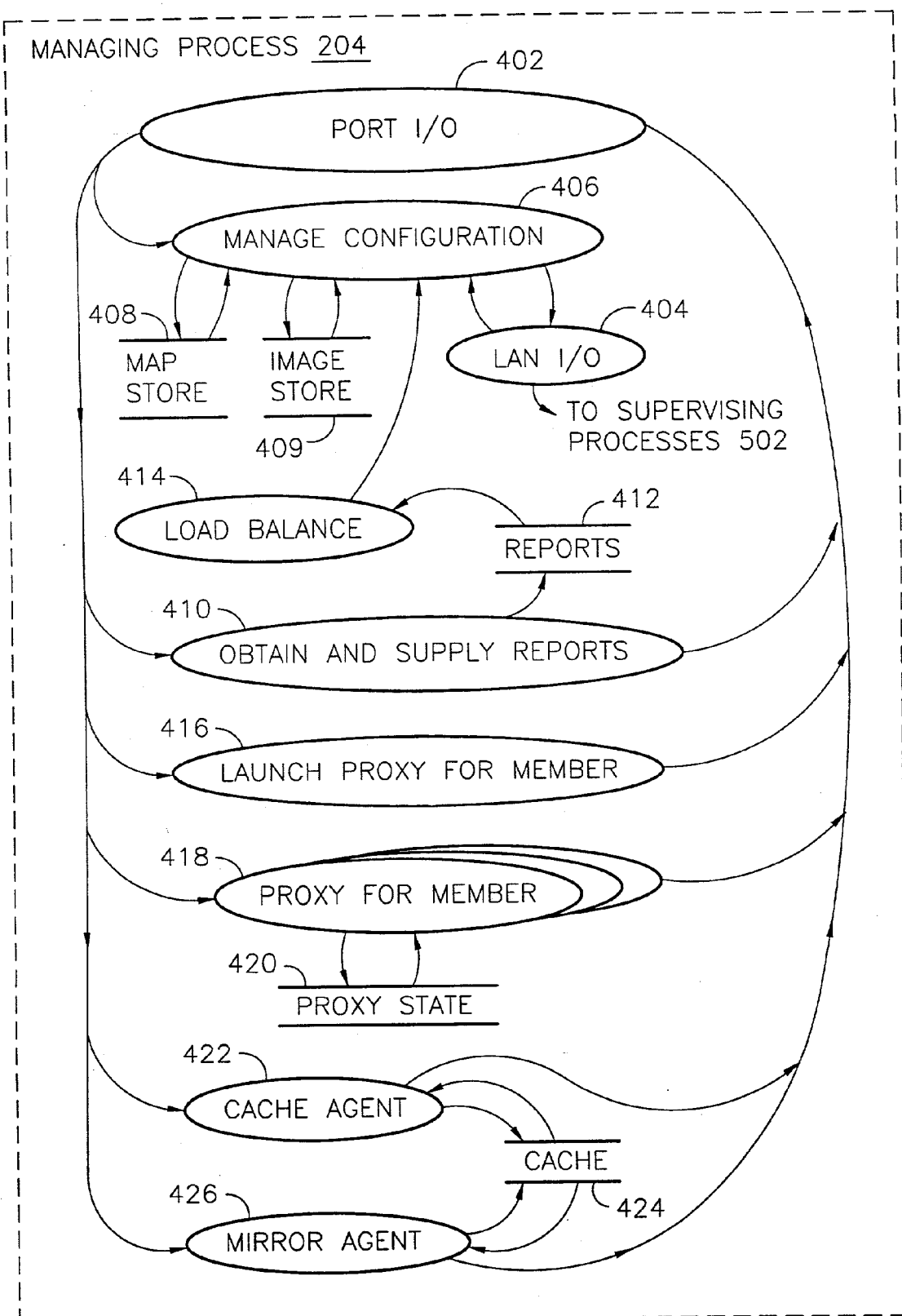
FIG. 4 is a data flow diagram of the managing process of FIG. 2.
Figure 5:
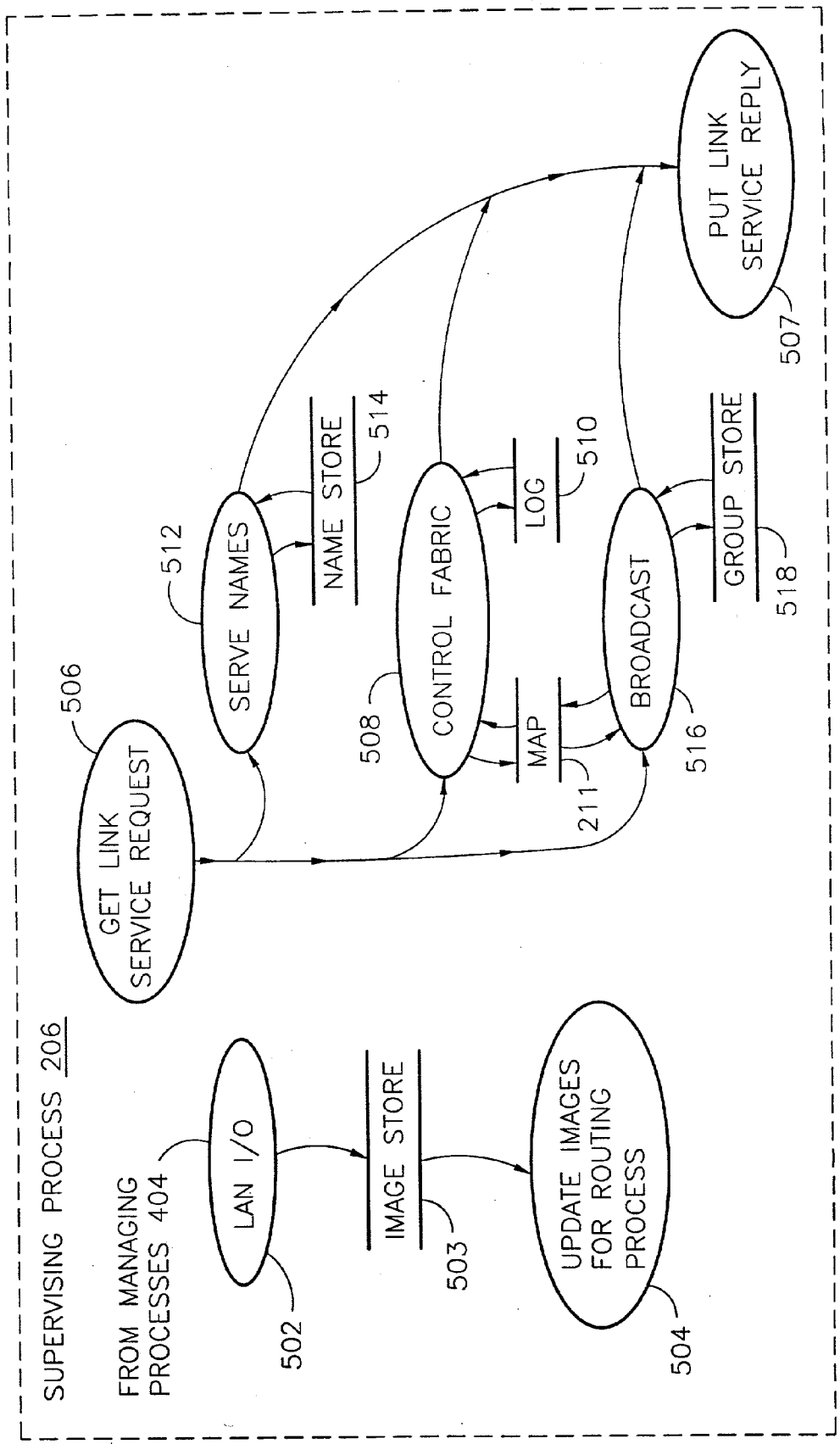
FIG. 5 is a data flow diagram of the supervising process of FIG. 2.
Figure 6:
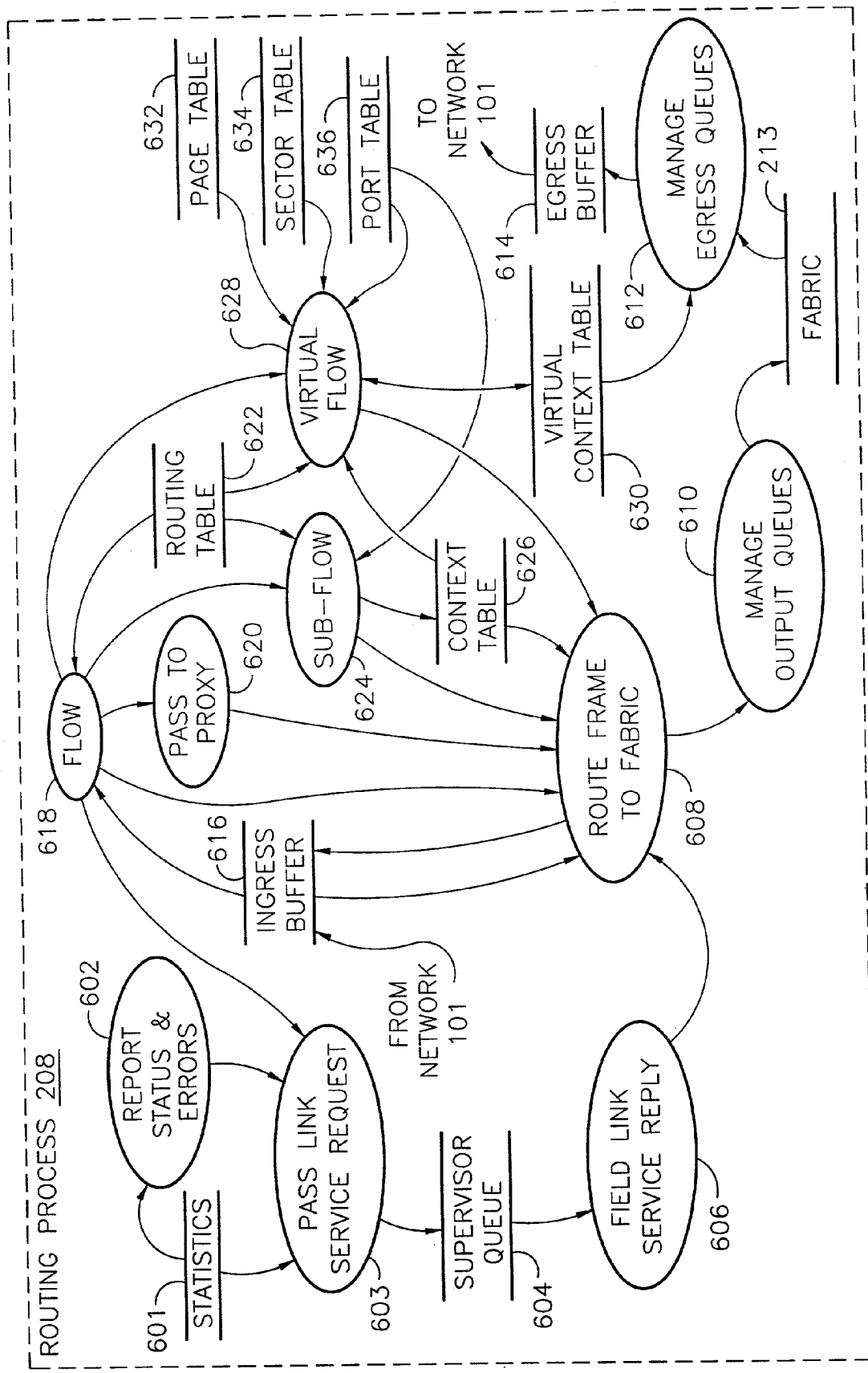
FIG. 6 is a data flow diagram of the routing process of FIG. 2.
Figure 7:
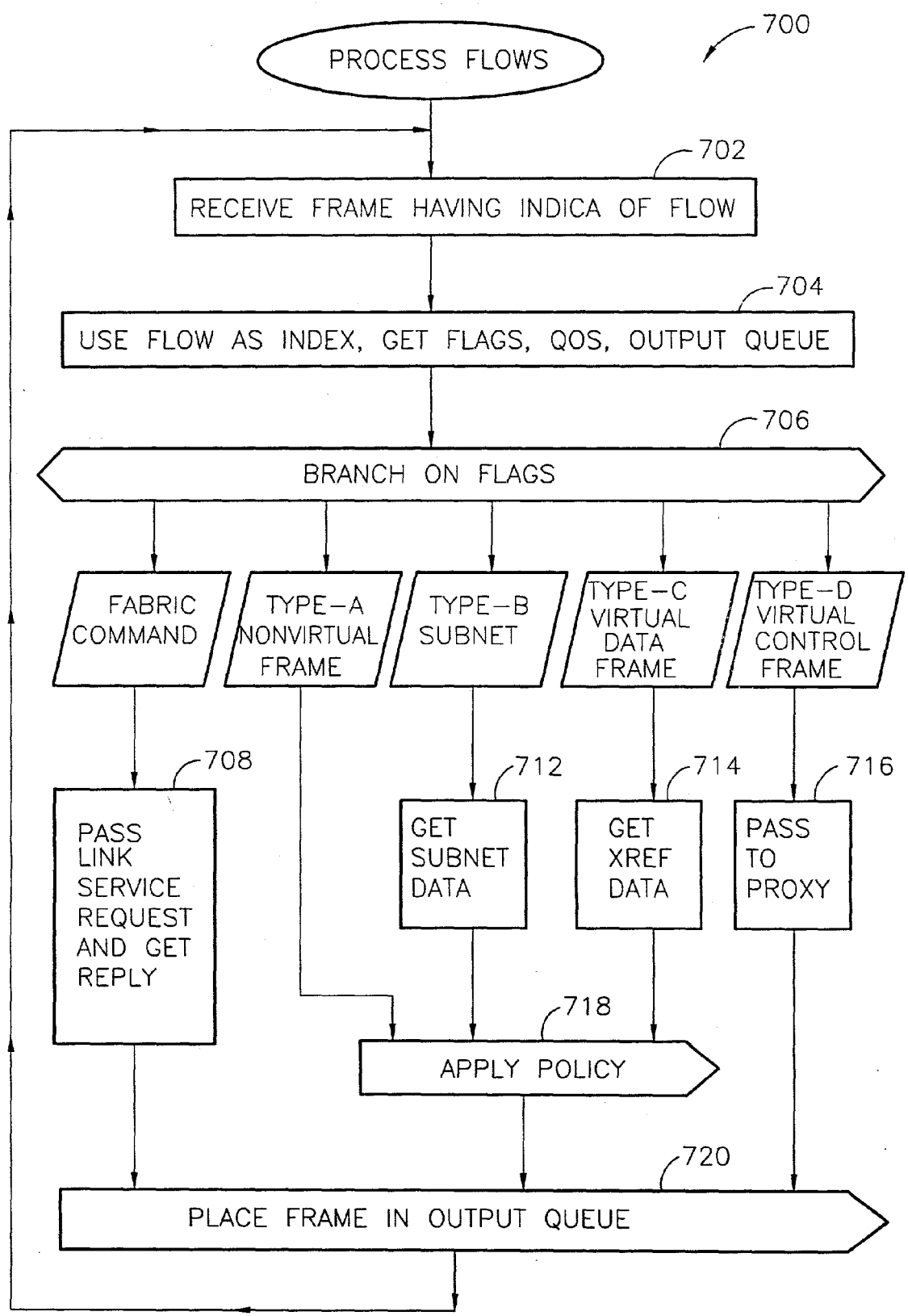
FIGS. 7, 8, 9, and 10 form a flow chart of a method for routing according to various aspects of the present invention.
Figure 8:
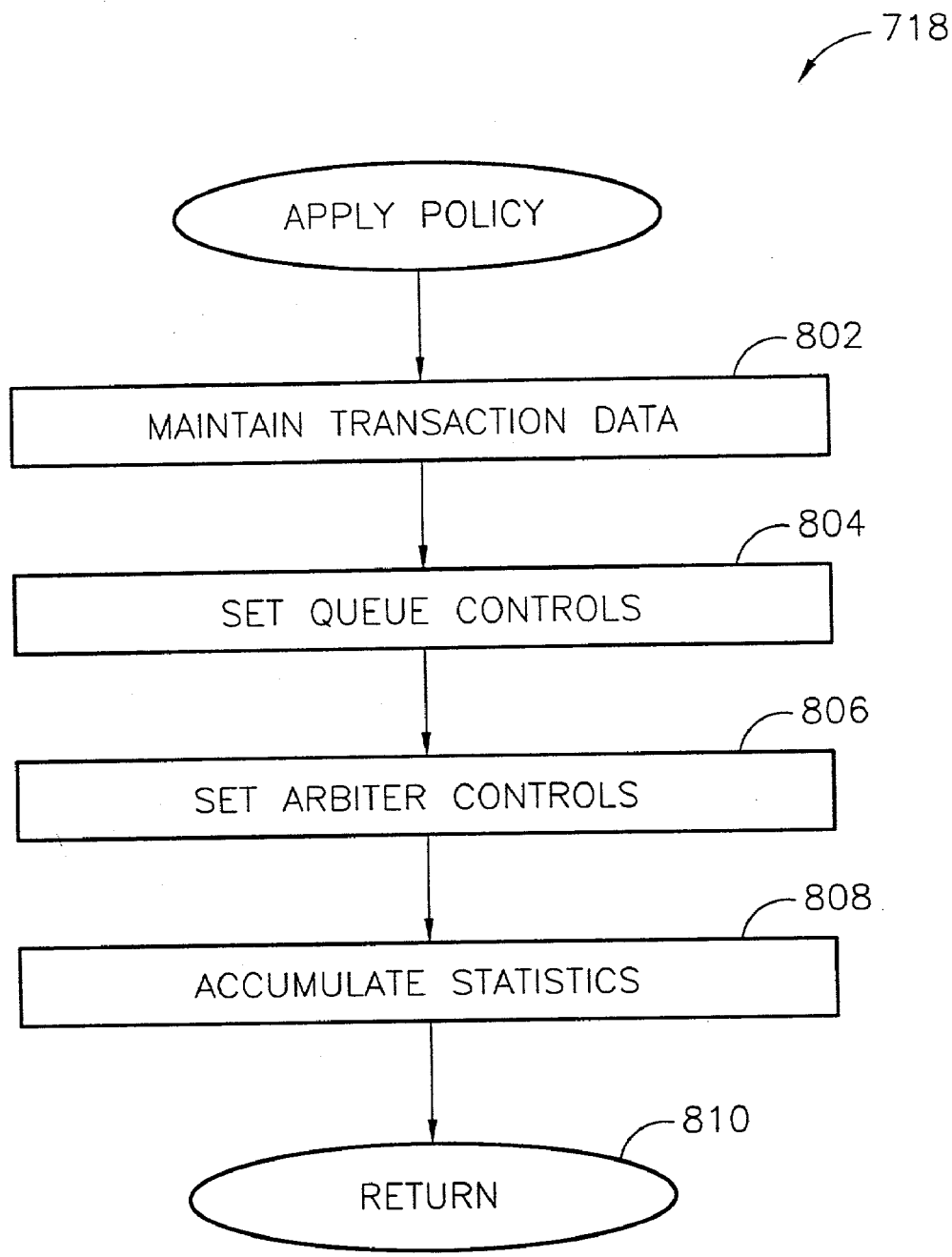
Figure 9:
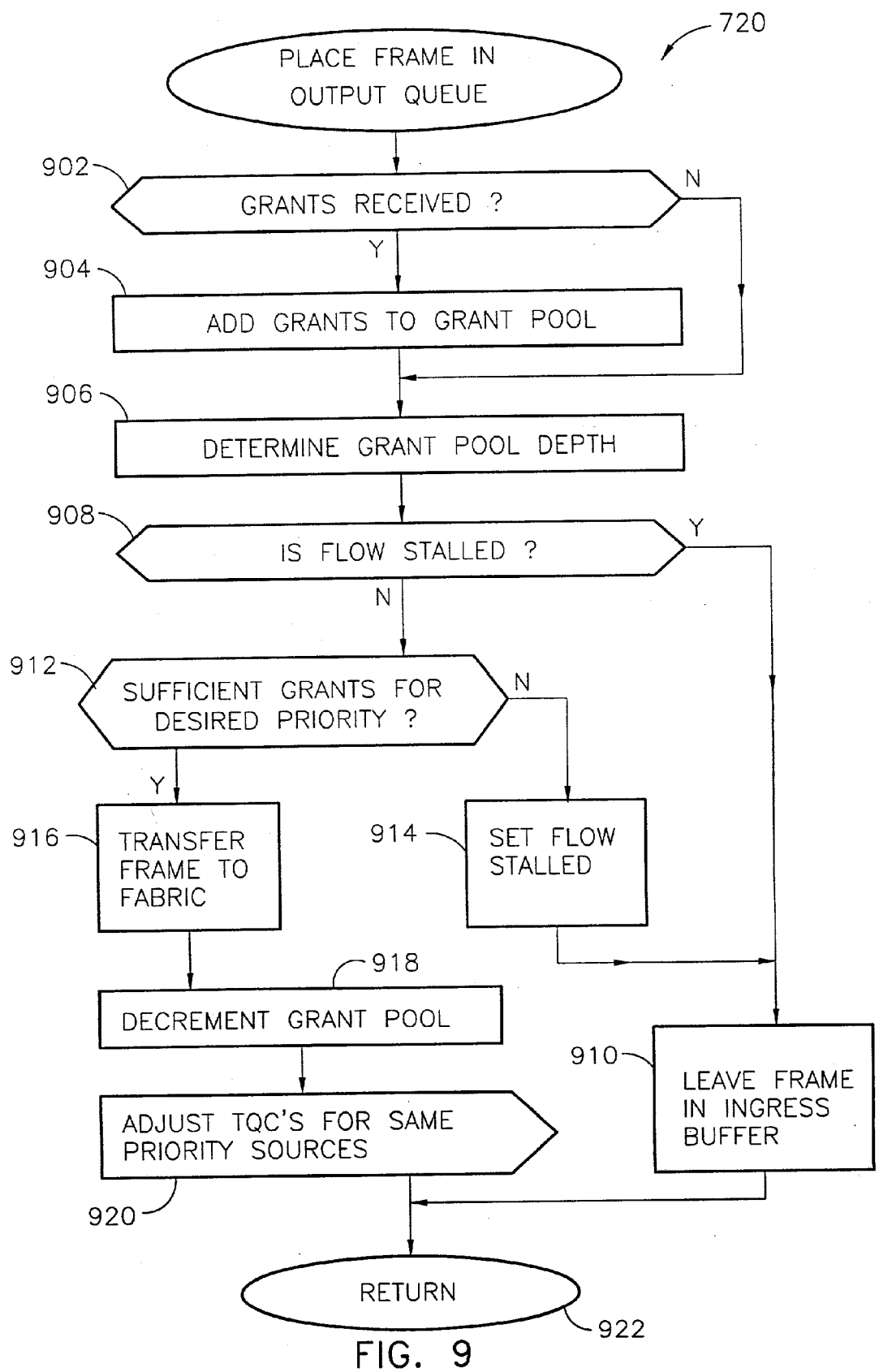
Figure 10:
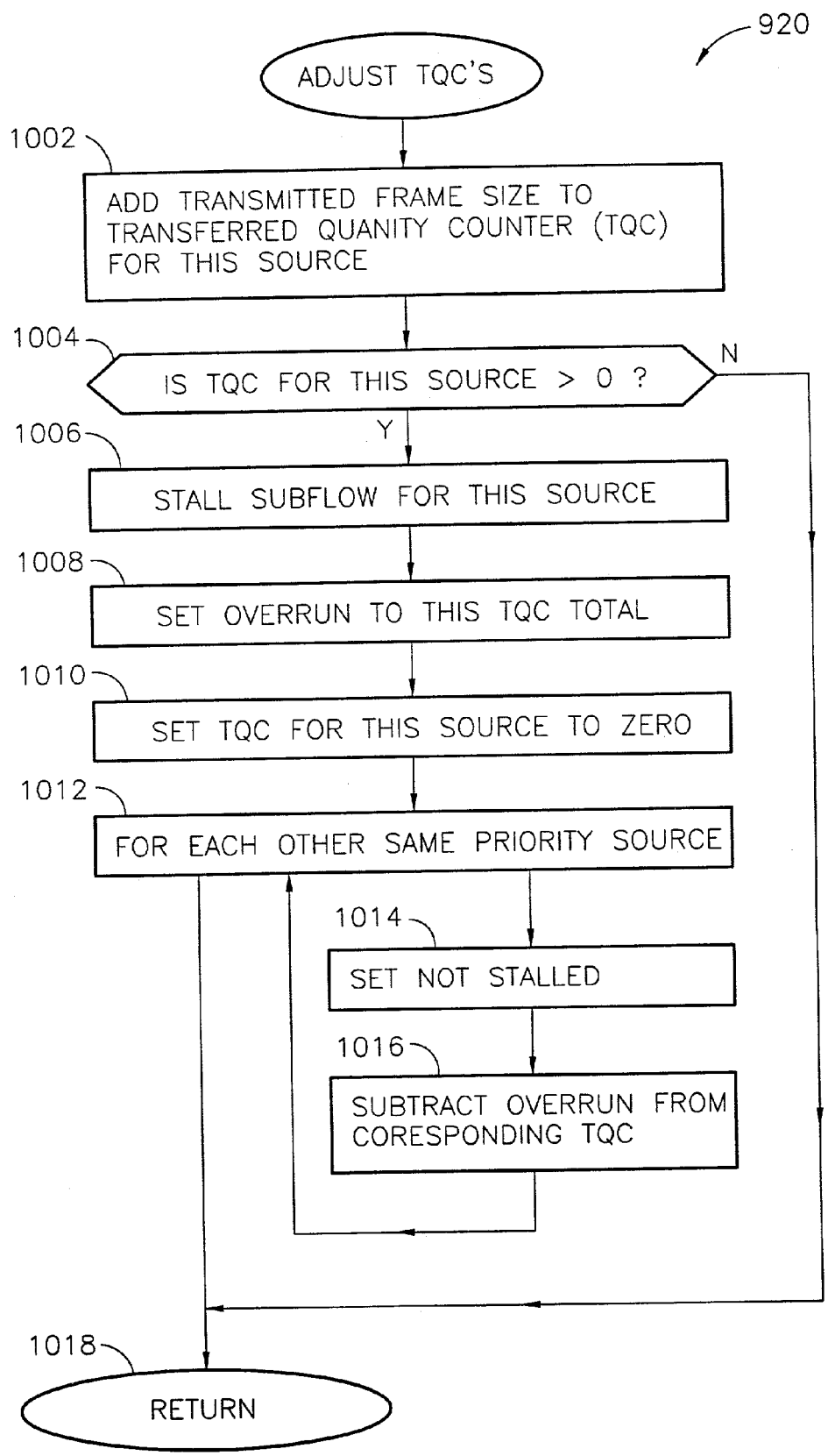
Figure 11:
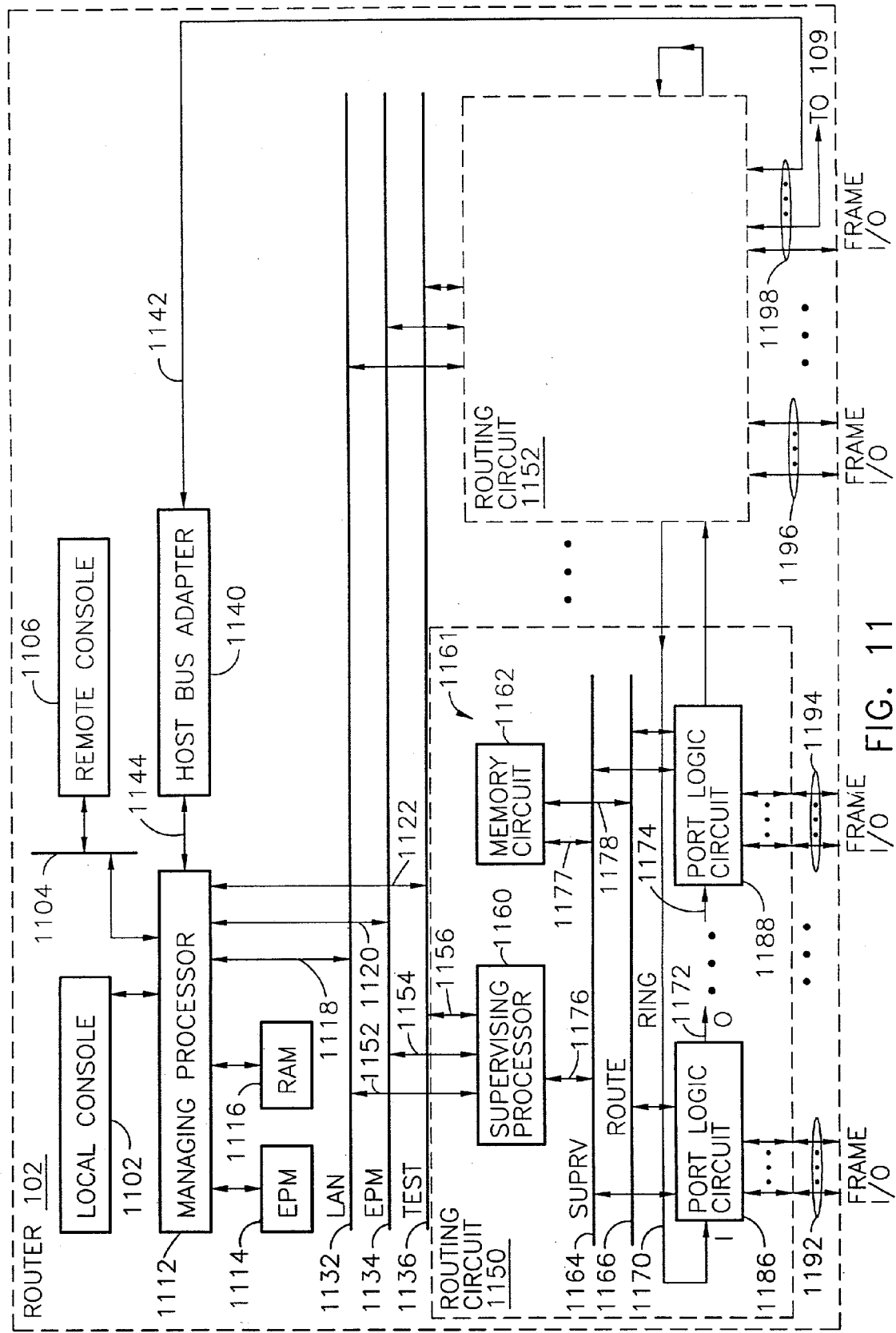
FIG. 11 is a functional block diagram of a router of the system of FIG. 1.
Figure 12:
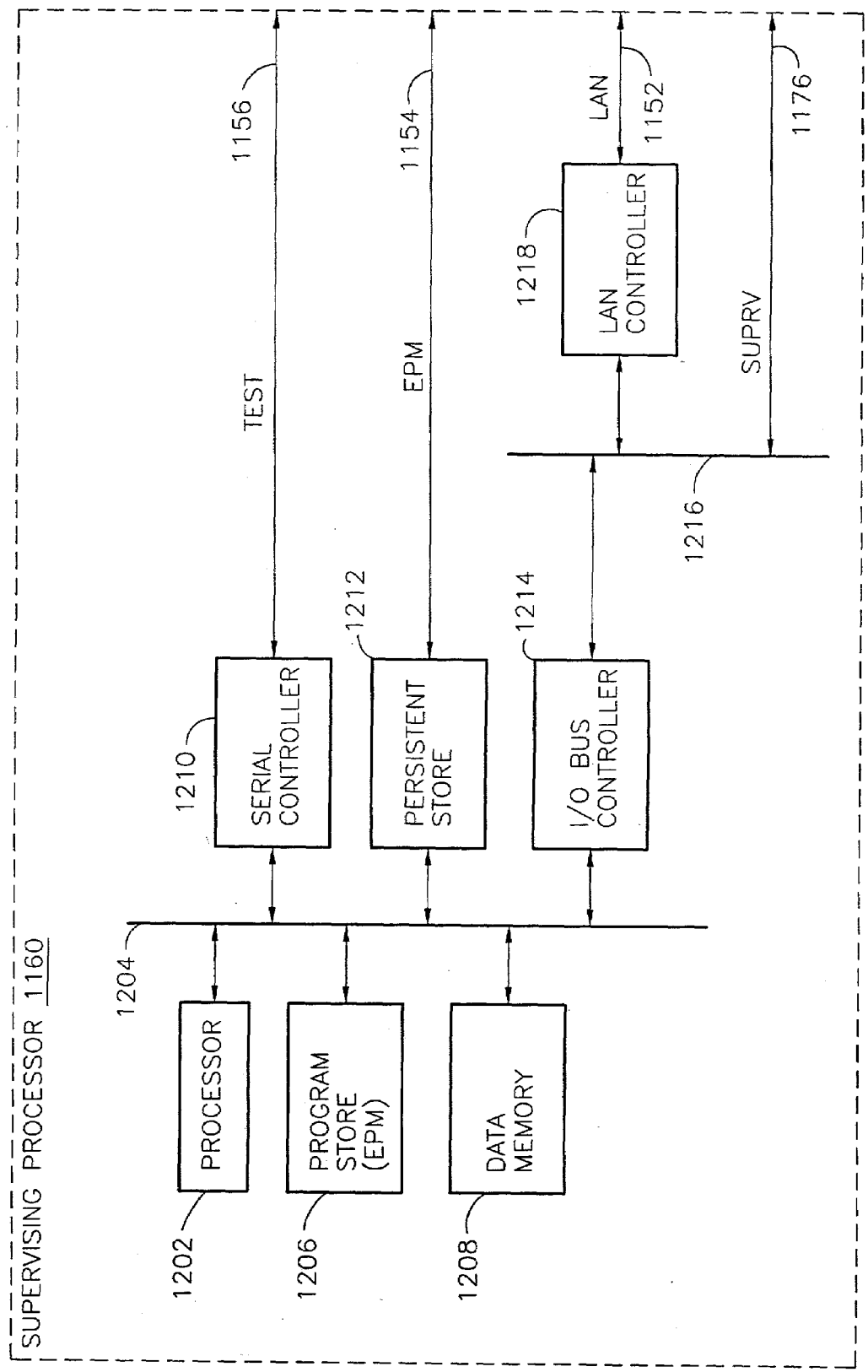
FIG. 12 is a functional block diagram of the supervising processor of FIG. 11.
Figure 13:
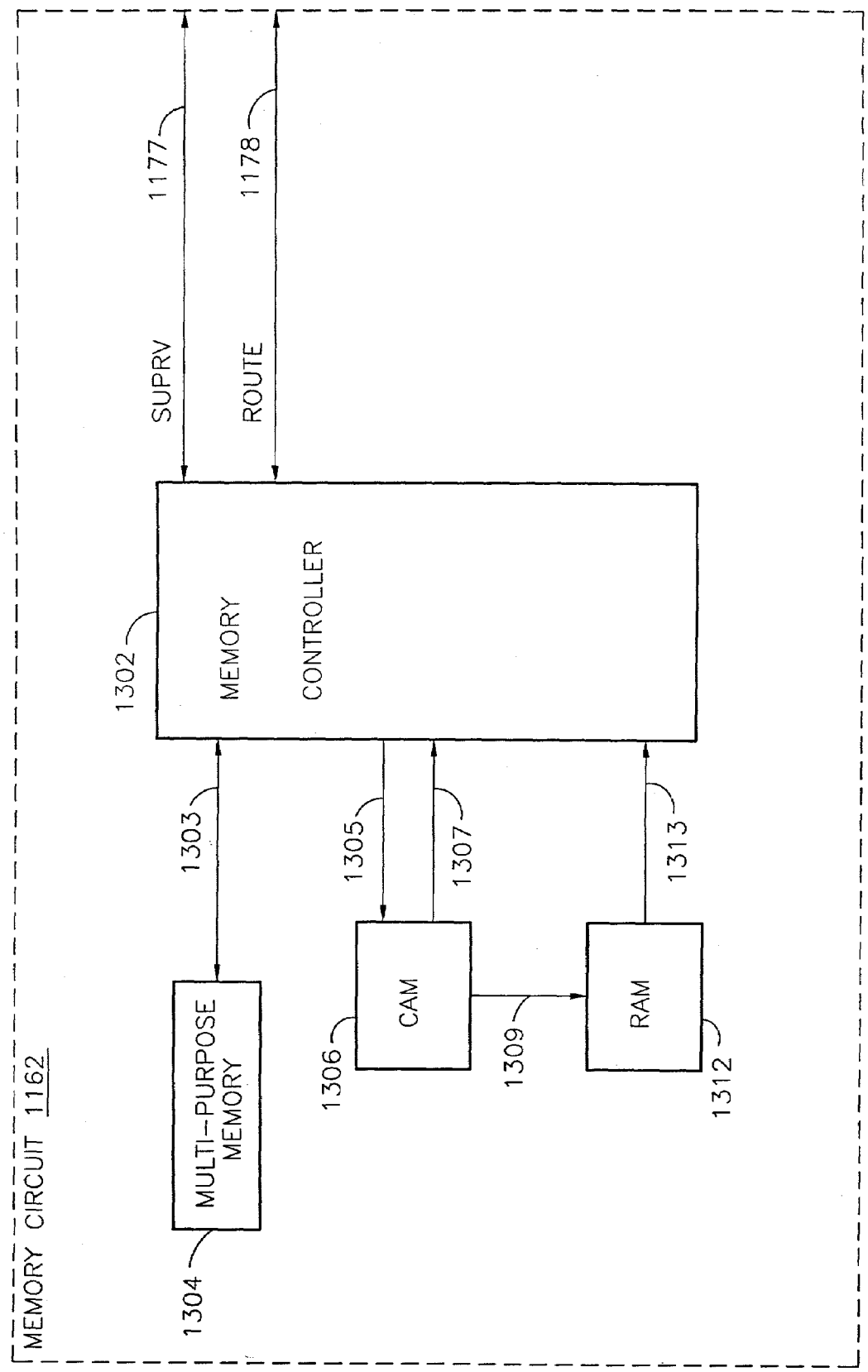
FIG. 13 is a functional block diagram of the memory circuit of FIG. 11.

A system according to various aspects of the present invention may include any computing environment supporting transfer of data among computer systems via a communication network. Such a system, in one implementation, provides more efficient non-blocking delivery of data, improved utilization of bandwidth, a facility for managing network traffic flows, subflows, and virtual flows, and higher quality of service. Data may be transferred between application programs being executed by one or more of the computer systems, between an application program and a data storage device, or between one or more data storage devices.

The network may be understood as a graph or a tree having network nodes. A communication network of the present invention includes at least one computer system at each of several network nodes. Each network node is coupled by a link from time to time for communication with other network nodes. Each link includes conventional computer communication technology at the physical layer and primitive layers of the type including, for example, local area, wide area, dedicated telephone, wireless, and satellite services and including conventional data communication hardware and software at each network node. The popular computer networks known as storage area networks, intranets, the Internet, the World Wide Web, and the National Information Infrastructure are examples of communication networks in which various aspects of the present invention may be practiced. Network nodes are generally at physically separate locations and are generally suitably identified, for example, by a node name, node identifier, node address, a world wide identifier (WWPN), a uniform resource locator (URL), a name from a domain name system (DNS), or an Internet Protocol address (IP).

Data transfer at the lowest level occurs via a link between ports, nominally a requesting port and a participating port, where a requesting port requests a data transfer and the participating port either supplies the data (e.g., a read) or receives the data being transferred (e.g., a write). A port includes a physical implementation for common signaling between ports (e.g., any circuitry suitable for the transfer media); and a logical implementation (e.g., any combination of firmware and software). Cooperation between ports occurs in accordance with a physical protocol (e.g., signals and their characteristics) and a logical protocol (e.g., one or more layers of application program interfaces). The physical and logical implementations and protocols together constitute a port by which other software can manage, among other things, how to obtain the data to be supplied to the port and what to do with the data obtained from the port. A port may communicate using several protocols. Frames according to a first protocol may be encapsulated (i.e., become the payload) in frames according to another protocol. Ports of a router according to various aspects of the present invention may support, for example, combinations of Fibre Channel (FC) Protocol (FCP), Internet Protocol (IP), based IEEE 802.3 Ethernet protocol, Small Computer Systems Interface (SCSI) Parallel Interface, Serial Bus Protocol, IEEE 1384 (Fire wire), SSA SCSI-3 Protocol, Scheduled Transfer, and Virtual Interface (VI).

A network node may include one or more ports. Multiple ports at a network node may be serviced as a group (e.g., a hunt group) to serve an upper level process with higher band width, to provide fail-over capability, or to serve multiple parallel processes. Network node identifiers (e.g., port identifiers) facilitate requesting (e.g., initiating) and participating in a data transfer (e.g., performing as a target or as a virtual target).

A group of ports may provide data transfer functions transparently. For example, a bridge, located between a requester and a participant, may receive requests in a first protocol (e.g., not understood by the participant) and provide a corresponding request to the participant in a second protocol (e.g., not understood by the requester). Further, a router, located anywhere in the network, may serve as a hub for several links; each link being served by one or more ports. Such a router routes network traffic between a requester (having a requesting port) and a participant (having a participating port) without either the requester or the participant having knowledge of the port identifiers of the ports of the router. The router transfers traffic between its ports in accordance with a routing table that defines communication paths through the router. The routing table may be specified by a network technician, by an administrator as discussed below, or may be determined by the router as a result of communication with other routers to which it is linked. A router according to various aspects of the present invention may function as a gateway receiving frames at an input port according to a first protocol and forwarding frames to an output port that (a) encapsulate the input payload; (b) strip the encapsulation of an input frame and forward the payload to the output port; or (c) use frames of the second protocol to conduct the function intended by the first protocol (e.g., data transfer with a virtual destination or with a logical destination; or a Virtual Interface transaction to a SCSI transaction).

A system according to various aspects of the present invention includes a communication network and numerous computer systems. Any of the computer systems that are currently members of the communication network, may transfer data to any other computer systems that are members of the communication network (or will be at a suitable future time) via links through routers. For example, system 100 of FIGS. 1–6, 11–14, and 23 includes communication network 101 (i.e., network 101) and members 110–117. Network 101 includes a link to each member: respectively links 150–158 to members 110–117. Network 101 also includes routers 102–105. The quantity, configuration, and arrangement of members, links, and routers in system 100 is merely illustrative and any number, configuration, and arrangement may be used in practice of the various aspects of the present invention.

Practice of variations of the present invention is independent of whether any particular link is maintained continuously, as in a dedicated line, or is maintained for a suitable duration. Members, links, and routers may each incorporate multiple units and be organized to provide redundancy or fail-over capacity to avoid a single failure from disrupting communication.

System administration includes establishing and maintaining router configuration for some or all routers of a network as the utilization of the network changes, as link reliability changes, and as the network grows or shrinks in number of links, routers, and members. Information for manual or dynamic network administration may be collected and reported by routers of the network. Administration may be accomplished by use of one or more workstations (e.g., for a human operator) or servers (e.g., for administration directed by process(es) running on the servers). Network 101 includes administration subsystem 109 having port 106. Link 107 supports communication between administration subsystem 109 and any router of network 101, particularly connecting port 106 to port 108 of router 102. Ports 106 and 108 and link 107 may be identical in structure and function to links and ports described above with reference to routers and members. In an alternate implementation, administration may be accomplished by any suitable member.

System administration may include management of network topology and may include management of virtualization. Virtualization includes the designation (e.g., mapping) of a nonvirtual member or nonvirtual resource (e.g., a nonvirtual entity) to be used in place of any reference to a virtual member or to a virtual resource (e.g., a virtual entity), the communication of that designation to suitable routers, and the use of that designation in routing packets. Routers according to various aspects of the present invention may perform the communication and use of designations that are defined by system administration.

A member of a network is a computer system that communicates via a link as described above and either operates, inter alia, to request data transfer or to participate in data transfer via the link. Some members may provide a resource to network 101 so that all members of the network may share the capability of the resource. For example, members 110–119 may include all or any part of the structure and functions described below with reference to members 115–116. Members 115–116 are capable of requesting data from any other member 110–117 or participating in data transfer with any other member 110–117 and vice versa.

Any member may include a subnetwork. A subnetwork includes any subsystem that employs ports connected to network 101 for communication generally between any member of network 101 and any subnetwork member (e.g., a resource) that is not directly connected to network 101. The interface between network 101 and such a subsystem may provide redundancy, fail-over, multiple or expanded use of network ports, access controls, security (e.g., functions of a conventional firewall), protocol conversion (e.g., functions of a bridge), and/or priority flow controls (e.g., functions of a router as discussed herein). For example, member 115 includes subnetwork 170 having ports 165 and 166 connected to network 101 via links 155 and 156 respectively, a port interface 171, a resource interface 172, a controller 173 servicing interfaces 171 and 172, a plurality of resources 174 that includes a processing resource 175, and a storage resource 177. Port interface 171, resource interface 172, and controller 173 may cooperate as a server 178. The plurality of resources 174 may include zero or more processing devices (e.g., computers, servers, or workstations) and zero or more storage devices (e.g., disks, tapes, media handlers, or RAID systems).

Port interface 171 performs suitable port interface functions (e.g., signaling protocols) as described herein and is exemplary of ports 160–168 respectively of members 110–117. Port interface 171 is configured, directed, and controlled by controller 173. Any conventional status and command interface signaling may couple port interface 171 and controller 173. Resource interface 172 performs suitable interface functions (e.g., signaling protocols) to accomplish any conventional network functions for and among resources via subnetwork 170. In alternate implementations, interfaces 171 and 172 may be integrated as one interface, may operate in the absence of a controller 173, and/or may be integrated with one or more resources. Port interface 171 and resource interface 172 communicate over line 176 (e.g., a bus or a link).

Controller 173 accomplishes all conventional protocol functions not already implemented in port interface 171 and resource interface 172. Controller 173 may include memory used, for example, for programmable operations of controller 173, data buffering, stateful control of interfaces 171 and 172, and subnetwork communication. Controller 173 communicates with the plurality of resources 174 via subnetwork 170. Subnetwork 170 may include any conventional logical and physical organization. As shown, each resource 175 and 177 communicates with resource interface 172 via a dedicated link. Communication between resources and from resources to ports 165 and 166 is accomplished by the cooperation of interfaces 171, 172, and controller 173. Controller 173 may perform processing of the type known as Random Array of Independent Disks (RAID) for one or more storage devices 177. Controller 173 may perform routing and priority functions for fail-over and load sharing among processing devices (e.g., functioning as an application service provider) and/or analogous functions among storage devices (e.g., functioning as a storage service provider).

A resource provides any capability used with data communication. For example, processing device 175 and storage device 177 may include conventional computers, array processors, peripherals, personal computers, workstations, telecommunications equipment, disk drives, disk drive arrays, tape drives, tape drive arrays, printers, scanners, video displays and cameras, audio equipment, and measurement instrumentation. Generally, devices 175 and 177 and to some extent controller 173 provide functions described above as a resource to network 101.

Subnetwork 170 may be any conventional network (e.g., a LAN, SCSI network, Fibre Channel network, Integrated Drive Electronics (IDE) network, or a star interface to just a bunch of disks (JBOD)). Communication to and from resources 174 may refer to any suitable device identifiers (e.g., World-Wide Identifiers (WWPNs), logical unit numbers (LUNs), or device addresses).

A router includes any mechanism that provides a logical communication facility between a requester and one or more participants. The facility may be dedicated (e.g., independent of all other communication through the router) or shared (e.g., time multiplexed). When communication is accomplished by separating data into frames (also called packets), frames may be passed through the facility in order, out of order, with or without regard to a time period specified for transfer, repeated, or dropped. If the facility is of the type conventionally known as non-blocking, no frame that properly enters the router will be dropped. A facility that is non-blocking at full capacity will drop no frames while all its ports operate indefinitely at maximum continuous communication link capacity. A router according to various aspects of the present invention provides a virtual communication facility alone or in cooperation with other routers.

A frame that enters a router at a given port may exit the router at any one or more ports including the port from which it entered, as directed by router configuration (e.g., static paths and/or dynamic routing tables). For example, router 102 provides non-blocking communication among ports 108, 130–133 respectively supporting links 107, 150 and 121–123; router 103 provides non-blocking communication among ports 134–137 respectively supporting links 121, 151, 152, and 124; router 104 provides non-blocking communication among ports 138–143 respectively supporting links 122, 124, 153–155, and 125; and router 105 provides non-blocking communication among ports 144–148 respectively supporting links 123, 125, and 156–158.

A router may serve as a core router or as an edge router. Routers 102–103 are illustrated as edge routers because they serve links to members 110–112 that are outside of boundary 102. Boundary 102 may be designated for security purposes or represent a physical or political divide. Routers 104–105 are illustrated as core routers because all ports serve links to members within boundary 102 or serve other routers of network 101. In an alternate network, the ports of a core router serve no members, only other routers. Analysis of frames for purposes of determining a classification and consequently designating the effectivity of a suitable policy value may occur at an edge router as opposed to a core router. Effectivity may be implemented, for example, by marking a frame, setting a preference bit, specifying a priority value, setting a preemption bit, or identifying a suitable output queue that is serviced in a manner that is consistent with a desired quality of service. Core routers may be programmed to pass traffic without such analysis. A router may act as an edge router as to some ports (e.g., ports 140 and 141 of router 104) and as a core router as to other ports (e.g., 138–139 and 142–143 of router 104).

Interswitch links 121–125 may employ any conventional protocol, including a protocol different from the protocol used between a router and a member. For example, frames leaving a router's port onto an interswitch link may include additional information that may be removed before the frame is passed on a non-interswitch link. Further, the quality of service (QoS) provided by a router's port to an interswitch link may be better than the quality of service provided by a router's port to a non-interswitch link.

Preferably, all of a router's ports have identical port physical implementations, for example, for convenience of installation and maintenance of network 101 as other routers and links are added to network 101. A frame routed on an interswitch link may be marked (at an ingress edge router) as discussed above for effecting a policy and such marking may be removed (at an egress edge router).

Communication among members and resources, according to various aspects of the present invention, is supported by a system architecture that facilitates expansion and reliability. Expansion includes, inter alia, adding physical assemblies to the system to support additional ports, links, and/or processing capacity as well as to support redundant and fail-over capabilities. Reliability is further enhanced by, inter alia, dividing processing responsibility to avoid processing and communication bottlenecks, and by modular and reusable procedural, data, and hardware structures.

A system architecture is a plan by which system functions are made the responsibility of particular processes for efficient performance of system functions and for efficient communication among processes. The system architecture is systematically applied as implementations of the system are developed and expanded. For example, system architecture 200 of FIGS. 2–6 includes administration subsystem 109, network 101, and router 102 comprising managing, supervising, and routing processes. Implementations of router 102 provide one or more processors for executing these processes. Systems employing architecture 200 solve the problems discussed above (e.g., provide qualities of service), expand and contract without disruption of services, and exhibit extraordinary reliability.

An administration subsystem includes any computer having a port for communication via a link to network 101 and a processor that performs an administrating process. For example, administration subsystem 106 of FIGS. 1 and 2 may include one or more servers and/or workstations that provide a user interface and a port 106, coupled by link 107 to port 108 of router 102.

An administrating process provides routing information to any router of a network and receives reports from any router of the network. The routing information provided to a router from an administrating process may define alternative paths through the network that a router may choose on a frame by frame basis. When a frame identifies a destination to which it is to be routed, each router of the network, as a consequence of receiving routing information from an administrating process or from another router, may have one or more alternative paths that it may use to route the frame successfully. The router is generally free to make the choice of a particular path in accordance with routing information and other information, including current traffic conditions. Administrating includes assisting a human operator to develop suitable routing information for any number of routers of the network. To that end, the administrating process may also obtain or be automatically provided with information describing current conditions of the network. For example, administrating process 202 receives reports from router 102 via network links 107 and provides routing information (e.g., paths) via network link 107 to router 102. By coupling the administrating process to the router via network links, any suitable number and locations of administrating processes and administration subsystems may be used to accomplish reliable access to any or all routers of network 101. Consequently, all administrating functions are scalable to the complexity of network 101 as network 101 may expand (e.g., as the quantity of routers to be administered by a particular administration subsystem may increase).

In one implementation system administration includes network management and virtualization management functions that may be performed independently by different operators. In addition, routers of the network may include conventional routers (e.g., that do not recognize virtual members and virtual resources) and routers according to various aspects of the present invention (e.g., that recognize a packet that is destined for a virtual member or a virtual resource). Virtualization management includes communicating the designation of a nonvirtual member or resource to each router that is responsible for implementing a nonvirtual transaction corresponding to (e.g., in place of) a virtual transaction. The router receiving such communication is responsible for routing packets of the virtual transaction and of the nonvirtual transaction in accordance with routing information as discussed above.

A router, according to various aspects of the present invention includes scalable processes and scalable interfaces for communication between processes. Consequently, routers of any suitable complexity (e.g., number and speed of ports, number of protocols supported, and extent of frame analysis) may be implemented in accordance with architecture 200. For example, router 102 includes managing process 204, supervising process 206, and routing process 208. In operation, managing process 204 receives routing information via network 101 and provides routing information to supervising process 206 via bus 210; supervising process 206 stores routing information in memory 211 from which routing process 208 retrieves it; and, routing process 208, routes frames through links 214 and 216 to network 101 with reference to routing information recalled from memory 211. Frames received from network 101 are generally handled by routing process 208 in one of three ways: routing at least the payload of the same or corresponding frames to network links via fabric 213 and ports 216, routing at least the payload of the same or corresponding frames to managing process 204 via ports 201 and 214, and passing at least the payload of the same or corresponding frames to supervising process 206 via bus 212.

Particular advantages are realized in a system according to various aspects of system architecture 200. For example, by providing buses 210 and 212 as physical entities, processes 204, 206, and 208 may be hosted by independent processors (e.g., processors having access privileges over particular resources or separately packaged microprocessors). Consequently, each process 204, 206, and 208 may be hosted (e.g., provided with suitable resources) in scale with the complexity of functions performed by router 102. Significant economies result including economies related to modular circuit, firmware, and software design techniques. For example, one or more managing processes 204 may communicate on bus 210 with any number of supervising processes 206. One or more supervising processes 206 may communicate on bus 212 and by virtue of shared access to memory 211 with any number of routing processes 208. One or more routing processes 208 may communicate with network 101 via any number of ports 216 (e.g., conveying frames to any administrating subsystem and any network member) and communicate with any number of managing processes 204 via ports 201–214. In an alternate implementation, buses 210 and 212 may be a common entity. In yet another alternate implementation, processes 204, 206, and 208 may be performed by fewer than three processors (e.g., one processor or one array processor) and bus communication may be replaced with conventional interprocess communication (e.g., software interrupts, semaphores, common buffers, and multithreading).

An administrating process includes any process that provides a user interface to a human operator for the purpose of determining routing information (e.g., for virtualization management, or network management) to be used in routers of a network and that provides information regarding network utilization. For example, administrating process 202 of FIG. 3 includes edit paths process 302, obtain reports process 304, manage link loads process 310, display link utilization process 312, and port I/O (i.e., input/output) process 306. Routing information may be presented, stored, and communicated in any suitable form.

Edit paths process 302 creates and revises routing information, automatically and in response to input by a human system operator. Routing information, according to various aspects of the present invention, may include any combination of descriptions including: a set of alternate paths through the network, an association of a virtual member and at least one of a nonvirtual member and a nonvirtual resource, and an association of a virtual resource and at least one nonvirtual resource. Each path and association may be defined to include several links and policy values. Each link may be identified as a logical entity or as a physical entity.

A logical entity (e.g., a logical link, a logical resource, or a logical member) may correspond from time to time with one or more physical entities. By referring to a logical entity, the correspondence between the logical entity and any particular physical entity (or entities) may be determined dynamically, or in accordance with information that is not available at the time that the reference to the logical entity is made. For example, a reference to a logical entity need not be revised in light of the addition or removal of redundant physical entities. Consequently, system 100 may expand or portions of system 100 may fail and the reference to the logical entity remains valid (e.g., does not require amendment to continue particular network functions). At the physical level, a router that has received a frame on one of its ports either routes or drops the frame. Routing includes determining (not necessarily unambiguously) at least one physical output port to which the frame may be directed. If no such output port can be determined (or the only such output port is not available), the frame is said to be dropped. Dropping a frame (e.g., for lack of information sufficient to route the frame) accomplishes a denial of access to the member or resource intended to receive the frame.

Routing of frames between members (and resources) is somewhat analogous to sending a letter through the postal system. The letter originally bears the address that the sender believes is the current address of the intended recipient. For example, the sender may live in Ohio and may address a letter to a corporate headquarters in Georgia requesting a copy of the latest specialty catalog. The sender need not have any knowledge of the street addresses of the post offices or the names of their internal departments that may be involved. Suppose that the corporation has moved its headquarters to Florida and has filed with the Georgia post office a notice of change of address. When the letter is routed from the point of deposit into the postal system in Ohio to the post office in Georgia, the postal workers in Georgia may place the original letter in a surrounding envelope and address the outer envelope to Florida. The corporation may recognize from the outer envelope or otherwise that the letter is requesting a specialty catalog. The corporation may then enclose the outer envelope and its entire contents in a further enclosing envelope and apply the address of a particular catalog fulfillment center in Indiana; then redeposit it in the postal system. At the fulfillment center in Indiana, all envelopes may be discarded and the catalog shipped to the requester's Ohio address given in the letter.

When a router operating according to various aspects of the present invention determines that the frame that entered the router must have an additional address, a frame that encloses (and thereby includes) the received frame may be prepared and routed. This is analogous to enclosing the letter in an outer envelope as discussed above. For example an in-bound edge router may enclose the frame and an out-bound edge router may discard the outer frame and pass merely the inner frame. Alternately, a router operating according to various aspects of the present invention may prepare a frame that contains the payload of the original frame and a different address than originally received. This is analogous to covering an address on a letter with a sticker that bears a forwarding address. Generally, a frame bears at least one destination identifier; an address being one form of an identifier as discussed above. The several identifiers that may be encountered in operation of system 100 are outlined briefly in Table 1 tracing the routing of a request for data to be supplied by a resource (e.g., a request from SORT process 181 of member 116 for file CITIES from member 115.

TABLE 1

| Network Entity | Context | Services | Source or Destination Identifiers | Role |
|---|---|---|---|---|
| Member (e.g., 116) | User's process (e.g., SORT 181) | Upper level protocol API | User's handle, record number | Requester |
| Member | Operating system (e.g., 182) | Operating system API | Operating system handle, filename | |
| Member | Logical unit abstraction | Device driver manager API | Path, logical unit number, block address range | |
| Member | Logical unit (e.g., as supported by device driver 183) | Device driver API | Logical unit number, page number, sector number | |
| Member | Logical port (e.g., 167) | Port API | Logical port identifier | Requester, Source |
| Member | Physical port | Signals | Physical port identifier | |
| Router | Physical port | Signals | Physical port identifier | Ingress |
| Router | Logical port (e.g., 147) | Router input port logic | Logical port identifier | |
| Router | Virtual unit | Router virtualization API | Virtual unit number, page number, sector number | |
| Router | Logical unit abstraction | Router management logic | Path, logical unit number, block address range | |
| Router | Logical unit | Router routing logic | Logical unit number, page number, sector number | |
| Router | Logical port (e.g., 146) | Router output port logic | Logical port identifier | |
| Router | Physical port | Signals | Physical port identifier | Egress |
| Member (e.g., 115) | Physical port | Signals | Physical port identifier | |
| Member | Logical port (e.g., 166) | Port API | Logical port identifier | Participant, Destination |

TABLE 1-continued

| Network Entity | Context | Services | Source or Destination Identifiers | Role |
|---|---|---|---|---|
| Member | Logical unit | Device driver API | Logical unit number, page number, sector number | |
| Member | Logical unit abstraction | Device driver manager API (e.g., controller 173) | Path, logical unit number, block address range | |
| Member | Operating system | Operating system API | Operating system handle, filename (e.g., CITIES file on disk 177) | |
| Member | Data entity | Upper level protocol API | User's handle, record number | |

Routing information may be stored in any conventional database such as paths database 303. In one implementation, paths database 303 includes for each router a data structure (e.g., one or more files) having records, each record comprising a data structure having fields for a destination identifier as specified in a received frame and one or more of a list of alternate logical or physical ports of the router to which the frame may be routed. Table 2 lists several records of paths database 303 describing sets of paths for routers 102, 104, and 105. The reference numbers in Table 2 identify ports shown in FIG. 1. In records corresponding to rows of Table 2, reference numbers would be replaced with logical port identifiers.

TABLE 2

| Destination port as indicated in the frame received | Router at which the frame was received | Output port of the router at which the frame was received | Comment |
|---|---|---|---|
| 165 | 105 | 145 | Use link 125 to router 104. |
| 165 | 105 | 144 | If link 125 is busy or down, use link 123 to router 102. |
| 166 | 105 | 146 | Use link 156 to destination. |
| 166 | 105 | 145 | If link 156 is busy or down, use link 125 to router 104. |
| 165 | 104 | 142 | Use link 155 to destination. |
| 165 | 102 | 132 | Use link 122 to router 104. |

Routing information may include associations of policy values and port identifiers (e.g., for network ports such as 165 and/or for router ports such as 145). Generally a policy value includes any value that specifies (e.g., directly, or indirectly by identifying another specification) access permissions, desired quality of service, priority, connection type (e.g., connection oriented, connectionless) class of service, traffic class, or other transaction controls to be implemented before or during routing. Policy values include any control values defined by a protocol including the identification of the protocol (e.g., SCSI and version number). For example, a Fibre Channel header includes a CS_CTL field that describes a class of service having functional specifications that assure a particular quality of service.

When routing information is being prepared by edit maps process 302, any representation of a port may be used (e.g., a name from a name server, an index or pointer into a list of names, a mnemonic, an icon, a world wide port name WWPN). Routing information may be entered by a system operator in any conventional manner including "point-and-click", "drag-and-drop", identification of a group of ports as equivalent (e.g., ports 165 and 166 may be identified as functionally equivalent as to member 115), or identification of a group of members of the network or of one or more subnetworks that are to be considered as a zone for a common purpose such as specifying policy values.

In one implementation according to various aspects of the present invention, routing information between physical entities is developed by routers 102–105 without user intervention according to methods performed by routers 102–105 that (a) identify port capabilities of all ports coupled to each port of a router; (b) advertise port identifiers to other routers via interswitch links; and (c) maintain routing information (e.g., further identification and advertising) when changes in port connections are detected. In such an implementation, the virtual ports, virtual members, and virtual resources (with suitable policy values) might not be discovered by routers 102–105 and are developed by an administrating process with user input.

Routing information (e.g., paths database 303) may be stored and maintained in a relational database. In one implementation, policy values are associated with group names, group names are associated with identifiers of members, and zone names are associated with identifiers of resources (processes and devices). A zone name may be used to describe a virtual member or a virtual resource. Further, group/zone tuples of group name, zone name, and policy values may be derived or maintained in such a database. Still further, member/resource tuples of member identifier, resource identifier, and policy values may be derived or maintained. In an alternate implementation, the derivation of member/resource tuples is accomplished by managing process 204 based on maps received from administrating process 202.

Routers of network 101 may gather information useful for any portion of administrating process 202. Obtain reports process 304 may use any suitable technique to obtain such information from routers 102–105. For example, obtain reports process 304 may poll routers of network 101 by sending a frame containing a command (e.g., a fabric control command or link service request). Routers 102–105 may provide such information in any suitable form from which obtain reports process 304 formats one or more entries in reports database 308. Obtain reports process 304 may, for example, use commands of the Simple Network Management Protocol (SNMP) to read any register or region of memory in a router 102–105. For example, routers 102–105 may provide lists of ports, image data, maps, and current configuration information from which administrating process 202 may develop new, expanded, or revised paths.

A method for preparing a map according to various aspects of the present invention includes in any order: requesting member identifiers and resource identifiers from routers of the network; associating each member identifier to a group of members; associating each resource identifier to a zone of resources; associating a path and a policy value to at least one of the group and the zone; determining port identifiers associated with the path; and communicating the policy value to each router of the network having at least one port identified to the path. In alternate implementations, the group and/or zone layer of indirection may be omitted so that path and policy values are associated directly with member identifiers and resource identifiers.

A method for preparing a map that enables routing to virtual entities (e.g., virtual members, virtual resources) includes in any order: (a) providing a name for each of any number of virtual members and/or virtual resources; (b) associating one or more portions of nonvirtual members and/or nonvirtual resources with each of the names; and (c) communicating each association to at least one router on each path used to communicate between a nonvirtual member and either of a virtual member or a virtual resource. The method may also include assigning a network port identifier to each virtual member or virtual resource. When a resource is divisible into fungible units (e.g., identically functioning units of storage or processing such as sector addresses or object references), the method may further include associating a unit of a nonvirtual resource to the name or to a portion of a virtual resource. For example, a sector of a named virtual resource may be associated with a sector of a nonvirtual resource.

Policy values may include access control values (e.g., identifiers of members or resources permitted to access other members or resources). Access controls may be associated with nonvirtual and virtual members and resources.

A method for facilitating network traffic may include the steps of: (a) preparing a map to facilitate routing of frames referring to virtual entities; (b) providing policy values associated with virtual entities; and (c) communicating the identifiers of virtual entities only to members or resources permitted to access them. Communication of the identifiers may be by selectively advertising.

A definition for implementing a database for use by edit paths process 302 and storage of routing information in paths database 303 is described in Table 3.

TABLE 3

| FILE (or list) and associated fields or a record (or entry) | Description |
|---|---|
| GROUP/POLICY<br>group_name<br>policy_value | A named group may serve as a logical construct used to describe a set of policy values. Group names may be associated with policy values in many-to-many relationships. In other words, several policy values may be associated with a group name and the group name serve as an indication of the combination of policy values. Requesters (e.g., initiators) may be identified to groups as opposed to zones. |
| MEMBER/GROUP<br>member_identifier<br>group_name | A member, as identified by any suitable identifier (e.g., IP address, or WWPN), may be associated with a group name to indicate that the policy values of the group are to be associated with all network traffic involving the member. Members may be associated with groups in many-to-many relationships. An administration system operator may designate a member_identifier (e.g., an unused name) as a designation of one or more actual members. Such a member_identifier is herein called an identifier of a virtual member. |
| ZONE/POLICY<br>zone_name<br>policy_value | A named zone may serve as a logical construct used to describe a set of policy values to be applied to resources and members that are part of the zone. Zone names may be associated with policy values in many-to-many relationships. Participants (e.g., targets) may be identified to zones as opposed to groups. |
| RESOURCE/ZONE<br>resource_identifier<br>zone_name<br>if virtual, the associated nonvirtual resource identifier, and (if applicable) virtual unit to nonvirtual unit crossreferences (e.g., page/sector table or object reference crossreferences) | A resource, as identified by any suitable identifier (e.g., IP address, WWPN; for a process, an object reference or reference of the type used with CORBA), may be associated with a zone name to indicate that the policy values of the zone are to be associated with all network traffic involving the resource. Resources may be associated with zones in many-to-many relationships. An administration system operator may designate a resource_identifier (e.g., an unused name) as a designation of one or more actual resources of one or more actual members. Such a member_identifier is herein called an identifier of a virtual resource. A virtual resource may be associated with an actual or virtual member. A virtual member may have virtual resources. |
| MEMBER/ZONE<br>member_identifier<br>zone_name<br>if virtual, associated nonvirtual member identifier | A member and all resources of the member (if any) may be associated with a zone as discussed above. |
| PATH/PORT<br>path_name<br>source_port_identifier<br>destination_port_identifier<br>router_identifier<br>output_port_identifier | A named path may serve as a logical construct for developing routing information. Typically two ports define the extremes of a path: the port of a requester (e.g., a source) that is associated with a member or resource, and the port of a participant (e.g., a destination) member or resource. An administrating process may have no knowledge of the routers and their output ports that may be involved in alternate paths--leaving a managing process in a router to obtain, integrate, and dynamically maintain such information, supplementing the definition of a path. Nevertheless, identifiers and ports may be associated to a path name to the extent that an administrating process may suitably designate alternate routes or paths between groups, zones, members, and resources. |

TABLE 3-continued

| FILE (or list) and associated fields or a record (or entry) | Description |
|---|---|
| MEMBER/PORT<br>member_identifier<br>router_identifier<br>port_identifier | A port identifier may be a logical or physical reference to a particular port. During member login to a port of a particular router, the member identifier and port identifier may be associated, for example, in a name server. A port identifier for a virtual member may be designated by an operator of the administration subsystem. |
| RESOURCE/PORT<br>resource_identifier<br>router_identifier<br>port_identifier | The identity of a resource may be associated with a port of a particular router, as discussed above. A port identifier for a virtual member may be designated by an operator of the administration subsystem. |
| GROUP/ZONE/PATH<br>group_name<br>zone_name<br>path_name<br>policy_values | The association of a path to a group, a zone, or both, provides an association of policy values to the path. When policy values as defined for the group and the zone conflict, any suitable negotiation of policy values may occur to result in policy values to be used for the path. Integration of policy values may follow predetermined hierarchical rules maintained by an administrating process (e.g., edit paths process 302) or by a managing process. Negotiation may be accomplished dynamically during a login sequence. Resulting policy values associated with a path form the basis for routing tables. |
| MAP<br>router_identifier<br>source_port_identifier<br>destination_port_identifier<br>policy_values<br>crossreferences for implementing routing for virtual entities | A map may include policy values to be implemented for any or every router of the network. A segmented map or an overall map may be derived from the records discussed above. In an implementation where routers develop routing information without operator input, one or more of the fields described here may be omitted. |
| ROUTING TABLE<br>source_port_identifier<br>destination_port_identifier<br>policy_values<br>crossreferences for implementing routing for virtual entities | A routing table for a particular router may be prepared as an excerpt from a MAP. The operator of the system administration subsystem may determine which routers will use crossreferences for routing virtual entities. According to various aspects of the present invention, the readdressing of a frame that originally designated a virtual entity is accomplished at any one router along a path; other routers along that path need not have access to crossreferences implementing routing for that virtual entity. In one implementation, the burden of processing virtual routing is distributed among routers of network 101. In an implementation where routers develop routing information without operator input, one or more of the fields described here may be omitted. |
| IMAGE<br>routing_table_entries<br>routing_process_data<br>routing_process_programs<br>supervising_process_data<br>supervising_process_programs<br>managing_process_data<br>managing_process_programs | An image may include information for routing, supervising, and managing including data (e.g., constants, tables, configuration information), and programs (e.g., downloaded subroutines for use by a routing processor to perform routing of a particular type of frame of a particular protocol is recognized by a parser). In a network capable of determining paths for actual members and resources, the image may be limited to information regarding routing of virtual |

A port input/output process provides an application program interface (API) by which an application program may send and receive frames for communication (e.g., command, control, status, and data interchange) with other application programs, resources, and members of the network. For example, port 110 process 306 conducts all lower level protocols to permit administration process 202 to have access to information stored in routers and members of system 100. Port I/O process 306 provides an API to obtain reports process 304 and to manage link loads process 312.

Links are subject to traffic that consumes available capacity of the link herein called a link load. The link load may be quantified as having frame rate, delays between frames, bursts of immediately succeeding frames, burst length, delays between bursts, and related derived quantities (e.g., maxima, minima, averages, counts, rates, variances) during a suitable duration of measurement or monitoring. Management of a link load at the level of system administration involves transferring routing information from time to time to routers of network 101; and, providing information to assist development of routing information. For example, manage link loads process 310 sends portions of paths database 303 that apply to a particular router (e.g., rows 1–4 of Table 2) as an update to the particular router (e.g., router 105) in any manner suitable for limiting the disruption of ongoing network services. Updates may occur when a router logs into the fabric and at any suitable time thereafter. Manage link loads process 310 may request particular reports from obtain reports process 304 or may make reports from database 308 according to any conventional query.

The loads on various links over time and/or as related to one or more members constitute link utilization. Link utilization may be displayed in system 100 in any conventional aggregated or sorted manner. For example, display link utilization process 312 reads reports 308 and presents link utilization to the system operator via a graphical user interface. The system operator may analyze displays presented by display link utilization process 312 to determine that improved system performance may result if portions of paths database 303 are edited. Display link utilization process 312 may request particular reports from obtain reports process 304 or may make reports from database 308 according to any conventional query.

In each router of system 100 (e.g., 102), a managing process accepts paths sent in frames to the router from an administrating process and provides reports in frames to the administrating process. For example, managing process 204 accepts paths as sent by manage link loads process 310 and provides reports from time to time to obtain reports process 304. Due in part to the scalable architecture discussed above, each router may receive updates from any administrating process and provide reports as requested or automatically to any administrating process. A managing process, according to various aspects of the present invention, includes any process that performs one or more of the following operations: providing routing information to one or more supervising processes; obtaining from one or more supervising processes information for reports as discussed above; governing operation of one or more supervising processes to assure policy values are effected on a particular link; serving as a proxy for one or more members in any communication (e.g., for virtualization); operating a cache to provide an up to date redundancy of all or a portion of data stored at a member; and operating a cache to maintain a mirror storage resource as a copy of another storage resource. For example, managing process 204 includes port I/O process 402, LAN I/O process 404, manage configuration process 406, map store 408, image store 409, obtain and supply reports process 410, reports 412, load balance process 414, launch proxy for member process 416, any number of proxy for member processes 418, proxy state 420, cache agent process 422, cache 424, and mirror agent process 426.

Port I/O process 402 performs functions analogous to port I/O process 306, discussed above.

LAN I/O process 404 provides an API for processes within router 102 to communicate via bus 210. Bus 210 may be of the type known as a local area network (LAN), for example, including IP over IEEE 802.3 Ethernet for supporting, among other functions, an interprocess protocol of the promulgated by the Object Management Group as Common Object Request Broker Architecture (CORBA).

Managing configuration for a router, according to various aspects of the present invention, includes establishing initial values and updates of values stored in any memory device of the router. For example, manage configuration process 406 may receive configuration information (not shown) and routing information (e.g., paths) from administrating process 202 by SNMP communication, in frames, or in file transfers (e.g., comprising data in XML). Manage configuration process 406 determines router specific routing and configuration information, and stores received and derived information in map store 408 and in image store 409. Manage configuration process 406 determines configuration values that may be suitably tailored for one or more supervising processes 206. Configuration information may be derived in accordance with the establishment or termination of a proxy for a member, discussed below. Configuration information may also be derived in accordance with a result of load balancing, discussed below.

Routing information (e.g., paths, and associations implementing virtualization) may be received having references to logical identifiers. Mange configuration process 406 may refer to a name service (e.g., domain name service) to replace logical identifiers with physical identifiers and store results (e.g., maps) in map store 408. Maps in map store 408 may be used to develop routing information for particular routing processes. Routing information particular to a routing process may be combined with other data (configuration information, data, and programs) to form an image for transfer to a routing process.

Image store 409 is organized for convenient access by manage configuration process 406. Manage configuration process 406 may access image store 409 for reading configuration information, forming a proper message for the protocol on bus 210 (e.g., determining an address of a supervising process 206 for receipt of the configuration information); and for storing configuration information that may be reported by supervising processes from time to time via bus 210. Manage configuration process 406 includes watchdog timers that notice when a configuration of a supervising process has changed, and when such a process is no longer responding. Manage configuration process 406 may execute a reset on any supervising process (or processor) in an attempt to re-establish proper operation of a supervising process (or processor). Image store 409 may contain a description of the state of each supervising process 206 managed by manage configuration process 406.

Supervising processes are managed to coordinate operation of a router in an initial configuration, a power-on configuration (e.g., persistent from a recent power-off configuration), and an expanded configuration (e.g., additional ports and supervising processes added without disrupting current routing functions). Configuration information to be stored in a memory device of the router includes codes (e.g., flags, identifications, controls, and interrupt settings) for command registers (herein called command/status registers (CSRs)), programs for instruction stores (e.g., microcode for a state machine, native instructions for a processor, or statements for an interpreter), and variables and data for main memory (e.g., semiconductor and/or disk storage for variables, tables, and related data for random access memory or content addressable memory). These memory devices may be volatile or nonvolatile (herein generally called erasable programmable memory (EPM)). Consequently, manage configuration process 406 may conduct a series of download operations via LAN I/O process 404 (in cooperation with LAN I/O process 502) and may receive status and acknowledgements from LAN I/O process 404.

A managing process may obtain reports from a routing process; and the managing process may provide reports to an administrating process. Reports may be specified as to content and format by the administrating process and/or the managing process. According to various aspects of the present invention, communication of reports between all such processes utilizes network frames. The consuming process for any report may request the report specifically each time it is desired, or specify a subscription for the report to be fulfilled without further intervention by the consuming process. The providing process may produce reports only when requested (e.g., when polled), or may produce reports in response to lapse of a timer or on the occurrence of an event (e.g., an abnormal condition, or a condition requiring information and processing power from a managing or administrating process). Any conventional communication protocol may be used to implement the request/reply or subscription mechanisms. A variety of protocols may be used for a variety of reports. For example, obtain and supply reports process 410 sends requests via ports 214 (FIG. 2) conforming to SNMP to routing process 208 and routing process 208 sends replies via ports 214 to obtain and supply reports process 410 in conformance to SNMP. More particularly, port I/O process 402 parses incoming frames and delivers frames identified as SNMP to obtain and supply reports process 410. Obtain and supply reports process 410 sends reports from managing process 204 via ports 201 to administrating process 202 via ports 107 using network frames as discussed above.

According to various aspects of the present invention, a managing process may designate in a map a type of frame and an address recognized by the managing process so that a routing process, operating according to the map, that receives a frame of the designated type will route the frame to the managing process. Generally, frames are of two types: those involving data transfer; and otherwise, those involving control and/or status. For example, manage configuration process 406 may specify in a map that control frames of particular protocols (e.g., controls for virtual participants) are to be routed to a network port that is recognized by the parser of port I/O process 402. Such a map, passed to map 211 as discussed above, is used by routing process 208.

Part of a map may designate nonvirtual members (or resources) that are to be used when reference is made to virtual members (or resources). Each virtual member may accomplish the data processing and data communication functions of a member by obtaining the services of one or more nonvirtual (i.e., actual) members, nonvirtual resources, or portions thereof. The designation of nonvirtual resources to a virtual member may be specified by administrating process 202 and communicated to managing process 204 as part of a map. Operations on a virtual member (e.g., by control frames or data frames) may be accomplished on a physical device (e.g., member 110, or device 175 or 177), may be accomplished on a logical device (e.g., member 115 corresponding to resources on subnetwork 170), or on another virtual device as long as a nonvirtual device can be identified for the operations (e.g., no circular references or undefined virtual identifiers).

Launch proxy for member process 416 includes any process that analyzes frames and prepares replies to accomplish any of the following: (a) establish a virtual member; (b) identify any or all existing virtual members; and (c) perform for a virtual member any action appropriate for a nonvirtual member (e.g., respond to any control frame). Communication with a virtual member, in accordance with various aspects of the present invention achieves the effect that the requesting member is unaware that the request was accomplished by a proxy as opposed to a nonvirtual member. These determinations and replies may be accomplished using protocol analysis and communication techniques similar in some respects to conventional parsers and port I/O processes suitably modified for launching and cooperating with one or more proxy processes. Launching a proxy includes maintaining a list of operating proxy processes, dedicating resources (e.g., memory in a managing processor) for use by the proxy, determining an identifier for the proxy, updating routing information to enable communication with the proxy, and preparing to accept status and error condition messages that may originate with or be a consequence of the proxy. For example, when port I/O process 402 determines that a frame is a request to identify or to establish a virtual member, port I/O process passes the frame (or related information) to launch proxy process 416. Launch proxy process 416 responds by identifying an existing proxy or launching a new proxy as discussed above.

A proxy process includes any process that receives frames in a first transaction and that prepares frames directed to a nonvirtual member or resource in a second transaction. The first and second transactions may be in the same protocol or in different protocols. The first and second transactions may be separate in time or may overlap in time. A nonvirtual member or resource has state according to the protocol used to communicate with the nonvirtual member or resource. A proxy process makes virtual state visible to the user of the virtual member or resource (e.g., in response to a control frame). For example, each proxy process 418 operates as if it were a nonvirtual member having state according to the protocol used by the user of the virtual member. The state of the nonvirtual member and the virtual state as made visible by the proxy to the user of the virtual member may differ. When the protocol used with the nonvirtual member is identical to the protocol used with the virtual member, the respective states may correspond. Even so, these states may differ, for example, because of temporal differences between the conduct of the first transaction and the second transaction.

Proxy state includes any data structure for maintaining the state of the virtual member (or resource) and the state of the corresponding nonvirtual member (or resource). For example, proxy state 420 includes a conventional data base stored in any suitable memory (e.g., a combination of semiconductor and disk memory devices). Proxy state 420 may comprise any suitable organization of records with fields as described in Table 3.

TABLE 3

| Field | Description |
| --- | --- |
| on-line | Describes whether the device (a member or a resource) is available for login to the network; |
| logging-in | Describes whether the device is currently participating in a log-in scenario; |
| device available | Describes whether the device is currently assigned a valid port which may be specified in a transaction; |
| accessible pages | Describes for a storage device what portions of the storage device are ready (or will be ready) for immediate access due in part to the structure (e.g., a portion of the storage medium proximate to the read/write head) and operation (e.g., seek times to other cylinders, or to other portions of streaming tape) of the storage device. |

A cache agent process includes any process that maintains data in a relatively faster access memory so that reference to a relatively slower access memory may be avoided. The capacity of the faster access memory is generally subject to limitations on the amount, type, or organization of data stored therein. A cache agent process receives requests for data bearing suitable identification of the desired data, examines the cache first and if the desired data is not there, obtains the data and possibly stores the data in the cache to facilitate future reference to at least part of the same data. If the data is in the cache, the cache agent process provides the data in response to the request and may note that the data has been accessed. The cache agent may determine whether to retain data in the cache in response to notations as to its having been accessed (e.g., time of last access, total number of accesses in a period of time, and/or identity of the requester for which access was made or destination to which the data was provided). For example, cache agent 422 receives requests from port I/O process 402, performs the functions of a cache agent as discussed above by accessing cache 424, and directs port I/O process 402 to reply with data as requested to be sent to the requester.

A mirror agent process includes any process that maintains more than one copy of particular data. A second copy of data (also called the mirror) when read at any time must provide the same result as reading the primary copy of data (the data that is being mirrored). The primary data is expected to be subject to change by being written. To properly mirror primary data that has been written, the write to the second copy must be made prior to a read of that portion of the second copy that would be affected by the write. According to various aspects of the present invention, a mirror agent process may prepare and maintain the second copy without initially preparing a complete copy of the primary data. In other words, the second copy may at any instant of time (a) be empty, (b) contain primarily or exclusively a copy of the data that has been written to the primary copy, or (c) contain primarily or exclusively a copy of the data that has been read from the primary copy. By delaying copying unused portions of the primary copy to the second copy, network traffic may be more effectively used for other network functions. For example, mirror agent process 426 receives requests from port I/O process 402 to maintain one or more copies of identified data, performs the functions of a mirror agent as discussed above by accessing cache 424, and directs port I/O process 402 to perform reads of the primary copy and writes to the second copy to maintain the second copy as discussed above.

A cache includes any data structure for facilitating access to data as discussed above. For example, cache 424 includes a conventional data base stored in any suitable memory (e.g., a combination of semiconductor and disk memory devices).

Each routing process may communicate with a managing process 204 or its components (406, 414, 410, 416, 418, 422, 426) using one or more network port identifiers (e.g., destination addresses). Such a network port identifier may be a predefined address, an address reserved to the router, a world wide port name, or a so-called well known address. Network port identifiers may be used by routing processes and by administrating processes to communicate with managing processes. A routing process generally communicates primarily or exclusively with the managing process in the same router as the routing process. Communicating by use of a network port identifier of network 101 is also called "in-band" communication. By contrast, networks 210 and 212, for example, do not represent "in-band" communication.

A supervising process, according to various aspects of the present invention communicates with one or more managing processes 204 via LAN 210; and, communicates with any number of routing processes 208 via at least one of bus 212 and shared memory 211 as discussed above. Such communication maintains a current map 211 for use by each routing process and accomplishes link services for the links maintained by each routing process. For example, supervising process 206 includes LAN I/O process 502, image store 503, update images process 504, get link service request 506, put link service reply 507, control fabric process 508, log 510, serve names process 512, namestore 514, broadcast process 516, and group store 518.

Supervising process 206 cooperates with manage configuration process 406 to receive routing information. LAN I/O process 404 provides routing information according to a protocol followed also by LAN I/O process 502 for receipt and acknowledgement of routing information. LAN I/O process 502 may also provide indications that supervising process 206 is operating properly via the cooperation of LAN I/O processes 502 and 404. LAN I/O process 502 analyzes routing information that has been received and stores routing information in image store 503.

Image store 503 is organized for convenient access by LAN I/O process 502 and update images process 504. Image store may include codes, programs for instruction stores, variables, data, and routing information, as discussed above with reference to image store 408. Update images process 504 may access image store 503 for reading configuration information, forming a proper message for the protocol on bus 212 (e.g., determining an address of a routing processor for receipt of the configuration information), and for storing configuration information that may be reported by routing processes from time to time via bus 212. Update images process 504 includes watchdog timers that notice when a configuration of a routing process has changed, and when such a process is no longer responding. Update images process 504 may execute a reset on any routing process (or processor) in an attempt to re-establish proper operation of a routing process (or processor). Image store 503 may contain a description of the state of each routing process managed by update routing memory process 406. Update images process 504 reads image data from image store 503 and stores image data for access by routing processes as discussed above with reference to map 211. Name store 514, map 211, and group store 518 may receive initial values and be updated from image store 503. For example, identifiers and policy values (including access control values) for virtual members and virtual resources may be stored in name store 514 to be advertised or provided on request by serve names process 512 (e.g., in one implementation only permitted access is facilitated by selectively providing virtual identifiers in accordance with access control values). Image data may include data to be referenced by, and instructions to be performed by one or more routing processes. Update images process 504 monitors routing processes 208 in any conventional manner and initializes and updates image data in map 211 at any suitable time or interval.

A link service request is a request sent by a member or resource of network 101 that can be accomplished with reference to data maintained by a router. Generally, a link service request is completed with a link service reply. Requests for data transfer between members are generally not considered link service requests. Link service requests are generally defined by a protocol of network 101. When router 102 supports more than one protocol, one or more supervising processes may coexist in router 102, for example, one process for each protocol. For example, get link service request process 506 and put link service request 507 perform conventional interprocess communication between supervising process 206 and one or more routing processes 208. Link service requests may be processed in any conventional manner. For example, get link service request process 506 distinguishes fabric control requests, name service requests, and broadcast requests and routes respective requests to control fabric process 508, serve names process 512, and broadcast process 516. Each of these processes prepares a suitable reply for use by put link service reply process 507. Put link service reply process 507 provides the reply to the routing process that made the request. Table 4 describes representative link service requests and processing. All of the processes described in Table 4 may invoke action by put link service reply process 507 to generate a suitable reply to each link service request. A reply may describe result conditions or error conditions concerning the link service request. A proxy process 418 performed by managing process 204 may initiate any control frame for a virtual member or resource (e.g., initiate a link service request, log-in a virtual member, or designate a quality of service for a virtual resource).

TABLE 4

| Link Service Request/ Reply | Description of Processing |
| --- | --- |
| Abort a transaction | Control fabric process 508 revises log 510 and notifies statistics gathering processes (if any) so that the transaction identified in the link service request is interrupted without completing the request of that transaction. |
| Remove a connection | Control fabric process 508 revises log 510 and notifies statistics gathering process (if any) so that the path identified in the link service request is interrupted. Such a path may be a dedicated path. Ports involved along the path (or paths) are freed for general use. |
| Log-in | Control fabric process 508 revises log 510 and may notify routing process 208 to report current members of the network to administrating process 202. Serve names process 512 revises name store 514 with a new or unused name for the device. A port is identified to the device that desires to become a member of the network via the port. |
| Log-out | Control fabric process 508 revises log 510 and may notify routing process 208 to report current members of the network to administrating process 202. Serve names process 512 revises name store 514 to disassociate the name from the device that was a member. A port is disassociated from the device to remove the member from the network. |
| Implement a quality of service | Control fabric process 508 revises log 510 and map 211 from which routing process provides the quality of service specified in the link service request. |
| Implement a buffer credit or grant | Control fabric process 508 revises map 211 from which routing process 208 dedicates or frees buffer space for frame handling. When managing process 204 provides a proxy process implicated in this link service request, control fabric process 508 cooperates with managing process 204 to implement the requested credit or grant. |
| Implement a group address | Broadcast process 516 revises group store 518 and map 211 from which routing process 208 operates to broadcast or multicast frames to more than one destination. |

A routing process generally routes frames by analyzing each frame received from a port, selecting suitable routing information, and providing at least the received payload in the same or a corresponding frame to an output port. A routing process provides access to members and resources as requested by a member (or resource) that has suitable permission (e.g., via an access control list), provides quality of service according to suitable policy values, and maintains transactions with physical, logical, and virtual entities. A routing process also obtains and reports statistics. For example, routing process 208 includes statistics store 601, report status and errors process 602, pass link service request process 603, supervisor queue 604, field link service reply process 606, route frame to fabric process 608, manage output queues process 610, manage egress queues 612, egress buffer 614, ingress buffer 616, flow process 618, pass to proxy process 620, routing table 622, subflow process 624, context table 626, virtual flow process 628, virtual context table 630, page table 632, sector table 634, virtual port identifier table 636.

Routing process 208 provides reports 214, 201 to managing process 204. Information reported describes traffic through router 102. Each routing process 208 may accumulate counts of the quantity of frames satisfying a variety of criteria. These counts and data derived with reference to the counts is stored in statistics store 601. Counts may accumulate over a period of time fixed, specified by supervising process 206, or dynamically determined by routing process 208. Data may include one or more of the following computations: average, ratio, net change, rate of change, variance, standard deviation, and binary results from a comparison of a current value of data to a threshold that may be fixed, specified by supervising process 206, or dynamically determined by routing process 208. Access to statistics may be indexed in any conventional manner.

The subject of a count or derivative may be limited to a physical port, logical port, virtual port, flow, subflow, virtual flow, member, or resource identified for example, by analysis of one or more fields in a frame (e.g., pattern matching by a parser circuit).

Report status and errors process 602 reads statistics 601 or determines status, configuration, or error conditions of routing process 208 and prepares a suitable report. Report preparation may be automatic (e.g., on occurrence of an error or lapse of a reporting time period) or polled (e.g., in response to a request 201, 214 from managing process 204).

Pass link service request process 603 formats information recalled from statistics store 601 or received from report status and errors process 602. Pass link service request process 603 also formats information received by flow process 618 so that any portion of a link service request frame may be provided to supervising process 206. Pass link service request process 603 stores the formatted information in supervisor queue 604.

Supervisor queue 604 serves as a buffer between pass link service request process 603 and field link service reply process 606. Supervising process 206 may access supervisor queue 604 in each of several routing processes as described above with reference to bus 212. By buffering link service requests, (a) supervising process 206 may implement priorities for the execution of link service requests (in an order other than as requested) and processing of reports (in an order other than as polled or as available); (b) pass link service request process 603 may specify and revise priorities among outstanding items in queue 604, (c) supervising process 206 may delay processing of particular link service requests or reports, (d) results of processing by supervising process may be noted in queue 604, and (e) field link service reply process 606 may act on replies from queue 604 in any order and at any suitable intervals, allowing route frame to fabric process 608 to implemented priorities without loss of data.

Field link service reply process 606 reads replies from supervisor queue 604 (entered into the queue in response to a link service request or report as discussed above). Reading may be responsive to thresholds to avoid backlog in queue 604, may be upon lapse of a time period (fixed, specified, or determined as discussed above), or may be upon request from route frame to fabric process 608. Field link service reply process 606 prepares a suitable link service reply frame that may include data read from or derived with reference to queue 604 and passes the frame to route frame to fabric process 608.

A fabric is a mechanism that provides access to data among numerous source processes and destination processes. In one implementation a fabric comprises a multi-ported memory allowing any number of source processes to write into the memory and any number of destination processes to read from the memory. In another implementation the fabric comprises a network that makes a copy of data from a source buffer into one or more destination buffers. Source and destination buffers may then be implemented as memories with much simpler access functions: a source buffer is read by the network and written by one source process; and a destination buffer is written by the network and read by one destination process. Network processes at each of several destination buffers may implement multicasting or broadcasting by storing a copy from a multicast or broadcast source that is made available to all destination network processes. For example fabric 213 provides communication among any suitable number of routing processes 208 each having respective processes 610 and 612. Fabric 213 may implement communication with any combination of multiport memory and network technology as discussed above.

Route frame to fabric process 608 reads the destination port identifier associated with data received from any process 606, 618, 620, 624, or 628 and passes the data to manage output queues process 610 with a designation of one or more output queues. From the perspective of fabric 213, output queues of a first routing processor's ingress buffer, may serve as source buffers to be transferred to another routing processor's egress buffer serving as a destination buffer, as discussed above. Route frame to fabric process 608 may read data so as to implement service priorities among processes 606, 618, 620, 624, and 628. The priority of data read may be determined by route frame to fabric process 608 in accordance with an identifier of the requesting member, resource, or port (e.g., a source identification), an identifier of a participating member, resource, or port (e.g., a destination identification), which process 606, 618, 620, 624, or 628 provided the data, statistics from statistics store 601 related to a characteristic of the data or related to a process 606, 618, 620, 624, or 628 in a period of time (fixed, specified, or determined as discussed above), a priority associated with the data by the process 606, 618, 620, 624, or 628, or a policy value associated with the data by process 606, 618, 620, 624, or 628. Route frame to fabric process 608 may format the data as the payload of a frame according to framing conventions used for fabric 213 and/or framing conventions used for network 101.

According to various aspects of the present invention, data received for routing by process 608 includes policy values from which a suitable output queue may be determined by route frame to fabric process 608.

Manage output queues process 610 receives frames from route frame to fabric process 608 and transfers each frame to fabric 213. Manage output queues process 610 may maintain a plurality of output queues, each output queue corresponding to a physical port of router 102 (e.g., a port connected to a member that issues frames into router 102 for routing). Manage output queues process 610 may arbitrate among queues to efficiently access fabric 213, or to implement a policy associated with a particular queue or a policy associated with a particular frame. For example, when fabric 213 includes a network as discussed above, manage output queues process 610 may add fabric network framing to hide network 101 framing in the payload of a fabric network frame.

Preferably, frames having different associated policy values (e.g., different traffic class or different class of service) are enqueued into separate queues, subject to queue servicing rules implemented by manage output frames process 610. Further, frames may be enqueued according to source identification, destination identification, and policy values (e.g., one queue for every combination of physical input port identifier, traffic class value, and physical output port identifier).

Manage egress queues process 612 receives (or recalls) frames from fabric 213 and transfers each frame to one or more egress buffers 612, each egress buffer may correspond to a physical output port of router 102 (e.g., a port connected to a member that consumes frames from router 102 after routing). Manage egress queues process 612 may maintain a plurality of egress queues to effect arbitrated access to one or more egress buffers and/or to effect flow control back toward fabric 213. Arbitration and/or flow control may implement a policy value associated with a particular egress buffer or a policy value associated with a particular frame. Data from fabric 213 may be reformatted by manage egress queues process 612 to comply with signaling and framing standards of network 101. For example, when fabric 213 includes a network as discussed above, manage egress queues process 612 may strip fabric network framing to expose network 101 framing.

Egress buffer 614 supplies frames to network 101. Egress buffer 614 may include a large number of queues for storing frames that await transmission onto network 101. While in storage, a frame in a queue may be revised, for example, to accomplish support for virtualization. When a frame carries a payload from a nonvirtual transaction that is to be delivered to a participant of a virtual transaction, manage egress queues process 612 may: (a) parse the frame from fabric 213; (b) determine that modification is desirable; (c) recall at least a virtual destination port identifier from virtual context table 630; and (d) modify the frame's destination port identifier in accordance with the virtual destination port identifier before transmitting the payload to network 101.

Ingress buffer 616 receives frames from network 101. Ingress buffer 616 may include a large number of queues for storing frames that await transmission onto fabric 213. While in storage, a frame in a queue may be revised, for example, to accomplish support for virtualization.

Flow process 618 reads frames from ingress buffer 616, parses, classifies, and processes each frame as described in Table 5.

TABLE 5

| Frame Contents | Description of Processing |
|---|---|
| Link service request | When parsed results indicate the frame is a link service request, flow process 618 passes any or all of the frame to pass link service request process 603. Indications that a frame is a link service request include the destination address portion of the frame (e.g. an address reserved for link service requests according to a protocol of network 101), a value describing a type of frame, and/or a value describing a protocol to which the frame is compliant. |
| Frame for notice to a proxy or for action by a proxy | When parsed results indicate the frame is of a type to be supplied to a proxy, flow process 618 passes any or all of the frame to pass to proxy process 620. Such a frame may be a control frame or data frame regarding a transaction involving a virtual member or resource. Such a frame may notify the proxy, effect the state of a proxy, or trigger suitable action by the proxy. Indications that the frame is of a type to be supplied to a proxy include the destination port identifier portion of the frame (e.g. a network address reserved for a proxy according to a protocol of network 101, or any fields of the frame identified for processing by a proxy, for example, by an associated flag obtained from routing table 622 accessed in accordance with a portion of the frame), a value describing a type of frame, and/or a value describing a protocol to which the frame is compliant. |
| Frame unrelated to a subflow or virtual flow | When parsed results indicate that the frame is unrelated to a subflow or a virtual flow, flow process 618 passes any or all of the frame to route frame to fabric process 608. Indications that a frame may be unrelated to a subflow or virtual flow include an associated flag obtained from routing table 622 accessed in accordance with a portion of the frame, or simply a value of a destination port identifier field of the frame. |
| Frame related to a subflow | When parsed results indicate that the frame is related to a subflow, flow process 618 passes any or all of the frame to subflow process 624. Indications that a frame is related to a subflow include an associated flag obtained from routing table 622 accessed in accordance with a portion of the frame. |

TABLE 5-continued

| Frame Contents | Description of Processing |
|---|---|
| Frame related to a virtual flow | When parsed results indicate that the frame is related to a virtual flow, flow process 618 passes any or all of the frame to virtual flow process 628. Indications that a frame is related to a virtual flow include an associated flag obtained from routing table 622 accessed in accordance with a portion of the frame, and/or a value of a destination port identifier field of the frame. |
| None of the above | Flow process 618 may drop the frame by freeing the ingress buffer space allocated to the frame. Flow process 618 may raise a countable statistic or an error condition in concert with dropping a frame. Flow process 618 may pass any portion of the frame to report status and errors process 602 to facilitate rectifying the error condition or avoiding future error conditions. |

Any of the references made to routing information discussed in Table 5 may provide one or more policy values for output queue selection as discussed above.

Pass to proxy process 620 may associate the data (corresponding to a frame) received from flow process 618 with an identifier of a particular proxy for member process 418 and revise the frame accordingly. An identifier may be selected from a range of network port addresses not used by router 102 yet reserved to router 102 by a protocol of network 101 (e.g., well known addresses). The identifier may further include an object reference. Pass to proxy process 620 then passes the data and the proxy identifier to route frame to fabric process 608. In one implementation, when a requester directs a control frame or a data frame to a virtual entity, the frame includes a destination port identifier that identifies the proxy that acts for the virtual entity. To accomplish passing to the proxy, pass to proxy process 620 may route such a frame without revision.

Routing table 622 includes cross reference information received from map 211 and information determined by flow process 618. For example, routing information as discussed above may include a tuple (e.g., an association) of source identifier/destination identifier that may be used to obtain routing information for egress (e.g., an identifier of a queue, a logical router port identifier, or a physical router port identifier). Such a tuple is herein called a flow; and, a row of the routing table is herein called a flow entry. Generally, information regarding one flow may be organized in one row of routing table 622. Where more than one row is made necessary by the quantity of information or for representing many-to-one relationships, a portion of a row (e.g., a flow identifier) may be used in a subsequent access of the routing table. The subsequent access is herein called a subflow. Subflow entries may be used to describe resources on a subnetwork of a member as discussed above.

The routing information for egress recalled from routing table 622 may correspond to an output queue 610, a fabric network address, an egress queue 612, and/or an egress buffer 614. Particular advantages are realized by identifying each of the above to the same physical port identifier so that the destination port identifier is sufficient to direct the frame out of the appropriate physical port of router 102. The same tuple may be used to obtain (e.g., simultaneously with the physical port identifier for egress) one or more policy values used to implement policies as discussed above.

Information determined by flow process 618 may include an identifier of a resource from a request frame. For example, when a request frame includes a destination port identifier of a member, a transaction identifier, and a resource identifier (the resource being on a subnetwork of the member) subsequent frames from the requesting member or from the resource that accomplish data communication may omit the resource identifier relying on the destination member identifier and/or the transaction identifier for routing. In such a case flow process 618 may determine that the frame is a request conforming to a protocol that makes such an omission and store in routing table 622, context table 626, or virtual context table 630 the resource identifier in association with the transaction identifier and/or in association with the destination port identifier for future reference.

Subflow process 624 generally receives from flow process 618 data regarding a frame addressed to a member and a resource on a subnetwork of the member. Subflow process 624 associates the data with a router port identifier. Subflow process 624 may obtain the router port identifier and policy values from routing table 622 as a flow lookup discussed above. Subflow process 624 may read a subflow (e.g., perform a subflow lookup) from routing table 622 accessed in accordance with a portion of the data and/or information recalled from the flow lookup. Subflow process 624 may further read context table 626 as directed by information recalled in the flow lookup and/or the subflow lookup and/or by a portion of the data. Subflow process then applies policies indicated by policy values that may be associated with the flow and/or the subflow entries in routing table 622 and/or associated with the resource entry in context table 626. Subflow process 624 then passes the data, the router port identifier, and policy values, to route frame to fabric process 608.

When a transaction is begun involving one or more virtual devices (herein called a virtual transaction) routing process 208 identifies a frame that signals the beginning of the virtual transaction, and in response to that frame and in accordance with the protocol identified to the virtual transaction, performs the remainder of the virtual transaction in concert with beginning and performing a corresponding transaction with a physical member and/or device (herein called a nonvirtual transaction). The protocol used in the nonvirtual transaction may differ from the protocol used in the virtual transaction. In other words, there may be no one-to-one correspondence between frames (e.g., frames for inquiry, data transfer, reply, status, and error conditions) of the virtual transaction and frames of one or more nonvirtual transactions that implement the virtual transaction on nonphysical members and/or nonvirtual resources. Policies implemented for the virtual transaction may differ from policies implemented for the nonvirtual transaction, for example, to assure meeting a policy associated with the virtual transaction.

Virtual flow process 628 receives from flow process 618 data corresponding to a frame of a virtual transaction (e.g., addressed to a virtual member and/or virtual resource). Virtual flow process 628 associates the data with a router port identifier and prepares data for a frame of a nonvirtual transaction (e.g., addressed to a nonvirtual member and/or a nonvirtual resource). Virtual flow process 628 may obtain the router port identifier and policy values from routing table 622 as discussed above as a flow lookup using a tuple of source identifier/virtual destination identifier. Virtual flow process 622 may read context table 626 as discussed above as a subflow lookup using the same tuple as for the flow lookup accompanied by a portion of the results (e.g., flow identifier) of the flow lookup and/or data from process 618.

A nonvirtual resource may have a state different from the state of the corresponding virtual resource. The state of a virtual resource may be tracked by a proxy as discussed above with reference to proxy state 420. For example, support for a virtual storage resource may allow read/write access in a manner unsuited to efficient operation of a physical resource (e.g., contiguous sectors in reverse order of cylinder spin) so as to satisfy particular efficiencies realized by a process of the requesting member. An implementation of such a virtual storage resource may include caching and buffering as discussed above with reference to cache agent 422. Further, a virtual storage resource may be mapped (e.g., on a sector basis) to any mix of nonvirtual devices and portions of nonvirtual devices. A virtual storage resource may be accessed as a conventional block device having virtual cylinders comprising virtual pages, and virtual pages comprising virtual sectors.

Virtual flow process 628 may use identifiers recalled from the flow lookup, the subflow lookup, and/or the context table 626 to determine a nonvirtual resource identifier; and then refer to page table 632 and sector table 634 to obtain virtual to nonvirtual cross references from which a nonvirtual page and sector (e.g., a nonvirtual block) may be identified. After the nonvirtual destination port and nonvirtual block are determined, virtual flow process may perform a logical flow lookup and possibly a logical subflow lookup to obtain a router output port identifier, nonvirtual resource identifier, and policies to implement. In an alternate implementation, the router output port identifier, nonvirtual resource identifier, and policy values are obtained directly with the initial flow and subflow lookups without a logical flow or logical subflow lookup.

Particular advantages are realized by locating logical to physical and virtual to nonvirtual cross reference information in tables that may be accessed by multiple routing processes (e.g., shared memory). Port table 636 may be stored in shared memory indexed by logical port identifier to provide a corresponding physical port identifier (more than one may be provided for broadcast and multicast applications). A logical port identifier may correspond to routing information provided by an administration process as discussed above (e.g., a group name, zone name, path name, or suitable reserved label). Virtual context table 630 may be stored in shared memory indexed by an identifier of the virtual member, virtual resource, and/or virtual transaction to provide a corresponding nonvirtual transaction identifier. In an alternate virtual flow process implementation, the virtual flow process obtains the router output port identifier (e.g., a logical to physical lookup) and may also obtain policy values by accessing either port table 636 or virtual context table 630.

Virtual flow process 628 identifies data to route frame to fabric process 608 for use in one or more frames for one or more nonvirtual transactions that implement the virtual transaction indicated by frames received by flow process 618. Data may include the router output port identifier, nonvirtual resource identifier, nonvirtual block, nonvirtual transaction identifier, and policy values.

A method for routing frames according to various aspects of the present invention includes any method that includes one or more of the following: (a) implementing different policies for each of different resources that may share a common member identifier, (b) implementing one or more nonvirtual transactions to accomplish the intent of a virtual transaction; (c) obtaining nonvirtual block identification corresponding to virtual block identification; (d) arbitrating among queues on the basis of a grant pool for each of a plurality of service types or traffic classes, and (e) implementing a stall for one of several resources that share a common member identifier or resource identifier. For example, a method 700 of FIGS. 7–10 that is performed by any router 102–105 as described above and may be performed by any routing process 208 proceeds as follows.

To process a flow, a frame is received comprising indicia of a desired flow (702). The desired flow may be indicated by any combination of a source identifier, a destination identifier, and a protocol. Indicia of the flow are used as an index (704) to obtain flags, policy values, and an output queue identifier, all from one or more tables (e.g., each table may be a data structure, a record of a database, or a set of data structures or records of a database). The flags are then used (706) to determine which of five processing scenarios should apply to the subject frame.

Use as an index includes use in an exact match search and use in a maximal match search. Searching may be facilitated by content addressable memory circuitry that receives the index (e.g., a tag having data and ternary designations: must match, must not match, don't care) and provides flags indicating the extent of the match. When more than one match is found, use of the maximal match is preferred. A match may be better (more maximal) than another match when more fields of the tag match, when higher priority fields of the tag match, or a weighted combination of component fields matches. When tag fields are arranged by priority (or weight), a longest match (e.g., greatest number of contiguous fields or bits) may provide a maximal match. A field value may indicate a wild card accepting any result as a match.

A transaction may include several frames to be routed. In the following discussion, routing frames of a transaction is accomplished by routing all frames of a transaction primarily for control as control frames and all frames of a transaction primarily for data transfer as data frames.

If the flags indicate the frame is a link service request, the frame is passed (708) to a supervising process that accomplishes the intent of the link service request as discussed above. As a consequence of processing the link service request, data may be provided by the supervising process for a frame to be placed (720) in the output queue identified previously (704).

If the flags indicate a type-A nonvirtual frame, one or more policies are applied (718) to effect a quality of service and the frame is placed (720) in the output queue identified previously (704).

If the flags indicate a type-B subnetwork transaction, a resource identifier and policy values associated with the resource identifier are obtained (712) first by parsing the frame according to the protocol to determined the resource identifier of the subnetwork of the destination and second by using the resource identifier in a subflow lookup to get policy values that have been associated to the destination port identifier and the resource identifier. Then one or more policies are applied (718) to effect a quality of service, and the frame is placed (720) in the output queue identified previously (704).

If the flags indicate a type-C virtual data frame, the identifiers determined by prior parsing (702) are taken as virtual source identifier and virtual destination identifier. Data for a nonvirtual transaction frame is obtained (714) by further parsing the received frame (702) according to the protocol to determine a virtual resource identifier and virtual block description. The virtual resource identifier is translated by reference to one or more cross-reference tables (e.g., tables of the form discussed above at 704) to a nonvirtual resource identifier. The virtual block description is translated by reference to one or more cross-reference tables (e.g., tables of the form discussed above at 704) to a nonvirtual block description. Processing as discussed for type-B frames may be accomplished for the nonvirtual destination port identifier and the nonvirtual resource identifier; or, policies identified with the nonvirtual destination identifier and nonvirtual resource identifier are applied (718) and a frame comprising the nonvirtual resource identifier and the nonvirtual block description is placed (720) in the output queue identified to the nonvirtual destination port identifier (704).

If the flags indicate a type-D virtual control frame, the frame is identified (716) to be routed to a suitable proxy, the frame is placed (720) in the output queue associated with a managing process 204 or proxy process 418 (704).

After a suitable frame has been placed in an output queue, processing continues with the next frame (702).

To implement a policy according to various aspects of the present invention, data particular to a transaction is maintained up to date. Such data may include the state of a resource, proxy state, and/or cross-reference information for determining a nonvirtual transaction for implementing a virtual transaction. For example, when administrating process 202 defines a new or revised virtual member or virtual resource, managing process 204 may launch a new proxy process 418, and managing process 204 in cooperation with supervising process 206 may update map 211 for use by all routing processes 208. Proxy state is consequently updated. When a transaction is completed normally or terminated abnormally, data particular to the transaction (e.g., a saved resource identifier, or statistics) may be discarded and processing resources that may have been allocated are freed. Routing process 208 maintains transaction data (802) by cooperating with a supervising process for shared access to map 211.

Queue controls (804) and arbiter controls (806) are set in accordance with policy values. Queue controls may designate priorities among competing queues, flow control strategies and thresholds for each queue (e.g., actions to take when a queue is getting full or getting empty), and/or effect a stall on a queue preventing further input (e.g., allowing an input queue to empty) or preventing further output (e.g., allowing an output queue to fill). Arbiter controls may designate flow control strategies and thresholds for each of a group of queues of the same priority (e.g., same traffic class). Queue controls and arbiter controls may be set by register transfer instructions when queue control and arbitration are effected by logic circuits. Application of a policy may include accumulating (808) statistics related to frames routed and/or queue and arbiter operations for use by a managing or administrating process as discussed above.

According to various aspects of the present invention, multiple copies of information from a frame are avoided to avoid the time memory space consumed by making a copy. The one copy of frame data may persist in an ingress buffer until all reference to it has been accomplished (e.g., a corresponding frame is transferred to the fabric or the frame is dropped). In the discussion above regarding passing a frame or data of a frame among processes, the data that is passed may be merely a pointer to the ingress buffer where frame data can be read indirectly (via the pointer), a handle to context where pointers and simple values are stored, or a pointer to a row of a table where a translation may be obtained.

Placing a frame in an output queue may be accomplished in a manner that implements a policy. The result of such placement in a non-blocking router is that the frame is eventually transmitted out of the router in accordance with a priority. The entry in the queue may be a reference to frame data in an ingress buffer as discussed above, or a handle to a context having pointers and simple values as discussed above. Each queue may be a linked list of ingress buffer contents.

Placing an item into such a queue (enqueueing) may include inserting an item into a linked list (e.g., storing revised values of pointers). A policy may affect any of several steps in routing a frame. Routing may include, for example, enqueueing a frame for transmission onto fabric 213 by making reference in a suitable first queue to the frame as it is stored in ingress buffer 616; servicing the first queue by a first arbiter for transmitting the frame onto fabric 213; receiving the frame (e.g., essentially the payload) from fabric 213 into egress buffer 614; enqueueing the received frame by making reference in a suitable second queue to the frame as it is stored in egress buffer 614; and servicing the second queue by a second arbiter for transmitting the frame to network 101. The first and the second arbiters may use the same or different arbitration techniques.

The amount of space available for frames in a buffer used for a queue may be managed by several protocols of fabric 213 and network 101 (e.g., backpressure logic or techniques of the type used in Fibre Channel) wherein requests for buffer space are sent to a receiving port and granted with the result that an integral number of credits corresponding to reserved buffer space are received by the requesting port. Buffer contents may be later transferred to another buffer or region of memory where available space must be requested in advance in a similar manner (e.g., a buffer dedicated to a particular resource at the end of the segment, or a number of buffers (e.g., end-to-end) along multiple segments (e.g., hops) of a communication path through network 101. As used herein, a grant or grant pool refers to a buffer space allocation mechanism at any level of communication protocol (e.g., a credit or allowance in addition to a credit). Grants may be associated with a resource, a segment, a port, an ingress or egress buffer, or a fabric channel.

Any conventional arbitration may be used for arbiters as discussed above. Particular advantages are realized according to various aspects of the present invention by implementing queues with timers. Each timer may facilitate minimal fractional bandwidth for one or more queues. During a period of time when no timer is lapsed, arbitration may proceed in a round robin manner or in a manner as discussed below with reference to FIGS. 9 and 10. For simplicity, FIGS. 9 and 10 describe arbitration for queues in an ingress buffer. Alternate implementations of router 102 provide such arbitration for queues in the egress buffer. A non-blocking router may omit operations (e.g., 908, 914, 1006, 1014) related to stalling a queue in either or both of the ingress and egress buffers.

When grants for an output queue are received (902), the quantity of grants may be added (904) to a grant pool associated with the queue. The total quantity of grants (corresponding to a total quantity of space for frames at the receiving end) may be determined (906) as a so called grant pool depth. If the queue is associated with a flow that has been stalled, the frame may be left (910) in the queue (e.g., in the ingress buffer) and processing continues with another frame (922, 702). If the flow is not stalled, it is determined whether there are sufficient grants for transmitting a frame from the queue. If not, the flow is stalled (914) by setting a flag (e.g., the flag that is tested at 908). Otherwise, the frame is transferred (916) to the fabric 213 and removed from the queue; the grant pool is decremented (918); a transferred quantity counter (TQC) is adjusted (920) and processing continues with another frame (922, 702).

A method for arbitrating among output queues of the same priority, according to various aspects of the present invention, includes any method that enables all other queues of a group of queues to empty as much as previously emptied from a queue of the group. For example, method 920 of FIG. 10, on removal of a frame from a first queue (e.g., a queue associated with a source port) of a group of queues, includes adding the size of the transferred frame to the TQC associated with the corresponding source. If the TQC for this source has a value not greater than zero (1004), no further action is taken (1018, 922) and processing continues with the next frame (702). Otherwise, the subflow for this source is stalled (1006) by setting a flag; the positive extent of the TQC (the difference between the TQC value and zero) is assigned (1008) to a variable called the overrun; and the TQC is set (1010) to zero. For each other queue in the group of queues (1012) (assuming all queues in the group have the same priority for transferring frames to the fabric), the queue status is reset (1014) from stalled (if it was stalled) to not-stalled; and the overrun is subtracted (1016) from the TQC for that queue. When all queues of the group have been considered (loop 1012), processing continues (1018, 922) with the next frame (702).

In an embodiment of system 100 having particular synergies for application service providers, storage service providers, and storage area management, network 101 supports protocols of the type known as SCSI protocols over Fibre Channel protocols. Embodiments of this type are implemented in accordance with the SCSI-3 family of standards and compatible specifications described, inter alia, in http://www.t10.org/scsi-3.htm and available through NCITS Online Store managed by Techstreet 1327 Jones Drive Ann Arbor, Mich. 48105 (http://www.techstreet.com/ncits.html), particularly those standards identified as "Information technology—SCSI-2 Common access method transport and SCSI interface module" (CAM), "Information technology—SCSI Architecture Model—2" (SAM-2), (SBC), "Information Technology—SCSI Block Commands—2" (SBC-2), "Information Technology—SCSI Reduced block commands" (RBC), "Information Technology—SCSI-3 Stream commands" (SSC), "Information Technology—SCSI Stream commands—2" (SSC-2), "Information Technology—SCSI-3 Medium changer commands" (SMC), "Information Technology—SCSI-3 Medium changer commands—2" (SMC-2), "Information Technology—SCSI-3 Multi-media commands" (MMC), "Information Technology—SCSI-3 Multi-media commands—2" (MMC-2), "Information Technology—SCSI-3 Multi-media commands—3" (MMC-3), "Information Technology—SCSI-3 Reduced Multi-media commands" (RMC), "Information Technology—SCSI-3 Controller commands" (SCC), "Information Technology—SCSI Controller commands—2" (SCC-2), "Information Technology—SCSI-3 Enclosure commands" (SES), "Information Technology—Object-Based storage devices" (OSD), "Information technology—SCSI Primary Commands—3" (SPC-3), "FIBRE CHANNEL Switch Fabric—2" (FC-SW-2), "Fibre Channel" (FC), "Fibre Channel Protocol" (FCP), "Information Technology—Fibre Channel Protocol for SCSI, Second Version" (FCP-2), and "FIBRE CHANNEL Framing and Signaling" (FC-FS). In other embodiments, SCSI protocols over protocols other than Fibre Channel protocols may be used with ports as discussed above. In other words, a router may support virtual SCSI transactions, for example, over a port that supports a protocol such as SCSI Parallel Interface, Serial Bus Protocol, IEEE 1384 (Fire wire), SSA SCSI-3 Protocol, Scheduled Transfer, and Virtual Interface all of which are the subject of current public standards and draft standards.

According to the terminology defined in protocols for SCSI over Fibre Channel, communication is organized to permit an application client to invoke tasks to be performed by a device server. The communication model generally includes a request from the application client to the device server and a response from the device server back to the application client. A request may be either for device service or for link service. Each task may be part of a task list maintained by the device server. A task may be invoked, specified, and controlled by a series of commands (e.g., linked commands) communicated by the application client to the device server. According to this model, a member may have multiple application clients and each application client may have multiple initiators. Communication from the application client is generally directed to a target that may have multiple device servers and each device server may act as a responder.

As discussed above, communication comprises transactions comprising frames. As defined under SCSI protocols, the communication (e.g., including commands, data, status, and acknowledgements) comprises SCSI I/O operations. As defined under Fibre Channel protocol (FCP), each SCSI I/O operation is accomplished by a Fibre Channel exchange. Whereas an I/O operation includes a request and a response, an exchange includes a series of sequences, and each sequence typically comprises several information units. Each information unit corresponds to a frame as discussed above. Each sequence of an exchange is transmitted from an originator to a responder. If the roles of originator and responder are to be reversed, the originator sends an indication called sequence initiative to the responder and the next information unit is expected from the former responder (now an originator).

When a member port is recognized by another port to which the member is connected, either the port or the member may initiate a login process. Port login is accomplished with FCP IUs with the result that an identifier for the port of the member is established and associated with the port of the fabric (e.g., for system 100, port 160 of member 110 is identified and associated with port 130 of router 102). Port login may also result in a quality of service policy being established for the link between the member and the port (e.g., link 150) and may define of affect policies for all paths that include that link. Functions of FCP that may be included in such a quality of service policy include class of service, intermix mode, stacked connect requests, sequential delivery, dedicated service (e.g., connection-oriented), simplex, duplex, camp on, buffered service, priority, preference, initial responder process associator; capabilities for acknowledgement, data compression, data encryption, clock synchronization; X_ID interlock, error policy support, categories per sequence, open sequences per exchange, and end-to-end credits (or grants as discussed below).

The correspondence of a typical series of SCSI I/O operations to FCP IUs is described in the aforementioned specifications and is partially summarized in Table 6. The target (e.g., a resource as discussed above) may be a block oriented data storage device or a process. Generally, a target may include many logical units, each logical unit having a logical unit number (LUN). Storage is addressable by a logical block address for a read exchange or a write exchange. A task is an object (e.g., a process) in a logical unit that accomplishes work specified by the command or by a sequence of commands.

TABLE 6

| SCSI I/O Operation Primitive | FCP Exchange Primitive |
| --- | --- |
| Command request. A command is specified by a command descriptor block (CDB) in an initial frame of a request. | Unsolicited command information unit (IU) (e.g., Fibre Channel Protocol Command: FCP_CMND). An FCP_CMND IU includes a CDB and may include a command reference number (CRN) to assure sequential performance of commands by a task. |
| Data delivery request. | Data descriptor IU (e.g., FCP Transfer Ready: FCP_XFER_RDY). Used in a write exchange to inform the initiator that the responder is ready with a buffer to receive a particular block from the initiator. |
| Data delivery action. | Solicited data IU (e.g., FCP_DATA). Used to transfer data in a read or write exchange with a storage device. For data exchange with a process, the send and receive commands are defined analogously. |
| Send Command Complete. | Command status IU (e.g., FCP response: FCP_RSP). Used to indicate that a SCSI command has been completed. |
| Request or Acknowledge command completion. | Confirmation IU (e.g., FCP_CONF). |

SCSI commands include, inter alia, inquiry, report LUNs, block commands (e.g., read, write, send, and receive) and extended copy. An inquiry command provides the initiator with parameters of the target or a component logical unit of the target, such as device type for compatibility to receive various SCSI commands. Parameters may include end-to-end credits (or grants) allocated by the target to the initiator for a particular logical unit, process, and/or task. A request to report LUNs provides the initiator with a list of logical unit numbers of a specified target. An extended copy command directs data from one set of logical units to be copied to another set of logical units (or to the same set of logical units).

SCSI is considered an upper level protocol (ULP) and Fibre Channel a lower level protocol (LLP). The lower level protocols include: the physical interface including media, transmitters, receivers, and their interfaces (FC-0); the transmission protocols including serial encoding and error control (FC-1); the transport protocols including frame format, sequence definitions, transfer of data blocks, and classes of service (FC-2); and services concerning several ports at a node (e.g., operations on a hunt group) (FC-3). The upper level protocols (FC-4) generally include application protocols such as SCSI.

An information unit is transported as a frame. A frame is defined as an FC-2 construct that includes signals recognized as: a start of frame (SOF), a payload, and an end of frame (EOF). For an information unit, the payload is further defined to include an FC-2 header, an FC-2 payload, and a cyclic redundancy check (CRC). Further, for an information unit, the FC-2 payload includes one or more optional headers, an FC-4 header and an FC-4 payload. The information conveyed by the various portions of an information unit is described in Tables 7 and 8, below. Each frame is formed so that the beginning and extent of each of these portions is determinable under the conventions of the protocols. Generally, parsing refers to determining the beginning, extent, and meaning of portions of a frame; and formatting generally refers to arranging data for transmission as a frame by placing data in the order defined by the protocols.

A flow, as discussed above may correspond to an exchange identifier (X_ID) comprising an S_ID and a D_ID. A fully qualified exchange identifier (FQXID) further includes an initiator identifier, a target identifier, an OX_ID, and an RX_ID. The FQXID (as defined in the Fibre Channel specifications) is not a complete I_T_L nexus (as defined in the SCSI specifications) comprising an initiator identifier, a target identifier, and a logical unit identifier; or, an I_T_L_Q nexus, comprising an initiator identifier, a target identifier, a logical unit identifier, and a task identifier or tag. A subflow, as discussed above may correspond to an I_T_L nexus or an I_T_L_Q nexus.

TABLE 7

| FC-2 | FC-4 | | SCSI |
| --- | --- | --- | --- |
| Delimiter | Start of frame | SOF | |
| Payload | FCP Header | R_CTL | |
| | | F_CTL | |
| | | CS_CTL | |
| | | PRIORITY | |
| | | DF_CTL | |
| | | TYPE | |
| | | OX_ID | |
| | | RX_ID | |
| | | SEQ_ID | |
| | | SEQ_CNT | |
| | | S_ID | |
| | | D_ID | |
| | | RO | |
| | FCP Payload | Network header | |
| | | Association header | |
| | | Device header | |
| | | FC-4 header | LUN |
| | | | CRN |
| | | | Task attributes |
| | | | Task management |
| | | | R-W-Add |
| | | | CDB → OP_CODE |
| | | | LBA |
| | | | XFER_L |
| | | | PARAM_LIST_L |
| | | | ALLOC_L |
| | | | CONTROL |
| | | | FCP_DL |
| | | Data | |
| | Error Control Code | CRC | |
| Delimiter | End of frame | EOF | |

TABLE 8

| Field | Description |
| --- | --- |
| SOF | Any of several ordered sets that indicate the beginning of a frame. Each start of frame may identify a type of frame to facilitate parsing (e.g., first frame of a sequence, other than the first frame of a sequence, class of service, or type of sequence that follows based on class of service). |
| R_CTL | Routing controls. Includes information category describing the information unit as solicited or unsolicited as control, data, command, data-descriptor, or command-status. May identify the frame in cooperation with TYPE as link control (e.g., ACK), extended link services, or a data frame. Information category may identify frames as FCP_CMND, FCP_XFER_RDY, FCP_DATA, FCP_RSP, and FCP_CONF. |

TABLE 8-continued

| Field | Description |
| --- | --- |
| F_CTL | Fabric controls. May specify that the frame is from an initiator vs. a recipient; from an originator vs. a responder; whether the frame is part of a sequence that is the first, last, or neither the first nor the last sequence of the exchange; and whether the frame is the last vs. not the last frame of a sequence. Fabric controls may further specify if a transfer of sequence initiative is to take place. Fabric controls may include a flag that specifies whether to include PRIORITY in place of CS_CTL. |
| CS_CTL | Class specific controls. For example, Class 1 is for a connection-oriented service between initiator and target; Class 2 is for a connectionless multiplexed service with acknowledgement; Class 3 is for a connectionless multiplexed service without acknowledgement (e.g. with possible preference indication); Class 4 is for a virtual circuit that provides fractional bandwidth between communicating ports, in-order delivery, and acknowledgment; and Class 6 is for multiple simultaneous connection-oriented services between the same two ports. Class 1 controls may indicate simplex or duplex. Class 1 and class 6 controls may indicate stacked connect request, camp on, and/or buffered functions. Class 2 and class 3 controls may indicate priority delivery (e.g., a 1-bit value for preference on/off). Class 4 controls may specify a virtual circuit identifier VC_ID. A QoSF associates S_ID, D_ID, and VC_ID to identify all frames to which the guaranteed bandwidth (and latency) apply. |
| PRIORITY | An integer value (e.g., seven bits) indicating to a router having more than one queue and a serving process that must choose from several queues (e.g., input port queues, processing queues, output port queues) which of several queues to service next. The PRIORITY value may include a PREEMPTION bit for rudimentary high/normal or normal/low priority determinations. |
| DF_CTL | Data frame controls. May specify whether or not the FCP payload includes optional headers. |
| TYPE | Data structure type. May indicate communication protocol, for example, SCSI, SNMP, IP, internal FC-SW, or VI. May indicate IU types for that protocol. For example, for a SCSI command, TYPE in cooperation with R_CTL indicates the frame is formatted to convey any SCSI command (e.g., FCP_CMND having a CDB), to convey data, or to convey an extended link service request (e.g., FLOGI, PLOGI, or RTIN). |
| OX_ID | Originator's exchange identifier. May be assigned by an FC-4 process (e.g., a ULP). |
| RX_ID | Responder's exchange identifier. May be assigned by an FC-4 process (e.g., a ULP). |
| SEQ_ID | Sequence identifier. May be assigned by an FC-4 process (e.g., a ULP). |
| SEQ_CNT | Sequence count indicates a serial number of the frames having the same SEQ_ID. Useful for maintaining frames in-order. |
| S_ID | Source identifier. Identifies the network port that transmitted the frame. Typically a 24-bit number that identifies the initiator. It may be divided into three 8-bit portions designating domain (an identifier of a router, e.g., router 102), area (an identifier of a physical output port of the router, e.g., 130), and loop address (an identifier of a resource on a loop serviced by the port). |
| D_ID | Destination identifier. Identifies the network port intended to eventually receive the frame. Typically a 24-bit number that identifies the target. It may be divided into three 8-bit portions designating domain, area, and loop address. The D_ID may specify a group address or a well known address. Well known addresses are reserved values for, inter alia, a multi-cast server, a clock synchronization server, a security key distribution server, a time server, a directory server, a broadcast alias, an alia server, a management server, a quality of service facilitator (QoSF), a fabric controller (e.g., managing process 204), or a fabric port. |
| RO | Relative offset. A displacement in bytes describing the first byte of a payload relative to a data buffer that was read to form the payload or a data buffer that will be written when the payload is delivered to its destination. The relative offset may be designated as random or continuously increasing for different information categories. |
| Network header | Includes, respectively for S_ID and for D_ID of the FCP header, a designation of an authority that assigned a name (e.g., CCITT, IEEE) and a name identifier (e.g., 60-bit value, WWPN). |
| Association header | Includes, respectively for S_ID and for D_ID of the FCP header, a process identifier (e.g., a 56-bit object reference used with CORBA). |
| Device header | Provides to a ULP additional identification of the exchange already identified by the FCP header. |
| LUN | Logical unit number. Identifies a resource of the member at the destination network port. May be a WWPN or a suitable 64-bit identifier. |
| CRN | Command reference number. May be used to assure that SCSI commands are performed in-order. |
| Task attributes | May specify which task queue, type of task queue, and the position in that task queue at which the task defined by this exchange is to be inserted. For example, simple queue, head of queue, ordered queue, ACA queue, and untagged task. |
| Task management | Specifies operations on a logical unit and/or a task queue associated with a logical unit, such as: abort task set, clear task set, reset a logical unit, reset a target, and clear an ACA. |
| R-W-Add | May indicate by a single bit (facilitating parsing) whether the CDB is for a read command or a write command or neither (and analogously a send or receive command referring to a target process). May also specify an additional length for an extended length CDB. An extended length CDB may convey a virtual LUN through a fabric. |
| CDB | Command descriptor block. |
| OP_CODE | Operation code. Specifies the SCSI command (e.g., PLOGI, REPORT LUNS, READ, WRITE, SEND, RECEIVE) |
| LBA | Logical block address. May include page number (e.g., 11 bits), sector number (e.g., 11 bits), and block offset (e.g., 11 bits) designating a 512-byte block that is a portion of a sector. |
| XFER_L | Transfer length. |
| PARAM_LIST_L | Parameter list length. |
| ALLOC_L | Allocation length. |
| CONTROL | May specify whether the command is part of a set of linked commands. May also indicate controls for a cache maintained by the device server, for example, specifying to disable page output from the cache (DPO), and force unit access (FUA) to supercede cache access. |
| CRC | Any code, typically a cyclic redundancy check code, that may be used by the receiver to verify the integrity of all or a portion of the transmitted payload. |
| EOF | Any of several ordered sets that indicate the end of a frame. Each end of frame may identify a type of frame to facilitate parsing or link control functions (e.g., termination of a class 4 circuit, content of the frame is invalid, last frame of a sequence, or other than the last frame of a sequence). |

Table 9 briefly describes some of the contents of FCP IUs that accomplish a SCSI write command. The IUs in Table 9 form one exchange. Each IU is a sequence of that exchange. For each IU, the S_ID identifies the transmitting port (the originator, generally having sequence initiative) and the D_ID identifies the receiving port. These alternate, though the identity of the initiator and the target are unchanged throughout the exchange. Note that the LUN is conveyed in the FCP_CMND CDB and is not included in the FCP_XFER_RDY, FCP_DATA, or FCP_RSP IUs. To implement a quality of service at the logical unit level, the logical unit number corresponding to the exchange must be recorded from the FCP_CMND IU; and, referred to for other IUs of the exchange.

TABLE 9

| Information Unit | Brief Description of Selected Particular Contents |
|---|---|
| FCP_CMND | SOFi2 (Class 2); OX_ID; S_ID is originator of this exchange; S_ID is initiator of this FCP_CMND sequence; This is the first frame of the sequence; End sequence (i.e., this frame is the end of the FCP_CMND sequence); Transfer sequence initiative to responder; EOFn (normal); |
| ACK | SOFi2; RX_ID; EOFt (terminate); |
| FCP_XFER_RDY | SOFi2; FQXID; S_ID is responder in this exchange; S_ID is initiator of this FCP_XFER_RDY sequence; End sequence; Transfer sequence initiative to initiator; RO from LBA to be written; EOFn; |
| ACK | SOFi2; EOFt; |
| FCP_DATA (one of several, each followed by an ACK) | SOFi2; FQXID; Originator; Initiator; End sequence; Transfer sequence initiative; data to be written at RO from LBA; EOFn; |
| ACK | SOFi2; EOFt; |
| FCP_RSP | SOFi2; FQXID; Responder; Initiator; Last sequence of this exchange; End sequence; Transfer sequence initiative; EOFn; |
| ACK | SOFi2; EOFt; |

The terminology used to describe system 100 may differ somewhat from the terminology defined in the FCP specifications. In the FCP specifications, a fabric is an entity having ports that routes frames between its ports using only the D_ID from the FC-2 header. A path is a route through the fabric from a source to a destination. A path may include one or more hops. A fabric may include multiple switches, each switch being an entity defined as a fabric element having ports, a path selector, an address manager, a fabric controller, a router, and a switch construct that transports frames between ports as directed by the router. A router, as defined in the FCP specifications, is an entity within a switch that determines for each received frame what port to direct the received frame so as to accomplish a connectionless delivery. System 100 is described herein in broad terminology as an example of an implementation according to various aspects of the present invention. To prepare an FCP SCSI implementation according to various aspects of the present invention, the specific functions of the FCP and SCSI protocol specifications are generally mapped as an instance of the functions and structures described herein that may bear the same or different nomenclature. Access controls discussed with reference to system 100 are enforced by a router or a proxy, whereas access controls under SCSI and FCP protocols may be enforced by the target (e.g., a device server).

As discussed above, routing information as determined by an administrating process or a managing process may include an I_T_L nexus (or I_T_L_Q nexus) for a virtual or nonvirtual member or resource. For example, a managing process may launch a proxy for each I_T_L or I_T_L_Q nexus that refers to a virtual identifier (e.g., a virtual member, or a virtual LUN of a nonvirtual or virtual member).

A router, according to various aspects of the present invention, includes any switch that implements architecture 200 as discussed above. In one implementation, a router includes a supervising processor and a plurality of routing processors, the routing processors being coupled to a fabric comprising a ring network. In another implementation, the functions of routing process 208 are implemented in an integrated circuit comprising a frame processor, multiple interfaces for ports to network 101, and circuits that implement a serial slice of the ring network of the fabric. For example, router 102 of FIGS. 11–14 includes managing processor 1112; local console 1102 coupled to managing processor 1112; remote console 1106 coupled via bus 1104 to managing processor 1112; host bus adapter 1140 coupled 1142 between managing processor 1112 and a frame I/O port 1198; erasable programmable memory (EPM) 1114 coupled to managing processor 1112; random access memory 1116 coupled to managing processor 1112; and a plurality of routing circuits 1150–1152 coupled to managing processor 1112 via local area network (LAN) bus 1132, EPM bus 1134, and test bus 1136. A ring 1170 connects the plurality of routing circuits to provide functions of fabric 213. Each routing circuit 1150–1152 includes supervising processor 1160, memory circuit 1162, and a plurality of port logic circuits 1186–1188. Each port logic circuit provides several frame I/O ports 1192 and 1194 (for routing circuit 1150); and frame I/O ports 1196 and 1198 (for routing circuit 1152). In one implementation, a router 102 having 20 frame I/O ports is formed on one printed circuit board (excluding consoles 1102 and 1106 and network 1104).

A managing processor includes any stored program computer circuit that manages operations of one or more supervising processors by accepting paths from an administrating process, providing reports to an administrating process, providing routing information to one or more supervising processes, governing operation of one or more supervising processes to assure policy effectivity on one or more links, serving as a proxy, and operating a cache—all, for example, as discussed above. For example, managing processor 1112 may include any computer circuit having interfaces to memory and communication buses and cooperating with a host bus adapter. Managing processor 1112 provides a conventional interface to memory for program storage and work space. Program memory, EPM 1114, may include any persistent store (e.g., erasable programmable memory, disk, and RAM) for storage of instructions for processes described with reference to FIG. 4, an operating system, and suitable device drivers. Workspace memory, RAM 1116, may include any memory circuit (e.g., RAM, EPM, cache memory, or disk) for storage of data described with reference to FIG. 4. Managing processor 1112 supports one or more consoles 1102 and 1106 that accept input from an operator. Managing processor 1112 communicates with host bus adapter 1140 via line 1144 to send and receive frames. Managing processor 1112 communicates with supervising processors via a bus (e.g., a local area network) such as LAN 1118, 1132, 1152. Managing processor 1112 transfers data for image updates from EPM 1114 to routing circuit memory (e.g., 1162) via EPM bus 1120, 1134, 1154. Managing processor 1112 communicates with supervising processors for diagnostic, test, and watch dog purposes via test bus 1122, 1136, 1156. In one implementation, LAN 1132 has physical and logical capabilities of the type known as Ethernet (see IEEE Std. 802.3), EPM bus 1134 has the physical and logical capabilities of the type known as a PCI bus (see PCI Local Bus Specification by PCI Interest Group, Portland Oreg.), and TEST bus 1136 has the physical and logical of a conventional asynchronous serial communication interface (e.g., using ASCII character codes for commands, addresses, status, and data). Managing processor 1112 may control fans, power supplies, EPM and other devices using a two wire serial interface of the type known as an I²C (see I²C Bus Communication by Philips Semiconductor).

In one implementation, managing processor includes an Intel Socket 370 440-BX chip set hosting an open sources operating system, for example, of the type known as Linux.

A console provides a GUI for an operator (human or automated) to specify particular values for router configuration and for displaying status, reports, error messages, warnings, and prompts. For example, local console 1102 is coupled in any suitable manner to managing processor 1112. At any time one or more remote consoles 1106 may be coupled via network 1104 to managing processor 1112. Local console and remote consoles are functionally similar in displays and controls. For example, these consoles may be implemented with any client computer (e.g., a terminal, workstation, or personal computer).

A host bus adapter provides an interface for frame communications (e.g., as described above with reference to SCSI). For example, host bus adapter 1140 includes an interface to connect to a physical port of routing circuit 1150 via line 1142. Host bus adapter 1140 may transfer frames or portions of frames after parsing and error correction to managing processor 1112 or RAM 1116 (e.g., directly via lines not shown). Host bus adapter 1140 may transfer data for frames or portions of frames (e.g., payloads) from managing processor 1112, EPM 1114, or RAM 1116 and perform frame assembly in any suitable manner (e.g., determining header and error control data for one or more frames). Data transfer may utilize direct memory access techniques and/or descriptors as discussed below. In one implementation, the managing processor and host bus adapter are provided on a single integrated circuit substrate that provides one or more multi-conductor parallel digital interfaces for coupling to consoles, memory, and routing circuits.

A routing circuit includes any circuit that routes frames according to identifiers (e.g., addresses) as discussed above. For example, router 102 may include one or more routing circuits 1150–1152 each coupled to at least one managing processor 1112 for performing supervising and routing processes as discussed with reference to FIGS. 5 and 6.

Fabric 213 of router 102 (FIG. 2) is implemented by ring 1170 shown functionally as one line though any suitable number of bus or point-to-point conductors are used in various implementations. In one implementation a router 102 has only one routing circuit 1150, simplifying design of ring 1170. Ring output 1172 from one port logic circuit 1186 is coupled (directly or through other port logic circuits) to ring input 1174 of a subsequent port logic circuit 1188.

Alternatively, ring 1170 extends between routing circuits so that each routing circuit 1150 communicates with each other routing circuit 1152. A ring output of a port logic circuit 1188 of a routing circuit 1150 is coupled to ring input of a subsequent port logic circuit of a subsequent routing circuit 1152. A ring permits frame I/O from any physical port of router 102 (e.g., ports 1192, 1194, 1196, and 1198) to be routed to or from any other physical port of router 102.

Each routing circuit supports a multiplicity of router ports, generally of identical functionality. Each router port may be coupled for frame I/O to any one of a member of system 100, another router of system 100 (e.g., an expansion port), a console as discussed above, or a host bus adapter 1140.

A supervising processor includes any stored program computer circuit that manages operations of one or more port logic circuits by accepting maps from a managing process, providing status to a managing process, providing and updating routing information to one or more routing processes, acting on link service requests, providing link service replies, advising proxy processes (e.g., of link service actions, link state, network traffic, events, or configuration) that may affect operations performed by the proxy, managing shared use of communication and memory facilities shared by routing processes, and governing operation of one or more routing processes to assure policy effectivity on one or more links—all, for example, as discussed above. For example, supervising processor 1160 may include any computer circuit having interfaces to memory and communication buses. Supervising processor 1160 may provide any conventional interface to port logic circuits and memory. For example supervisory (SUPRV) bus 1176, 1164 couples supervising processor 1160 to any number of port logic circuits 1186–1188 and to memory circuit 1162. In one implementation, SUPRV bus 1164 has physical and logical capabilities of the type known as PCI bus as discussed above. Supervising processor 1160, any port logic circuit 1186–1188, or memory circuit 1162 may become master of SUPRV bus 1176 for directing data transfer operations. By permitting bus master functions from any port logic circuit, efficient use of SUPRV bus 1164 results. Such use may assure policy effectivity for a particular port. Port logic circuits 1186, 1188 and memory circuit 1162 may include CSRs (e.g., for DMA control configuration) that are mapped to addresses of the PCI bus.

In one implementation, supervising processor 1160 includes a single chip computer having an Intel x86 compatible processor, PCI, I²C, flash memory, GPIO, and memory bus interfaces of the type marketed by AMD as model SC520. Supervising processor 1160 may perform a real time operating system of the type known as Linux as discussed above.

Preferably, operating systems in the managing processor and supervising processor support interprocess communication between several of these processors. For example, in one implementation, interprocess communication is implemented using Common Object Request Broker Agent (CORBA) software of the type that allows processes and subprocesses to be identified (e.g., by an object reference). An administrating processor may obtain the services of any object made available via CORBA hosted on any managing processor or supervising processor. For example, managing process 204 may include objects for access control list maintenance, policy value maintenance, group membership maintenance, zone membership maintenance; and, supervising process may include objects for statistics probes (e.g., permitting control of statistics gathering as to what to gather and when), and routing table maintenance. Managing and supervising processes may include agents that define APIs for one or more objects to simplify inter-object communication and control.

A memory circuit provides multiple access to routing information, status information, and configuration information. For example, memory circuit 1162 is coupled to supervising processor 1160 via SUPRV bus 1177, 1164 (e.g., for obtaining routing information as updates of images) and to port logic circuits 1186–1188 via ROUTE bus 1178, 1166 (e.g., for responding to demands from port logic circuits for routing information, status of other port logic circuits, and configuration information). Each port logic circuit may be coupled to memory circuit 1162 via an independent channel effected via dedicated lines (e.g., separate buses) or dedicated time slots on a multiplexed bus.

A port logic circuit includes any circuit that provides at least a physical interface to one or more frame I/O ports, cooperates with other port logic circuits 1186–1188 via a fabric, and accesses memory for routing information. In one implementation, a port logic circuit provides a logical interface for each frame I/O port so that a supervising process or a routing process may send and receive data via a logical port using an API in some ways independent of frame structure and signaling protocol of the physical port. In one implementation, each port supports both Ethernet and Fibre Channel frame structures and signaling protocols so that the same routing process and the same supervising processes may communicate with ports regardless of whether the port is from time to time physically connected to an Ethernet link or a Fibre Channel link. For example, a group of frame I/O ports 1192 supported by port logic circuit 1186 may include a physical interface for each of four links, each link being compatible with Ethernet or Fibre Channel.

A supervising processor in one implementation according to various aspects of the present invention includes a first bus for a processor, memory, and interfaces; a second bus; and a bridge between the first bus and a second bus. The processor may have exclusive control of the first bus to simplify program operations performed by processes hosted by the processor. The processor may cooperate with other processors intermittently controlling and relinquishing control of the second bus to facilitate maximum efficient use of the capacity of the second bus. For example, supervising processor 1160 includes bus 1204 (e.g., a suitable multi-conductor parallel digital bus) coupled to processor 1202, program store 1206, data memory 1208, serial controller 1210, persistent store 1212, I/O bus controller 1214 coupled between bus 1204 and bus 1216 (e.g., a PCI bus) to perform functions of a bridge; and LAN controller 1218 coupled to bus 1216. Supervising processor 1160 is coupled to TEST bus 1136 via line 1156, EPM bus 1134 via line 1154, LAN bus 1132 (e.g., Ethernet) via line 1152, and SUPRV bus 1164 via line 1176. Any conventional circuits may be used to implement the functions of supervising processor 1160 including any mix of memory: volatile and nonvolatile (e.g., erasable programmable memory). Nonvolatile memory may be used to store programs (e.g., EPM of store 1206) and/or configuration values (e.g., persistent store 1212). Configuration values may include any suitable values that facilitate the assembly of routing circuit 1150 in commercially desirable configurations utilizing similar components (e.g., populating a printed circuit assembly to various extents for a variety of router models). For example, configuration values may include the number of port logic circuits, the electrical position of a distributing circuit in the fabric ring, the addresses (via SUPRV bus 1164) of installed port logic circuits, addresses that describe allocations of memory 1162 to port logic circuits (e.g., for configuration of port logic circuits and communication between supervising processor 1160 and particular port logic circuits), and default port characteristics (e.g., physical interface capabilities or physical port identifiers).

A memory circuit in one implementation according to various aspects of the present invention provides routing information (e.g., including cross reference information) by the cooperation of shared random access memory, content addressable memory, and random access memory that is addressed at least in part by data recalled from content addressable memory. For example, memory circuit 1162 includes memory controller 1302, multi-purpose memory 1304 coupled via line 1303 to memory controller 1302, content addressable memory (CAM) 1306 coupled via lines 1305 and 1307 to memory controller 1302 and coupled via line 1309 to random access memory (RAM) 1312. Random access memory 1312 is also coupled to memory controller 1302 via line 1313.

Memory controller 1302 is coupled to SUPRV bus 1164 via line 1177 and coupled to ROUTE bus 1166 via line 1178. Generally, configuration values received via SUPRV bus 1177 are stored in multi-purpose memory 1304 via line 1303. Routing information (e.g., maps, image data, and updates) received via SUPRV bus 1177 is stored in CAM 1306 and RAM 1312. When a request for routing information is received via ROUTE bus 1178 by memory controller 1302, memory controller 1302 presents a query (e.g., a tag) via line 1305 to CAM 1306. Tags presented to the CAM may have one of 8 types as indicated by a 3-bit field. Typical queries are described in Table 10.

TABLE 10

| Purpose of Query | Query Components |
|---|---|
| Flow lookup | tag type; source identifier (e.g., value from S_ID field of received frame); destination identifier (e.g., value from D_ID field of received frame -- may be virtual); class of service (e.g., indicated by SOF analyzed by 1406, value of CS_CTL field of received frame); protocol identifier (e.g., as determined by parser 1408 mask/pattern comparisons); input physical port identifier (determined by 1406); input physical port type (e.g., port speed, signaling protocol; determined by 1406); configuration settings (e.g., CSR values set by processor 1424); |
| Subflow lookup | tag type; all fields of a flow lookup; flow identifier (from flow lookup CAM associated data); |
| Virtual flow lookup | tag type; all fields of a flow lookup and a subflow lookup; virtual member identifier (e.g., a destination port identifier such as a D_ID field value from the received frame formatted to be recognized as a virtual port identifier); a virtual resource identifier (e.g., a LUN field value from the received frame recognized as virtual by association with the virtual member identifier); |

CAM 1306 responds to a query by providing a flag on line 1307 indicating a successful search. When the search is successful, data on line 1309 provides an address to RAM 1312. RAM 1312 responds to the address by providing additional query results as data on line 1313 described in Table 11. When the search is successful, data from RAM 1312 (also called CAM associated data) on line 1313 is valid. CAM associated data is described in Table 11.

TABLE 11

| Query | RAM 1312 Response (line 1313) |
|---|---|
| Flow lookup | priority (e.g., traffic class); output physical port identifier; flow identifier (e.g., assigned by routing processor upon receipt of FCP_CMND from initiator, a hashed version of source and destination world wide port names created by the parser); flag for subflow lookup required; output port speed; action code (e.g., 2 bits); flag for stall; flag for default route; marking for output frame (e.g., revised CS_CTL value); mid-switch stage (e.g., 4-bit hop count); statistics sample interval; statistics index (e.g., identifies which counter should be used for countable events associated with this flow); |
| Subflow lookup | resource identifier (e.g., for SCSI-3 protocol on FCP, logical unit number (LUN); for Virtual Interface, VI handle of participating process); flag for routing processor action |

TABLE 11-continued

| Query | RAM 1312 Response (line 1313) |
|---|---|
| | associated with the type of frame as determined by parsing; process identifier for routing processor (e.g., a jump vector, or object reference); |
| Virtual flow lookup | page table start address; page size (allows programmable page sizes); sector size (allows programmable sector sizes); shift value (used to determine page boundary crossing); flag set to indicate frames to this virtual LUN should be discarded (e.g., LUN not defined, or does not presently exist); flag set to indicate the virtual LUN is busy (e.g., frame should be stalled or routed to managing processor for routing by proxy); flag set to indicate routing for the virtual LUN is disabled (e.g., frame should be routed to managing processor for routing by proxy); |

A method for revising the configuration of a plurality of routing processors includes in any order: (a) for each virtual entity and each routing processor to be reconfigured (e.g., each processor that uses routing information implementing routing for a particular virtual entity), setting a flag to indicate that routing for the virtual entity is disabled; (b) routing to a managing processor for disposition subsequently received frames (e.g., both control frames and data frames) that indicate the virtual entity as a destination; (c) enabling proxy processes performed by the managing processor to respond to or route such subsequent frames; (d) storing new routing information for a virtual entity in a memory accessible by a routing processor; and (e) clearing the flag(s) in router(s) previously set so as to enable routing of traffic for the virtual entity in accordance with the new routing information. New routing information may be stored in one router (e.g., for access by one or more routing processors or frame processors) or in several routers facilitating routing for one or more virtual entities (e.g., for distributing the processing burden of virtualization, security, or redundancy).

Memory controller 1302 provides a response on ROUTE bus 1178 to each query received on ROUTE bus 1178. Information conveyed by such a response includes the data described in Table 11 without the address of RAM 1312. When the query is accompanied by an identification of the query (e.g., a worklist pointer value, or an identifier of a queue from which the submitter composed the query), the response may be accompanied with a suitable corresponding identification of the query.

In one implementation, CAM 1306 includes a content addressable memory of the type marketed by Lara Networks Inc. as model LNI7020. Memory controller 1302 includes a CAM controller of the type marketed by Lara Networks Inc. as model LNI8010.

Memory controller 1302 may provide address mapping so that a particular routing process 208 may access a unique portion of multi-purpose memory for its particular configuration or communication needs; and all instructions for separate routing processes may be installed in separate port logic circuits using identical instructions in each routing process. By providing address mapping, configuration control of routing process instructions is simplified. In other words, multi-purpose memory 1304 includes an area reserved for each routing process 208. Each routing process (e.g., a port logic circuit may have one or more routing processes) may have a reserved area (not necessarily a contiguous range of addresses). Contents of multi-purpose memory 1304 are described in Table 12.

TABLE 12

| Variable Stored in a Reserved Area of Multi-purpose Memory 1304 | Description |
|---|---|
| Shared tables | Each table shared by several routing processors. Tables may include data structures for the following: context table, virtual context table, port table, page table, and sector table. |
| Configuration values for each routing processor | Each configuration table may be reserved for use by one routing processor. Values may include initial values for CSRs and software for use by the routing processor. |
| Supervisor queue for each routing processor | Each queue may be reserved for use by one routing processor and a suitable supervising processor. May include entries for link service requests, link service replies, and frames to be analyzed and/or routed by the supervisor. |
| Reserved tables | Tables used by only one routing processor. In various implementations any one or more of the context, virtual context, port, page, and sector tables may be segmented to reduce memory utilization or improve access. |

A port logic circuit includes any circuit that performs a routing process as described above. Implementation of such a routing circuit may include one or more of a stored program computer circuit, a microcoded state machine circuit, and a combinatorial logic circuit (e.g., with counters and/or state variable storage). The stored program computer circuit and/or microcoded state machine circuit may employ EPM to facilitate implementing routers 102 in various configurations (e.g., supporting a wide variety of signaling and communication protocols in one router). By performing different portions of the routing process in different circuits, a relatively high degree of parallel processing may result with concomitant non-blocking frame I/O processing capacity. In one implementation, a port logic circuit, inter alia, performs flow routing, performs subflow routing, performs routing of virtual data frames, parses frames to facilitate routing virtual control frames to a proxy, gathers and reports traffic statistics, assures specified quality of service by arbitrating among data flows on ingress and/or on egress, facilitates frame routing via a ring, and communicates with a supervising process via a supervisor queue and interrupts—all, for example, as discussed above. For example, port logic circuit 1186 of FIG. 14 includes distributing circuit 1402, egress buffer 1414, arbitrating circuit 1405, media interface circuit 1406, parser 1408, ingress buffer 1410, index 1420, submitter 1422, frame processor 1424, access circuits 1404, cross reference circuits 1425, virtual output queue controller 1428, dequeue logic 1412, and statistics store 1426.

A distributing circuit includes any circuit that performs the functions described above with reference to a fabric. For example, distributing circuit 1402, implements functions of a network implementation of fabric 213, in particular a ring network. Distributing circuit 1402 receives signal RING-I on line 1170, recognizes frames addressed to the physical ports supported by port logic circuit 1186, places at least the payload of such frames (received via line 1430) in egress buffer 1414, responds to signal CONTROL on line 1432 to avoid egress buffer overflow, provides signal CONTROL on line 1436 to synchronize and/or enable sending, receives (via signal DATA 1434) at least the payload portion of frames to send to other physical ports, and provides signal RING-O on line 1172 for input to a subsequent port logic circuit as discussed above.

Frames conveyed by signals RING-I and RING-O may also include one or more of timing signals, header information, error detection and correction information, signals indicating priority, quality of service, class of service, traffic class and distribution capacity allocation and arbitration controls. Distributing circuit may receive frames from dequeue logic 1412 fully formatted for the fabric network; or, distribution circuit may perform formatting functions. Distributing circuit may provide frames to egress buffer 1414 complete with all fabric network formatting; or may remove formatting by parsing the frame and providing only portions of the fabric network frame to egress buffer 1414. Distributing circuit includes address comparison logic so as to determine whether a frame received on line RING-I is within an address range (e.g., matches all or a portion of a physical port address) and if so to provide at least the payload to egress buffer 1414. Distribution circuit 1402 is nonblocking, sends every frame that it receives from signal RING-I except those delivered to egress buffer 1414, and sends every frame that it receives from dequeue logic 1412. Frames that are sent are provided once on line RING-O 1172.

An egress buffer provides storage for frame payloads to be delivered to a frame I/O port. An egress buffer may include ring buffers formed from linked lists so that frame payloads of varying length may be suitably stored and accessed. An egress buffer may have separate ring buffers for each of several traffic classes for the same physical output port. An egress buffer may support several (e.g., four) physical ports (e.g., with parallel control circuitry and shared memory). The payload inserted into a ring buffer of an egress buffer already includes suitable indicia of the destination port and is therefore suitable for delivery from the egress buffer without revision. Such indicia of the destination port may differ from the physical port identifier corresponding to the frame I/O port 1192 of this hop (e.g., destination port 166 may be indicated in a frame delivered out of port 133. See FIG. 1).

For example, egress buffer 1414 (comprising combinatorial logic, memory, and a state machine) includes a ring buffer for each of 4 traffic classes. All frames received from distributing circuit 1402 that are within the address range corresponding to frame I/O port 1102 (e.g., carrying in a header the exact physical port address of a physical port of frame I/O port 1192) are stored in a ring buffer corresponding to the traffic class indicated in a header of the frame.

An arbitrating circuit identifies at a suitable time each frame payload to be sent as a frame and determines which of several competing supplies of frames should be used as a source of supply for the next opportunity to send a frame. For example, arbitrating circuit 1405 (comprising combinatorial logic, memory, and a state machine) identified for a physical output port frame from one of several queues of egress butter 1414. Each queue may correspond to a traffic class or other policy values (e.g., queue for each of four traffic classes). The identified frame (or frame identification) is passed (1438, 1439) from egress buffer 1414 to a media interface circuit for the physical port. Arbitrating circuit 1405 may use a round robin scheme among queues having a non-empty ring buffer and sufficient grants (e.g., requested and granted by the receiving end of the link according to FC-2) to permit delivery. Arbitrating circuit 1405 may examine a PREFERENCE or PREEMPTION bit and alter arbitration to service marked frames ahead of other frames. Arbitrating circuit 1405 may also set and monitor timers and service a queue in response to its respective timer. In an alternate implementation, arbitrating circuit 1405 performs a method similar to method 702 discussed above as amended to pertain to an output physical port as opposed to the fabric (916) and to an egress buffer as opposed to an ingress buffer (910). Memory may serve to retain a respective grant pool depth and TQC value for each queue (e.g., for each traffic class and for each physical port). Thresholds and other arbitration configuration values are set by processor 1424 via line 1463.

A media interface circuit serves as an interface between a physical network connection and other portions of a port logic circuit. On output, a media interface circuit assures that signaling rules and framing rules of a desired link protocol are met for each physical port. On input, a media interface circuit derives from a frame received from a link a set of signals and information for parsing that are independent of the signaling and framing rules of the link protocol. For example, a link may conform to one of several protocols. After configuration of the media interface circuit, a parser coupled to the media interface circuit can parse its inputs without regard to the particular protocol of the link. For example, media interface circuit 1406 (comprising combinatorial logic, memory, and state machine(s)) determines frames for output in response to signals received from arbitrating circuit 1405, and after being configured by frame processor 1424 for a particular link protocol, adds timing signals, header information, and error detection and correction information, and sends at a suitable time, a suitable frame on a frame I/O line 1192. On input, after being configured by frame processor 1424 for a particular link protocol, media interface circuit 1406 receives frames from frame I/O line 1192, removes timing signals, analyzes (and suitably strips) header information, and strips error detection and correction information after use for determining whether retransmission should be requested. The results of stripping and analysis are provided to parser 1408 via line 1446. Error detection and correction and retransmission requests may be logged by counters in statistics store 1426. Media interface circuit 1406 may support several physical ports (e.g., four) using parallel circuits, one for each physical port. Portions of the functions of interface signal generation and detection may be accomplished for each frame I/O line by additional circuitry (not shown) that may be implemented external to an integrated circuit implementation of port logic circuit 1186. In particular, line 1142 that couples host bus adapter 1140 to a port may interface directly to a port logic circuit integrated circuit without conversion to signal levels suitable for use external to router 102. Media access controller 1406 in one implementation accomplishes functions defined by FCP specifications as levels FC-0, FC-1, and at least the FC-AL portion of FC-2 (e.g., including state machine(s) for buffer-to-buffer flow control, point-to-point communication, dual speed 1 Gigabit/sec and 2 Gigabit/sec, auto negotiation) and analogous functions for IEEE 802.3 1000BTX Ethernet.

An integrated circuit that implements functions of a port logic circuit 1186 as discussed above may include four frame I/O ports per parser; one parser, one submitter, and one filter per frame processor; two frame processors serving one virtual output queue controller, one ingress buffer and one egress buffer; and four output channels to a distributing circuit. The egress buffer may have 11 queues per output frame I/O port. The frame processors may have a 3-stage pipeline (e.g., fetch, execute, store) similar in some respects to a RISC processor.

A parser, for each received frame, identifies portions of the received frame and alerts a frame processor to begin processes that route the frame. A parser may also prepare a query to be submitted for obtaining flow routing information, subflow routing information, or virtual flow routing information. For example, parser 1408 (comprising combinatorial logic) receives information about each received frame via line 1446 from media interface circuit 1406, stores frame information in ingress buffer 1410 via line 1444, identifies particular portions of the stored frame by storing via line 1448 pointers in index 1420, provides notice (e.g., an interrupt) to frame processor 1424 via line 1468 to initiate processing of the frame, and provides information via line 1470 to submitter 1422 for preparation of a query. In one implementation, parser 1408 and index 1420 provide frame processor 1424 with access to the first 128 bytes of every received frame. Different frame types may locate similar fields in different places (e.g., length of field LBA may cause different location of field FC_DL). Parser 1408 may cooperate with index 1420 to provide uniform access to particular frame fields (e.g., RO), accounting for differences in frame formats. Parser 1408 may determine a frame format, for example, with reference to SOF and TYPE and direct offsets between pointer values in index 1420 to accomplish suitable access. In one implementation, parser 1408 classifies frames of network traffic by identifying field locations of various frame formats in successive comparisons. For each comparison, the received frame is masked (e.g., to select values of TYPE_ and R_CTL) and the masked value is compared to a pattern. If the result of comparison is successful, pointers to fields are assigned values in accordance with field location data. For example, up to eight comparisons may be attempted by selecting in turn a tuple of mask, pattern, and field location data from memory parser 1408. The result may provide a coded value (e.g., 3-bit protocol identifier). This memory may be loaded from configuration data by processor 1424 via line 1463. By loading this memory from time to time in accordance with configuration data, each port 1192 of router 102 may be configured to support one of a variety protocols.

As parser 1408 commits memory (e.g., in index 1420 and ingress buffer 1410) parser 1408 provides signals 1446 that direct media access circuit 1406 in responding to requests for buffer-to-buffer grants.

An ingress buffer, inter alia, provides storage for information destined to be assembled into a frame to be sent via the fabric to a frame I/O port. Such information may have been derived from a frame received from a link; or, may have been determined by a frame processor for communication with a managing process or an administrating process. An ingress buffer may also provide storage for information destined to be passed to (or as received from) a supervising process. Such information may have been derived from a frame received from a link (e.g., a link service request); or, may have been determined by a supervising process for communication with a network member (e.g., a link service reply). For example, ingress buffer 1410 (comprising combinatorial logic and memory) receives data to be stored from parser 1408 via line 1444, data to be stored from access circuits 1404 (e.g., DMA controller 1491) via line 1443, and data from frame processor 1424 via line 1456. Ingress buffer 1410 provides data from storage to dequeue logic 1412 via line 1440, data from storage to access circuits 1404 (e.g., DMA controller 1491) via line 1443, and data from storage to frame processor 1424 via line 1456. Data in storage may be organized in a ring buffer (e.g., linked lists) for each output queue. In an implementation having multiple traffic classes per output queue, data in storage may be organized in a ring buffer for each traffic class of each output queue. In a preferred implementation, policy values are effected on each flow, subflow, and virtual flow in part by enqueueing fames in accordance with the physical port identifier (of this router) that received the frame, the physical port identifier (of this router) to which the frame is destined to be sent, and one or more policy values (e.g., one at four traffic classes).

Ingress buffer 1410 may include circuits for adding frame formatting suitable for fabric network frames. A fabric network frame may enclose the header and payload of a frame received from a frame I/O port and thereby provide prepended header. The prepended header may include destination physical port identifier or address (e.g., to be read by any egress buffer 1414 in any port logic circuit on ring 1170 (e.g., fabric 213)), priority, destination port speed, source physical port identifier or address, and flags designating, for example, whether this is a multicast frame.

An index provides pointers and may provide other descriptors of significant portions of data stored in an ingress buffer. Descriptors may include starting addresses, lengths, flags, and values indicating the type of processing prescribed by a parser or supervising processor. For example, index 1420 (comprising combinatorial logic and memory) receives values for storage in its memory from parser 1408 via line 1448. Frame processor 1424 reads via line 1462 index 1420 to address ingress buffer 1410 via line 1458 and thereby access any desired frame data. Frame data descriptors stored in index 1420 may be read by processor 1464 via line 1462. In one implementation, index 1420 includes memory organized in rows (or slots). Rows may be grouped by protocol identifier (e.g., up to 8 rows per protocol). A typical group of rows is described in Table 13.

TABLE 13

| Field | Description |
| --- | --- |
| Pointer to R_CTL | For access to IU, information category; |
| Pointer to F_CTL | For determining role of initiator, target, originator, responder; |
| Pointer to CS_CTL | For access to class of service. For example, access to class of service for a virtual transaction enables a proxy to initiate a suitable class of service for a nonvirtual transaction. For access to PREFERENCE bit for effecting a policy value. |
| Pointer to PREEMPTION bit | For access to PREEMPTION bit for effecting a policy value. |
| Pointer to TYPE | For determining protocol identifier, enabling access to IU data structures of various protocols, and analysis of link service requests. |
| Pointer to FQXID | May consist of several pointers. For access to routing information provided in the frame. |
| Pointer to RO | Used to properly place frame payload in a cache for a proxy, cache agent, or mirror agent process. Used to determine nonvirtual LBA, page, and sector; and, whether the frame data traverses a page boundary in the nonvirtual resource. |
| Pointer to LUN | For access to a logical unit number. |
| Pointer to OP_CODE | For determining type of command, type of command descriptor block. For access to parametric values specified with the command. |
| Pointer to LBA | Used to properly place frame payload in a cache for a proxy, cache agent, or mirror agent process. Used to determine nonvirtual LBA, page, and sector; and, whether the frame data traverses a page boundary in the nonvirtual resource. |

A submitter manages the presentation of queries to a memory circuit that contains routing information or cross reference information. For example, submitter 1422 (comprising combinatorial logic) receives information from which a query (e.g., a flow query or subflow query) is formed as described above with reference to Table 10. The query is presented on bus ROUTE 1166 and the reply is returned on the same bus to submitter 1422. If the flow query reply indicates that a subflow query should be made, submitter 1422 prepares a subflow query. Results of flow and subflow queries are communicated to frame processor 1424 via line 1472. Frame processor 1424 may provide information for a query (e.g., a virtual flow query) to submitter 1422 via line 1474 and receive the reply via line 1472.

In one implementation, submitter 1422 includes and maintains queues for communicating with parser 1408, frame processor 1424, and memory circuit 1162. Parser 1408 pushes an entry on each of several input queues, each input queue corresponding to a physical port serviced by media interface circuit 1406. Frame processor 1424 pushes an entry on an input queue for each subflow lookup. When a query corresponding to an entry from an input queue is presented to memory circuit 1162, submitter 1422 may pop the entry from the respective queue and push an entry onto an output queue derived from the input queue entry and the result received from memory circuit 1162. Frame processor may pop entries from the output queue for analysis (e.g., when a subflow flag is asserted, when a virtual flow is indicated, when the frame is a link service request).

If the stall flag is asserted in a flow lookup result, frame processor 1424 pushes the corresponding entry from the input queue onto a recirculation queue. Preferably, submitter 1422 includes a recirculation queue for each input queue having entries enqueued by parser 1408. By pushing an entry onto a recirculation queue, further processing of the entry by submitter 1422 will be delayed. A timer loaded from a preset value (e.g., a CSR) counts down a duration of the delay, lapse of which dictates when a recirculation queue requires service. A delay may allow time for frame processor 1424 to revise field values or supply additional values that may be part of a subsequent query, for example, revising DID to route the frame to managing process 202 for analysis, setting a PREEMPTION flag, setting a PREFERENCE flag, or supplying a resource identifier (e.g., LUN) from memory. A delay may result from implementing a policy value. For example, frame processor 1424 may accomplish traffic shaping by setting the stall flag in a CAM 1306 result corresponding to a flow, subflow, or virtual flow as discussed above. Once a stall flag is set in CAM 1306, processing of a subsequently received frame will be stopped by submitter 1422 by posting the received frames query onto a recirculation queue. Submitter 1422 may communicate to parser 1408 the status of recirculation queues to enable parser 1408 to inform media interface circuit 1406 that buffer-to-buffer grants should be denied due to the stall condition.

Submitter 1422 may include an arbitrating circuit to govern queue selection for submitting entries to memory circuit 1162. In one implementation, submitter 1422 services queues in priority from highest to lowest as: recirculation queues, flow lookup queue, and parser input queues (equal in priority).

Access circuits provide an interface between a frame processor and a supervising processor for example to facilitate communication of link service requests and replies. For example, access circuits 1404 include supervisor queue 1490, direct memory access controller 1491, and interrupt logic 1492. Frame processor 1424 communicates with access circuits 1404 in any conventional manner indicated functionally by line 1409. Supervising processor 1160 communicates with access circuits 1404 via SUPRV bus 1164.

Cross reference circuits maintain associations among identifiers and other data facilitating access by a processor (e.g., a routing processor or a supervising processor) or access by circuits operating in parallel with a processor (e.g., a parser may post entries to a descriptor or post pointers in a frame buffer for later reference by a frame processor; dequeue logic may obtain other data for formatting a frame to be sent to the fabric by using various identifiers as index values). Cross reference circuits may be implemented with any conventional memory technology (e.g., random access memory or content addressable memory) and any conventional data storage technology (e.g., ring buffer, indexed list, or hierarchical data structure). Cross reference circuits may be implemented as a central memory circuit, multiported memory circuit, or as separate independently accessible memory circuits. For example, cross reference circuits 1425 include frame buffer 1480, descriptors 1481, port table 636, context table 626, virtual context table 630, page table 632, and sector table 634.

Frame buffer 1480 may be used by frame processor 1424 or supervising processor 1160 to retain information relative to received frames (e.g., for analysis of the frames), to reserve space for frames being assembled in ingress buffer 1410, or to provide space for frames prior to transfer into ingress buffer 1410. Frames in frame buffer 1480 may be accessed with reference to a frame handle. In one implementation, parser 1408 assigns a frame handle to received frames and creates a worklist queue in memory accessible for reading, modifying, and deleting by parser 1408, submitter 1422, VOQC 1428, and frame processor 1424. The worklist queue describes a frame and may serve as space for results of analysis and processing that relate to the frame. A worklist queue entry may include number of slots in ingress buffer 1410 available for use by this port, a tag to be used for a query to be submitted by submitter 1422, a pointer to the respective frame in ingress buffer 1410 or in frame buffer 1480, pointers to fields of the frame or to values (e.g., pointers) in index 1420 for access to fields of the frame, one or more flow index values (e.g., an 8-bit identifier corresponding to an S_ID (or similar 24-bit value), to an S_ID/D_ID pair, or to an FQXID) and flags for results of analysis (e.g., virtual, nonvirtual, stalled, subflow lookup available, or link service request). A frame table lists for each frame a starting address to locate the frame in the ingress buffer. The frame table may be indexed by a frame identifier for convenient reference in other tables (e.g., worklist, supervisor queue, or virtual output queue). Each row of the frame table may include values describing or limiting the purpose of storing the frame (e.g., staleness timestamp, reason for keeping the frame, or reason for stalling the frame).

Figure 15:
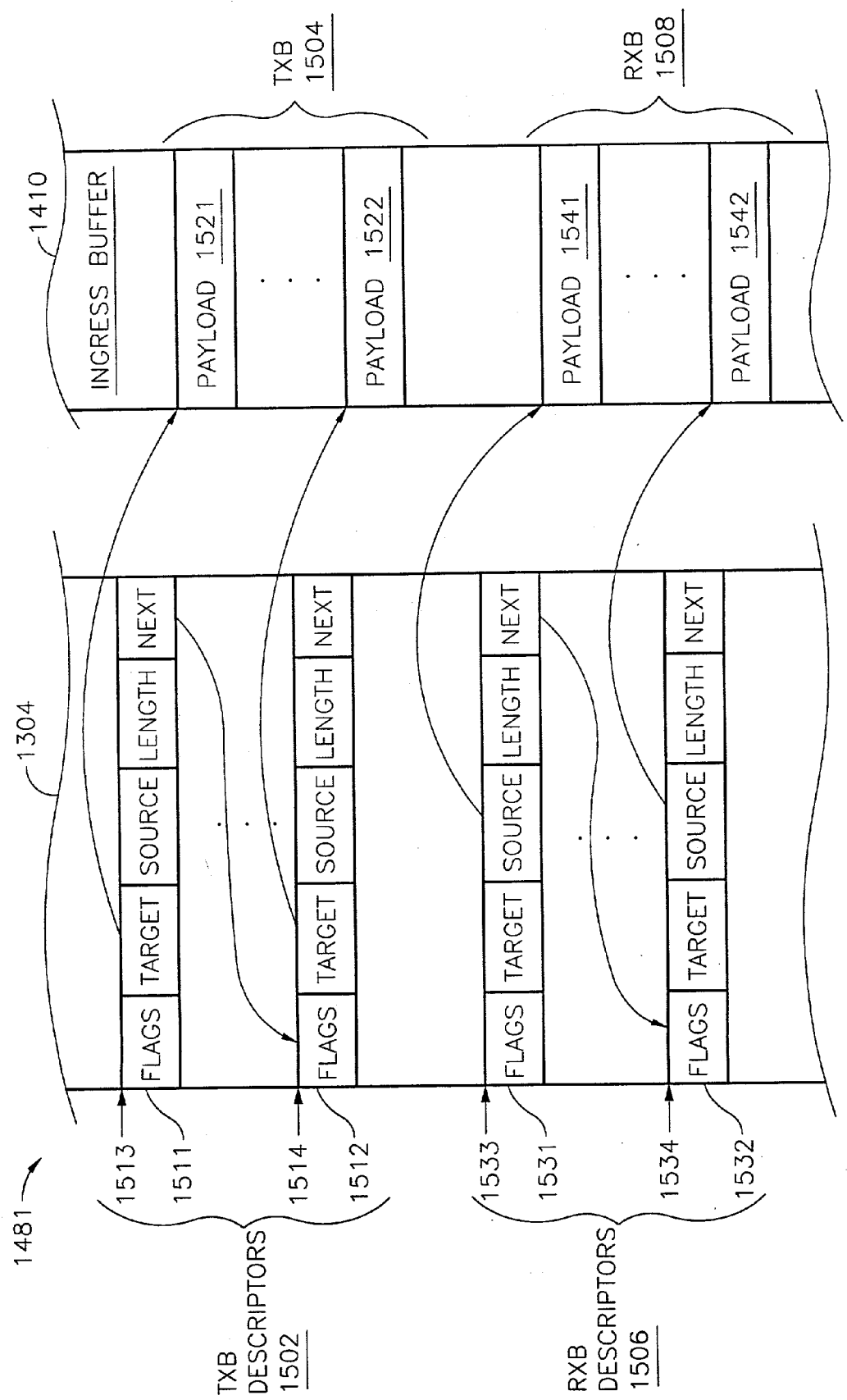
FIG. 15 is a functional block diagram of the descriptors of FIG. 14.

As discussed above, portions of an ingress buffer may be used for frames received from frame I/O ports and other portions may be used for frames destined to be sent or transmitted to fabric 213. Analogously, portions of an ingress buffer may be used for data to be received by a supervising processor (copied out of an ingress buffer) and other portions may be used for transmitting data from a supervising processor (copied into an ingress buffer). According to various aspects of the present invention, references to these portions may be organized to implement ring buffers using entries in linked lists. For example, a portion of multi-purpose memory 1304 may include descriptors 1481 to implement a transmit buffer (TXB) and a receive buffer (RXB) as in FIG. 15. Multi-purpose memory 1304 includes descriptors for a transmit buffer 1502 (having entries 1511 and 1512 each with starting addresses 1513 and 1514 respectively) and descriptors for a receive buffer 1506 (having entries 1531 and 1532 each with starting addresses 1533 and 1534 respectively). Each descriptor includes an entry in a linked list. Each entry includes fields for flags, target identifier, source identifier, length, and a pointer to the next entry of the list (e.g., null if this is the last entry). Because entries in the list may be inserted or deleted regardless of position in the list and because a search of the list may begin with any item and proceed forwards from the last item to the first or backwards from the first to the last, the linked list can be used as a ring buffer. For communication with a supervising processor, fields have contents as described in Table 14.

TABLE 14

| Field of an Entry of a Descriptor | Description |
|---|---|
| Flags | Values set or cleared to facilitate search of the linked list. Suitable values may indicate "sent", "acknowledged", and/or processing "complete". List maintenance may be facilitated by reading flag values (e.g., indicating that a list entry may be reused for another purpose, or freeing the list entry to permit use of memory for any purpose). |
| Target | A start address for content to be written by DMA controller 1491. For a transmit buffer entry (e.g., 1511) the target address is typically an address of ingress buffer 1510 (e.g., payload 1521 of TXB 1504). For a receive buffer entry (e.g., 1531) the target address is typically an address of data memory 1208. |
| Source | A start address for content to be read by DMA controller 1491. For a transmit buffer entry (e.g., 1511) the source address is typically an address of data memory 1208. For a receive buffer entry (e.g., 1531) the source address is typically an address of ingress buffer 1510 (e.g., payload 1541 of RXB 1508). |
| Length | The number of bytes (or other suitable measure) to be copied by the read or write operation of DMA controller 1491. |
| Next | A pointer to the next list entry or null if none. A tail pointer value may be set to the start address of an entry having a null NEXT field value (e.g., 1512 and 1532). A head pointer value may be set to the start address of a first entry in the list. For example, a TXB head pointer may specify address 1513; and the value of NEXT in entry 1511 identifies the starting address 1514 of entry 1512. An RXB head pointer may specify address 1533; and the value of NEXT in entry 1531 identifies the starting address 1534 of entry 1532. |

DMA controller 1491 may refer to a head and a tail pointer for each buffer (TXB and RXB). Head and tail pointers may be specified by supervising processor 1160 when setting up a DMA transfer. Head and tail pointers may refer to the first and last entry in the buffer. When an entry has been copied by DMA controller 1491, DMA controller 1491 may revise the head pointer to the value of the NEXT field in the entry that has been completed. When DMA controller 1491 detects that a tail pointer for any buffer is not equal to the head pointer for that buffer, DMA controller 1491 may perform the specified copy operations (e.g., one operation per entry) until the head and tail pointers are equal.

To simplify maintaining multiple CAM associated data records that refer to a router port identifier (or virtual output queue), CAM associated data includes logical port identifiers. The conversion of a logical port identifier to one or more physical port identifiers is accomplished by frame processor 1424, VOQC 1428, or egress buffer 1414 with reference to a port table. A port table 636 entry may include fields as described in Table 15. Multiple entries for the same logical port identifier may be used to specify a broadcast or multicast routing.

TABLE 15

| Field of Port Table 636 | Description |
|---|---|
| Logical router port identifier | An indirect reference to a physical port of the router. |
| Physical router port identifier | An identifier of an output physical port of the router. May be a frame I/O port (e.g., an N-port, an E-port, or a port to managing processor 1112 for communication with a process performed by the managing processor). This field may identify a traffic class and output queue emptied via a physical router port to network 101. |

A context table provides storage for port identifiers and policy values to be associated with all communication (e.g., sequences) of the transaction. A context table 626 entry may include fields as described in Table 16.

TABLE 16

| Field of Context Table 626 | Description |
|---|---|
| Transaction identifier | An identifier assigned by the requester or a proxy acting as a requester. For a SCSI over Fibre channel protocol, the requester may be an initiator and the transaction identifier may be the value of the OX_ID field. |
| Source port identifier | An identifier of the port from which a request of the transaction originated (e.g., an initiator's port identifier or network address). The source port identifier may be the value of the S_ID field in a received frame. |
| Destination port identifier | An identifier of the port to which a request of the transaction is directed (e.g., a participant's port, a target port identifier, or network address). The destination port identifier may be the value of the D_ID field in a received frame. |
| QoS | Policy values to use for this transaction (e.g., including specification of traffic class). The QoS as entered into the context table may be copied from or derived from field values of the received frame including CS_CTL. The QoS value may be derived from routing information including traffic class that has been associated with this requester (e.g., S_ID field value) or a participant (e.g., D_ID field value). |
| Logical output port | Specifies a route in accordance with one or more rows of port table 636. The value for logical output port may be determined in accordance with the value of the S_ID field, the physical input port of the router that received the frame, and/or the traffic class. When routing information defines several output ports and/or traffic classes, the routing processor determines one output port and traffic class (e.g., using conventional methods such as shortest path) and may specify the virtual output queue here to implement that route. |
| Statistics counter identifier | An identifier of a counter to be conditionally incremented when a frame of this transaction is processed. Whether or not to increment the counter may depend on whether a time of day (or a portion of a time value) falls within a range defining a period for collecting statistics. |
| Flags | A composite value that may include: a value to use in place of CS_CTL (e.g., for implementing a policy value); and/or a value that indicates one or more of the following: whether this transaction is stalled, or whether to drop frames of this transaction (e.g., set in response to a link service request to cancel the task or transaction, or set to implement a security function). |

A virtual transaction is a transaction recognized by the router as referring to a virtual participant (e.g., a virtual member, virtual resource, or portion of a virtual resource). For a SCSI over Fibre channel protocol, a transaction is recognized as a virtual transaction when: (a) a frame has a value in the D_ID field that is recognized (from routing information or a predetermined range of values) as a virtual member; (b) a frame has a value in the LUN field that is recognized (from routing information or a predetermined range of values) as a virtual resource (e.g., storage or process); or (c) a frame has a value in an address field that is recognized (from routing information) as a virtual address (e.g., virtual LBA for storage, virtual page (such as part of an LBA), virtual sector (such as part of an LBA), or an object reference).

In one implementation, the D_ID field provides a composite value including an identifier of the router (e.g., a domain), and an identifier of a virtual member. For example, a 24-bit D_ID field [23:0] having bit 15 zero provides a nonvirtual destination port identifier in bits [14:8] and a loop port identifier (e.g., AL_PA) in bits [7:0]. A D_ID field having bit 15 set provides a virtual destination port identifier in bits [7:0]; and, bits [14:8] may be used for routing on fabric 213.

A virtual context table 630 entry may include fields as described in Table 17.

TABLE 17

| Field of Virtual Context Table 630 | Description |
|---|---|
| Requester | An identifier of the requester that originated the virtual transaction. For example, for a FCP_CMND frame of a virtual transaction from an initiator, the value of the S_ID field. When the router originates frames of the virtual transaction back to the initiator (e.g., in response to frames received from a nonvirtual target), the value of the D_ID field in the frame originated back to the initiator will be assigned by the router from the Requester entry in this row of the virtual context table. |
| Virtual transaction identifier | An identifier assigned by the requester that identifies this virtual transaction. For example, the value of the OX_ID field. The virtual transaction identifier is used as an index into this virtual context table 630 to obtain one or more rows of this virtual context table 630. |
| Virtual participant's transaction identifier | An identifier assigned by the router for use in a virtual transaction (e.g., VRX_ID). |
| Nonvirtual participant | An identifier (e.g., determined from routing information) of a nonvirtual participant of a nonvirtual transaction used to implement an intent of the virtual transaction. May be used as the value of an D_ID field in a frame of such a nonvirtual transaction (e.g., directed to the nonvirtual target corresponding to the virtual target of the virtual transaction). |
| Nonvirtual transaction identifier | An identifier of a nonvirtual transaction to be conducted to accomplish an intent of a virtual transaction. Typically assigned by a routing processor (e.g., acting as requester, initiator, or originator). Typically assigned when the virtual transaction is to be routed (e.g., the first routing processor between an initiator and a target having routing information sufficient for that routing processor to recognize the transaction as a virtual transaction). The nonvirtual transaction identifier (e.g. NVOX_ID) may be used as the value of the OX_ID field of a frame of a nonvirtual transaction. The nonvirtual transaction identifier is used as an index into this virtual context table 630 to obtain one or more rows of this virtual context table 630. |
| Nonvirtual participant's transaction identifier | An identifier assigned by a participant of a nonvirtual transaction (e.g., NVRX_ID). The participant's transaction identifier may be determined from a frame directed back to an initiator (e.g., an RX_ID field of a response). |
| Nonvirtual sequence identifier | An identifier of a portion of a nonvirtual transaction. A SCSI I/O comprising sequences corresponds to a transaction. Nonvirtual sequence identifier may be assigned by a proxy or a routing processor (e.g., NVSEQ_ID). |
| Nonvirtual offset | An identifier of a relative offset that describes the offset into a buffer of the data being conveyed by the payload of this frame. For example, a virtual transaction may be described by a relative offset (e.g., the value of field RO in a FCP_DATA frame). The corresponding nonvirtual transaction may be conducted independently of the virtual transaction (e.g., in a delivery order specified by the nonvirtual target). A payload in the nonvirtual transaction may therefore be identified by a nonvirtual offset (e.g., NVRO). |
| Flags | A composite value that may include whether to discard the frame (e.g., to enforce access control or abort a task), whether to route the frame to a proxy process, or whether to pass the frame to a supervising process. |
| Timestamp | A value indicating time when this row was created. Used to flush stale rows of this virtual context table 630. |

According to various aspects of the present invention, a virtual identifier is associated with a nonvirtual entity so that reference to the virtual identifier accomplish communication affecting the nonvirtual entity. This association may be implemented as a virtual member identifier associated with a nonvirtual member identifier (e.g., a member-to-member association). Alternately, the association may be implemented with member/resource-to-member/resource association, a member/resource/address-to-member/resource/address association, a member/object_reference-to-member/object-reference association, or permutations of these. These associations may be one to many (e.g., facilitating redundancy in storage or processing). When a storage resource address includes further segmentation, (e.g., a logical block address may include a page, sector, and block offset), a reference to a virtual sector may affect one or more nonvirtual sectors.

In one implementation, storage virtualization is implemented using one or more page tables and one or more sector tables. For example, each virtual resource identifier may be associated with one page table that includes one or more rows. Each page table row is associated with one sector table that includes one or more rows.

In an alternate implementation, a query for routing information may result in a maximal match of the query tag that includes in order: member identifier, resource identifier, page address, sector address, and block address. In a preferred implementation, described below, the block address is omitted and storage virtualization is accomplished to the sector level.

A page table stores a one-to-many association between an identifier of a virtual storage address and a nonvirtual storage address. A page table 632 entry may include fields as described in Table 18. When routing information provides a direct reference (as opposed to an indexed reference) to a particular page table, the virtual resource identifier field may be omitted.

TABLE 18

| Field of Page Table 632 | Description |
|---|---|
| Virtual resource identifier | An identifier of a virtual resource for which a corresponding nonvirtual page table has been defined. |
| Virtual Page Address | An identifier of a page as referred to in a virtual transaction. For example, a CDB of a virtual transaction may include a value in the LBA field comprising virtual page address (as well as a sector and a block address). |

TABLE 18-continued

| Field of Page Table 632 | Description |
| --- | --- |
| Virtual Sector List | An identifier of the first sector of a list of sectors described in a sector table describing nonvirtual sectors that implement the virtual page. Each sector of the list may be located on a different nonvirtual resource and/or at different pages of a nonvirtual resource. |
| Valid | A flag indicating whether this row of page table 632 is valid. Permits efficient reuse of a row. |

A sector table stores an ordered list of sectors that comprise a page. For example, if a virtual page comprises 512 sectors, then a sector list associated with that virtual page (e.g., a row of a page table, discussed above) includes 512 rows, the first row corresponding to the first sector of the virtual page, and so on. A sector table 634 entry may include fields as described in Table 19. The virtual sector address field may be omitted from sector table 634 when the order of sectors is maintained by design (e.g., sequential order 0–511). The nonvirtual sector address field may be omitted when access by nonvirtual sector address is not desired.

TABLE 19

| Field of Sector Table 634 | Description |
| --- | --- |
| Virtual sector address | The virtual sector address of a virtual page. May be used as an index to obtain associated values from this row of sector table 634. |
| Nonvirtual sector address | The nonvirtual sector address associated with the virtual sector address of a virtual page. May be used as an index to obtain associated values from this row of sector table 634. |
| Nonvirtual member identifier | An identifier of the nonvirtual member implementing this nonvirtual sector. For example, a value (e.g., NVD_ID) used in the D_ID field or a nonvirtual transaction. |
| Nonvirtual resource identifier | An identifier of the nonvirtual resource implementing this nonvirtual sector. For example, a value (e.g., NYLUN) used in the LUN field of a nonvirtual transaction. |
| Nonvirtual address | An address that identifies nonvirtual data for this virtual sector. For example, a value (e.g., NVLBA) used in the LBA field of a nonvirtual transaction. |
| Nonvirtual bounds | The number of sectors (e.g., starting sector number, ending sector number, and/or quantity of sectors) in the nonvirtual LBA. May differ from the number of sectors in the virtual LBA. May be used to determine whether a virtual transaction will cross a page boundary. |
| Control | A composite value indicating: whether the nonvirtual sector is part of a snapshot, part of a mirror, or is associated with a cache. |
| Routes | Routing information (or one or more pointers to routing information) describing alternate paths to the nonvirtual sector. Each alternate route may designate an output queue and traffic class. |

An output queue presents frames to the fabric. For supporting multiple output queues, a frame may be copied to a region of memory designated with a suitable priority and/or traffic class. Alternatively, a so-called virtual output queue may include pointers to the frame as it may already exist in a memory that serves a function different from an output queue. For example, output queue 1437 includes virtual output queue controller (VOQC) 1428 and dequeue logic 1412. Output queue 1437 refers to the frame as it exists in ingress buffer 1410, thereby avoiding the time and resources needed to maintain a copy of the frame in a memory different from the ingress buffer. Dequeue logic 1412 (comprising combinatorial logic) presents frames to distributing circuit 1402 via line 1434 (or portions of frames such as identifiers and payloads as discussed above with reference to distributing circuit 1402). Dequeue logic 1412 is directed by command signals received from VOQC 1428 via line 1442. Commands include directives to format data pointed to by pointers maintained by VOQC 1428 to form frames as directed, send frames, drop frames (e.g., to interrupt a link in response to a suitable link service request or exceptional condition), and stall queues (e.g., as discussed above with reference to FIG. 9).

VOQC 1428 may include combinatorial logic and/or one or more state machines to perform methods discussed above with reference to FIGS. 9 and 10 for each output queue. VOQC also receives flow control signals from distributing circuit 1402 via line 1436. If operation of arbitrating circuit 1405 and egress buffer 1414 result in a buffer full beyond a threshold, egress buffer 1414 provides flow control signals to distributing circuit 1402 via line 1432, as discussed above. Distributing circuit may respond to such flow control signals and to exceptional conditions (e.g., loss of synchronization or timing delay associated with receiving signal RING-I or providing signal RING-O, lack of sufficient grants for sending, initialization, reinitialization, or high error rates) by asserting flow control signals to VOQC 1428 via line 1436.

Output queues may be implemented as ring buffers in ingress buffer 1410. When permitted by flow control signals 1436 and according to a method of arbitrating among sources of similar priority (e.g., as discussed above), VOQC 1428 identifies to dequeue logic 1412 via line 1442 data for sending to the fabric from a ring buffer in ingress buffer 1410. Upon successful processing of the identified frame, dequeue logic 1412 may adjust the ring buffer pointers to remove the identified frame from the queue. A region of memory removed from a ring buffer may be reallocated to any other function provided by ingress buffer 1410. By allowing reallocation of ingress buffer memory, frames of varying length may be accommodated, queues of varying capacity may be accommodated, queue stalls may be implemented by allowing a ring buffer to grow in size, flow controls such as buffer grants may be implemented, and arbitration may be accomplished based on information associated with each output queue including identifiers related to flow, subflow, virtual flow, destination, protocol, resource, traffic class, and priority.

The number of virtual output queues maintained by VOQC may include multiple queues for the same destination output physical port identifier. For example, in one implementation, a frame to be enqueued for output to fabric 213 is pushed into a queue corresponding to the source physical port identifier from which the frame was received by this port logic circuit (e.g., a port logic circuit may serve 4 ports for input), and further corresponding to a traffic class. Consequently, an arbitrating circuit for one physical output port arbitrates among a large number of queues. For example, when a port logic circuit serves 4 physical input ports (local to this port logic circuit), recognizes 4 traffic classes, and routes frames on fabric 213 to up to 20 physical output ports (e.g., 16 frame I/O ports in router 102, one port to a managing process (e.g., 204), and one multicast port), VOQC manages a total of 320 queues. Each of 20 arbitrating circuit selects from 16 queues.

An entry in a virtual output queue may include the values described in Table 20.

TABLE 20

| Field of virtual output queue entry | Description |
| --- | --- |
| Frame to output | pointer to a frame in ingress buffer 1410; flag for CRC regeneration; |
| Principal output queue | physical or logical output port indentifier; port speed to be used for the output port; priority (e.g., if set, arbitration according to traffic class may be superceded); |
| Multicast | multicast destination identifier (e.g., D_ID); |
| Statistics | statistics counter identifier; |
| Secondary output queue | physical or logical output port identifier; port speed to be used for the output port; priority (e.g., if set, arbitration according to traffic class may be superceded); |
| Miscellaneous | midswitch stage identifier; |

The secondary queue, if specified, may direct that a copy of the frame be sent to a managing process 204, to an administrating process 202, or to another resource. The managing process, administrating process or resource may appear (if not intentionally made invisible) as a target (e.g., a virtual target) to the source of the frames. Sending a copy of a frame to a managing process may facilitate configuration management by process 406, or report generation by process 410 (e.g., accumulation of traffic statistics in addition to statistics reported by routers 102–105). Sending a copy of a frame to an administrating process may facilitate monitoring for security purposes. Frames to be sent to a secondary output queue may be selected based on traffic statistics, or on type of frame. For example, frames writing a primary data store (not reading the primary data store) would be sent to a mirror data store. Sending frames to a managing processor that hosts a mirror agent (426) facilitates receiving frames in a first order preferred for the first initiator; and acting as an initiator for serving the mirror resource in a second order preferred for operation of the mirror resource. The mirror agent may perform initiator and data transfer functions analogous to a proxy process, discussed above.

A statistics store accumulates counts of traffic statistics as described above. For example statistics store 1426 (comprising combinatorial logic such as counters, and memory) receives specifications for what statistics to accumulate, how to accumulate them, and provides status and results to frame processor 1424 via line 1460. Statistics store 1426 receives notice of events for possible counting from media interface circuit 1406, arbitrating circuit 1405, parser 1408, dequeue logic 1412, and virtual output queue controller 1428. Counts may be restricted to events related to a particular subflow of a link and/or to a particular protocol used on a link. For example, counts may be accumulated for frames exceeding a threshold length that are received on a particular physical port, are directed to a particular subnetwork resource (e.g., process or device), and contain indicia of a particular upper level protocol (e.g., CORBA, SMTP, or VI), upper level file system (e.g., UNIX, WINDOWS), or upper level file type (e.g., images such as .jog, movies such as .mpeg, audio such as .wav, text such as .doc, database such as .index). Counts may be accumulated for intervals as directed by frame processor 1424. Intervals may be specified at random, of random duration, or at particular times and particular durations. The start time for collecting a specified statistic may also be set in accordance with the occurrence of an event (e.g., another statistic counter has exceeded a threshold).

Statistics counters may cooperate with values recalled from CAM 1306 to determine whether an event should be tallied. For example, CAM 1306 may provide one or more values that specify a sampling window (e.g., hourly, daily, weekly; with a relative start time (8:15 a.m. each day), duration, and/or relative end time (8:30 a.m. each day)) during which an event should be tallied or a frame sampled for purpose of determining whether a countable event is indicated by the contents of the frame. Current time of day may be compared to the values specifying the sampling window to determine whether to ignore the frame, count it (e.g., as a unit or accumulate its length), or analyze it for possible statistics.

A routing processor includes any stored program computer circuit and/or state machine that performs a routing process 208 as described above with reference to FIG. 2. A routing processor 1161 may include a port logic circuit and interfaces to a supervising processor and to a memory circuit. Alternately, a routing processor 1161 may further include a memory circuit or exclusive use of a portion of a memory circuit. For example frame processor 1424 in one implementation performs methods described above with reference to FIGS. 2 and 6, and portions of FIGS. 7–10 that are not implemented in separate circuits for parallel processing. Frame processor 1424 includes EPM to enable downloading programs to be executed by routing engines. Such programs may differ among routing engines of router 201, for example, to implement different protocol support on different frame I/O ports or at different times during operation of the same frame I/O port. Frame processor 1424 has access to shared memory 1162 (e.g., for read, write, fetch, indirect addressing, stacks, and heaps) via ROUTE bus 1166.

To process a link service request received from any frame I/O port, parser 1408 indicates to frame processor 1424 that a link service request has been placed in ingress buffer 1410 by signals on line 1468. Alternatively, frame processor 1424 may determine that a frame received is a link service request by reading portions of ingress buffer 1410 identified by index 1420. Frame processor 1424 may create an entry in supervisor queue 1490 to notify supervising processor 1160 of the received link service request. Supervising processor 1160 may respond to an interrupt generated by interrupt logic 1492 or may periodically read supervisory queue 1490 to discover the pending queue entry. Supervising processor 1160 may then set up DMA controller 1491 and interrupt logic 1492 to copy suitable portions of the frame from ingress buffer 1410 to data memory 1208 for convenient access during processing of the link service request. The region of ingress buffer 1410 used by the frame may then be freed for other use as discussed above. The entry in supervisor queue 1491 may also be freed.

Supervisor queue 1490 may be implemented as a ring buffer or array in any suitable memory circuit. For example, memory for supervisor queue 1490 may be allocated from a portion of ingress buffer 1410 or from multi-purpose memory 1304 (e.g., a reserved region or a region shared by multiple frame processors). When placing entries in supervisor queue 1490, a priority value may be associated with the entry so that processing by supervising processor 1160 may respond to higher priority link service requests that enter the queue in time after lower priority link service requests. Priority may be determined with reference to one or more of the following: identifiers of a routing processor, a type of link service request, a flow, a subflow, a virtual flow, a resource, or a protocol.

To process one or more link service replies to be sent to any frame I/O port(s), a managing process, and/or an administrating process, supervising processor 1160 may set up DMA controller 1491 and interrupt logic 1492 to copy suitable portions of one or more frames from data memory 1208 to ingress buffer 1410. If any frame written by DMA is placed in a region of ingress buffer 1410 monitored by frame processor 1424, frame processor 1424 may act on the frame in any manner discussed above (e.g., to accomplish routing a flow, subflow, or virtual flow) If any frame written by DMA is placed in an output queue managed by VOQC 1428, the frame is passed to the fabric as discussed above whereupon the frame is received from the fabric by a suitable egress buffer and delivered via a frame I/O port as discussed above. Supervising processor 1160 may respond to an interrupt generated by interrupt logic 1492 or may periodically read supervisory queue 1490 to discover completion of processing of frames to facilitate subsequent DMA of further frames as desired.

As discussed above, a transaction (e.g., an input/output (I/O) or an exchange) for accomplishing a data transfer between members may include either a read operation (the subject data being from the participant) or a write operation (the subject data being to the participant). Such a transaction is generally referred to as a R/W I/O (e.g., the terms transaction, I/O, and exchange, referring loosely and generally to either a read or a write operation). According to Fibre Channel and SCSI protocols, a R/W I/O includes transactions between an initiator and a target that employ frames (or IUs) identifiable as FCP_CMND, FCP_XFER_RDY, FCP_DATA, and FCP_RSP. According to various aspects of the present invention, a routing processor implements methods of routing R/W I/Os for nonvirtual and for virtual transactions. For example, frame processor 1424 detects frames of nonvirtual non-R/W I/Os and identifies them for processing by supervising processor 1160. Frame processor 1424 detects frames of virtual non-R/W I/Os and routes them for processing by a proxy process of managing processor 1112.

A method of processing frames according to various aspects of the present invention may include any suitable combination of the following operations: receiving a frame from a network; determining in a routing processor whether the received frame is a data frame (e.g., part of a data transaction); if the received frame is not a data frame (e.g., part of a control transaction), identifying the frame for processing (e.g., by a supervising processor for nonvirtual control frames; and by a proxy process for virtual control frames); if the received frame is a data frame, determining a resource identifier referred to by a R/W operation of the data transaction; determining a nexus (e.g., an I_T_L nexus or I_T_L_Q nexus) of the R/W operation, recalling a policy value associated with the nexus; enqueueing data for the R/W operation in a first buffer in accordance with the policy value; dequeueing data from the first buffer for transfer on a fabric by arbitrating among queues in accordance with a historical value; adjusting the historical value in accordance with the amount of data transferred on the fabric; receiving data from the fabric; enqueueing data received from the fabric in a second buffer; and dequeueing data from the second buffer for transfer to the network. Such a method may be performed by the cooperation of a routing processor, managing processor, and supervising processor. For example, login, proxy, and error condition handling operations may be accomplished by managing processor 1112 in cooperation with a routing processor and supervising processor, as discussed above.

In the following discussion, a SCSI I/O R/W sequence is an example of a R/W I/O series; other SCSI sequences are examples of a non-R/W I/O series.

Figure 16:
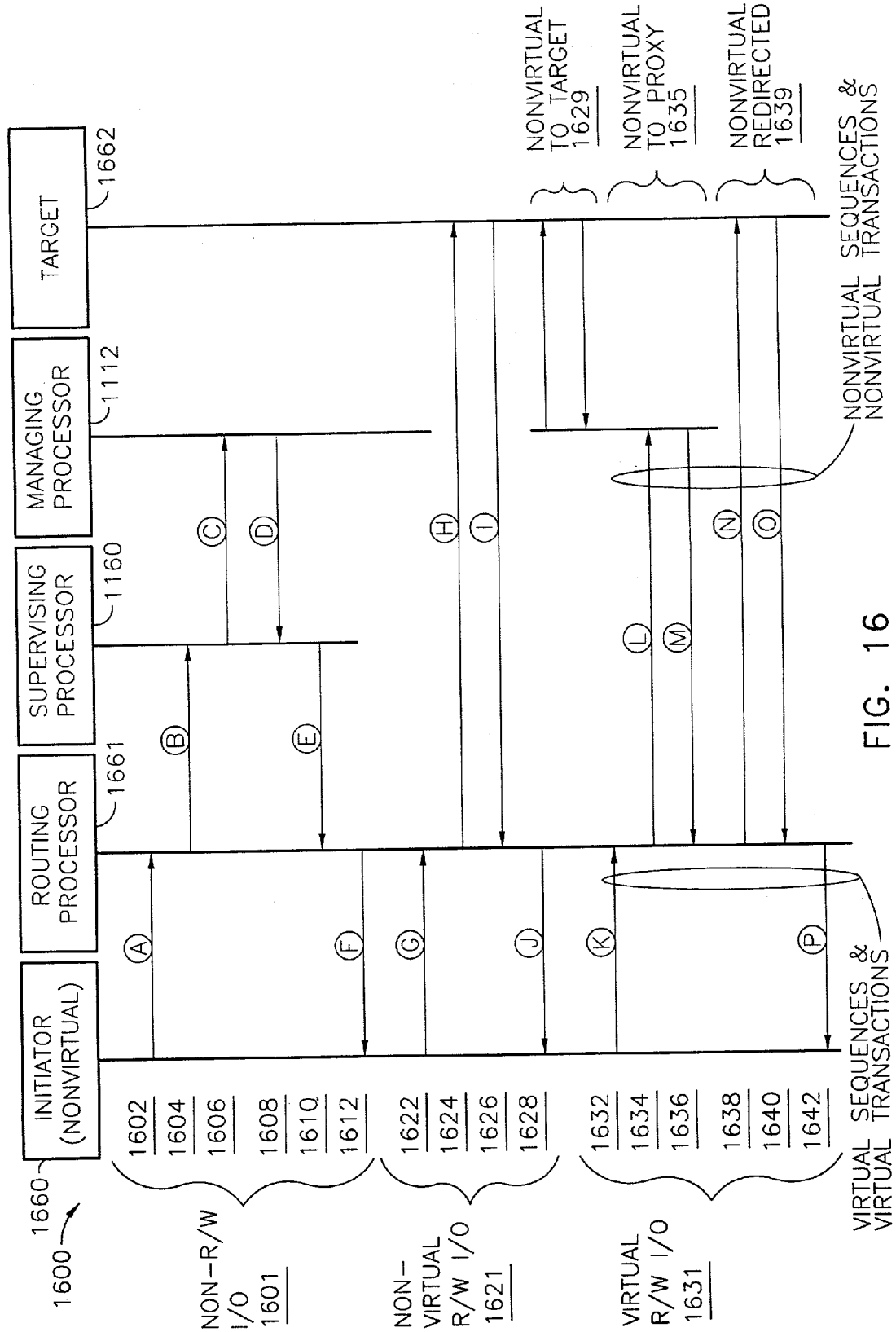
FIG. 16 is a message sequence diagram for operations performed by the system of FIG. 1.
Figure 17:
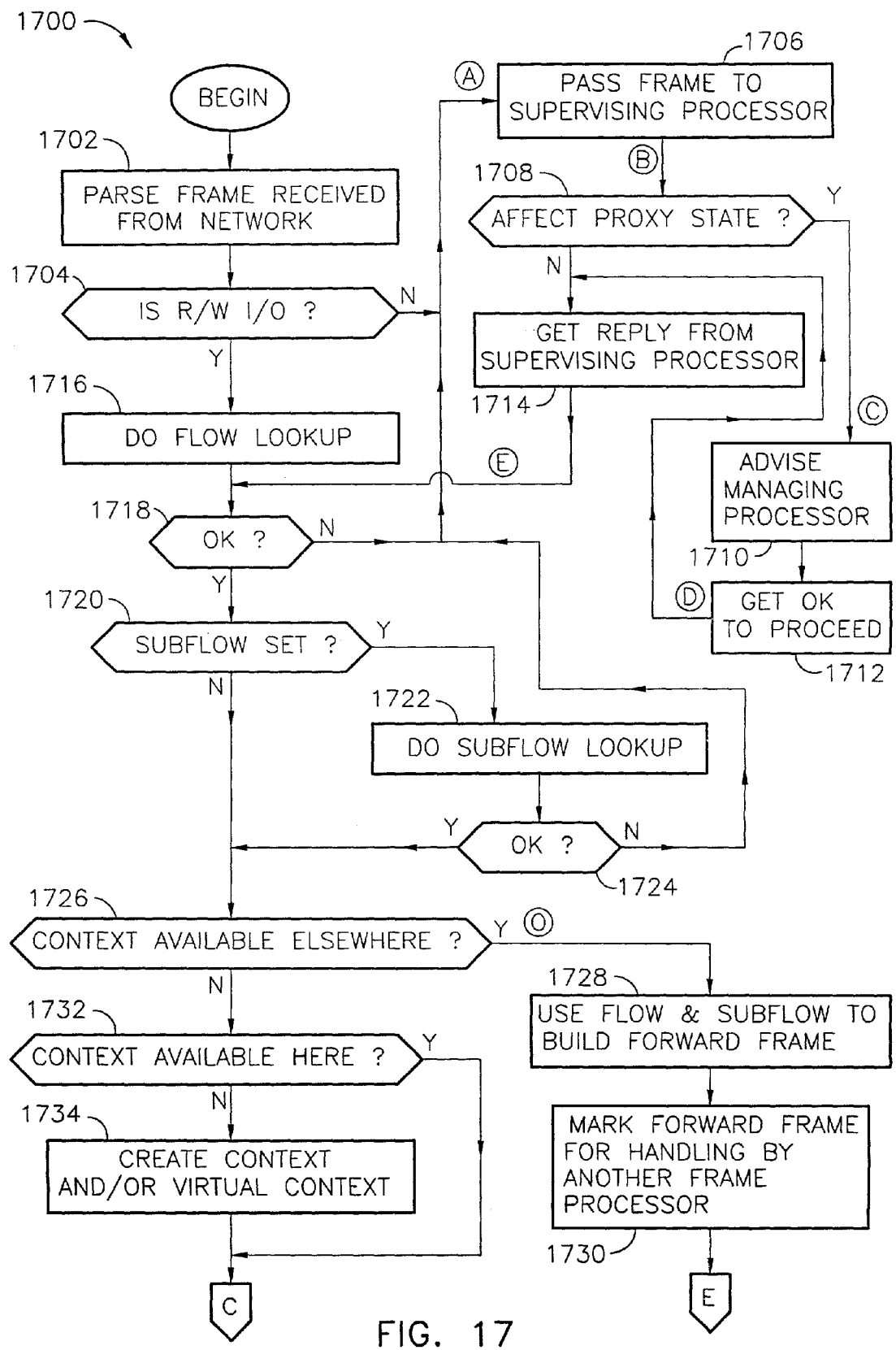
FIGS. 17–20 form a flow chart of methods performed by router 102 of FIG. 2.
Figure 18:
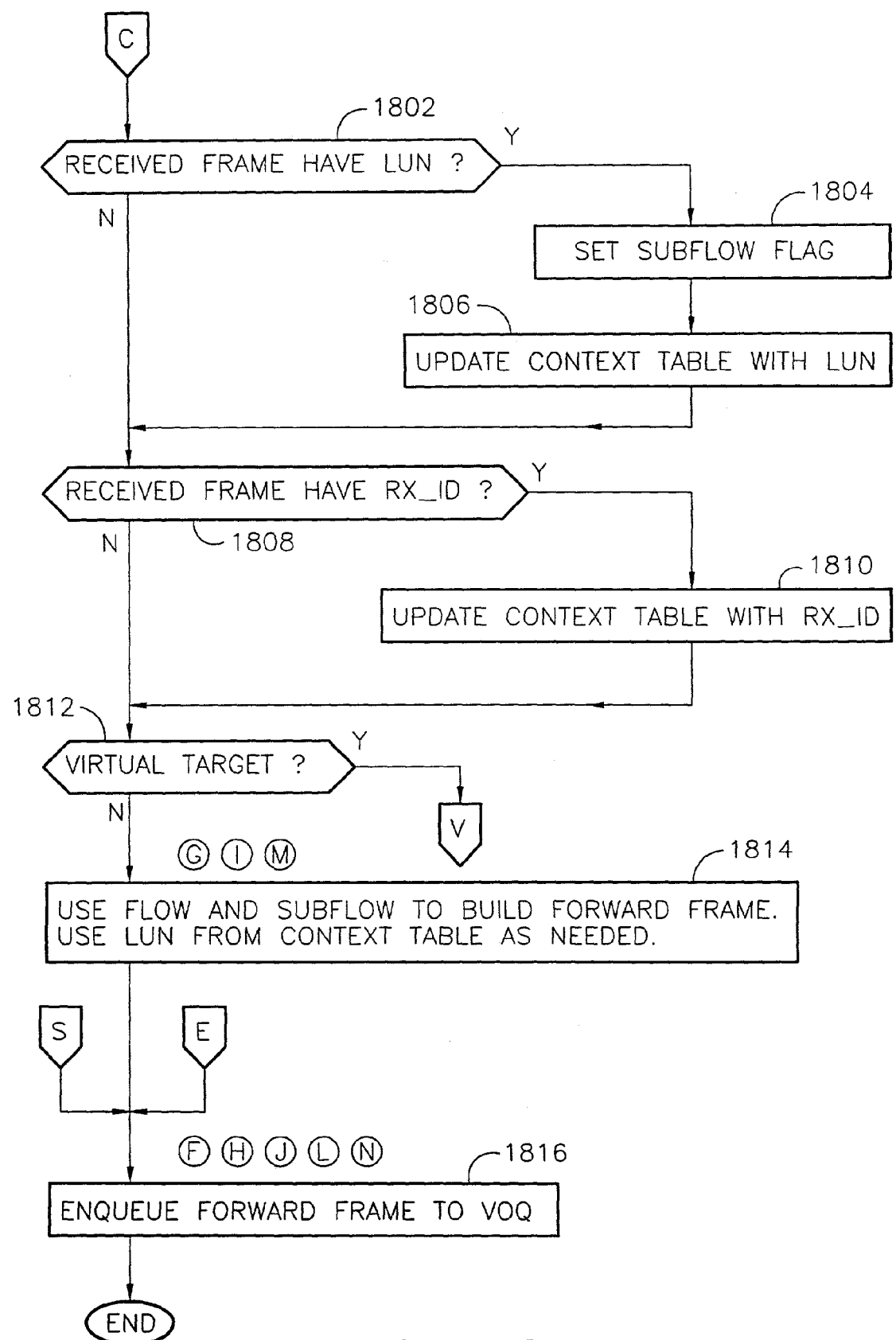
Figure 19:
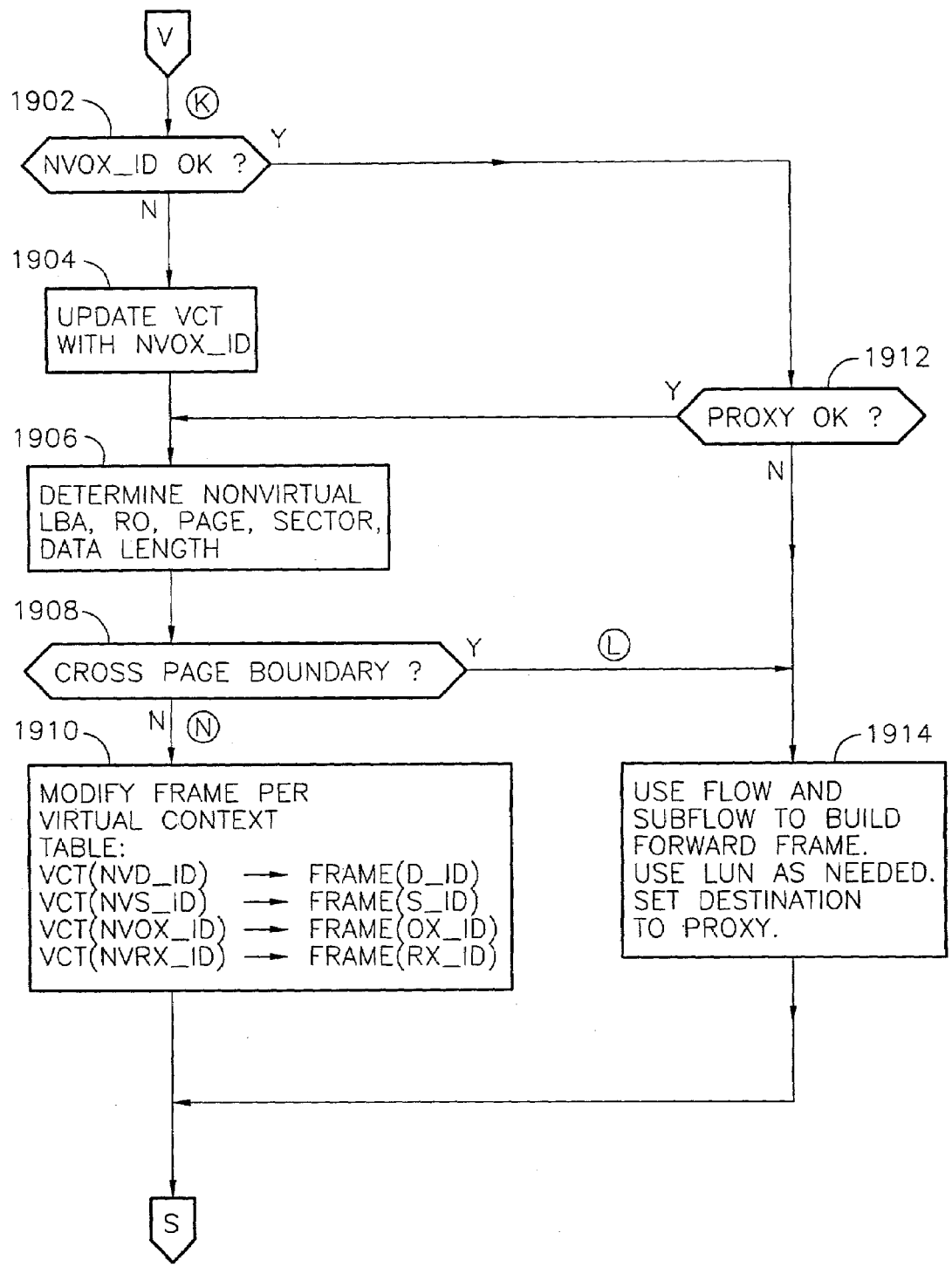
Figure 20:
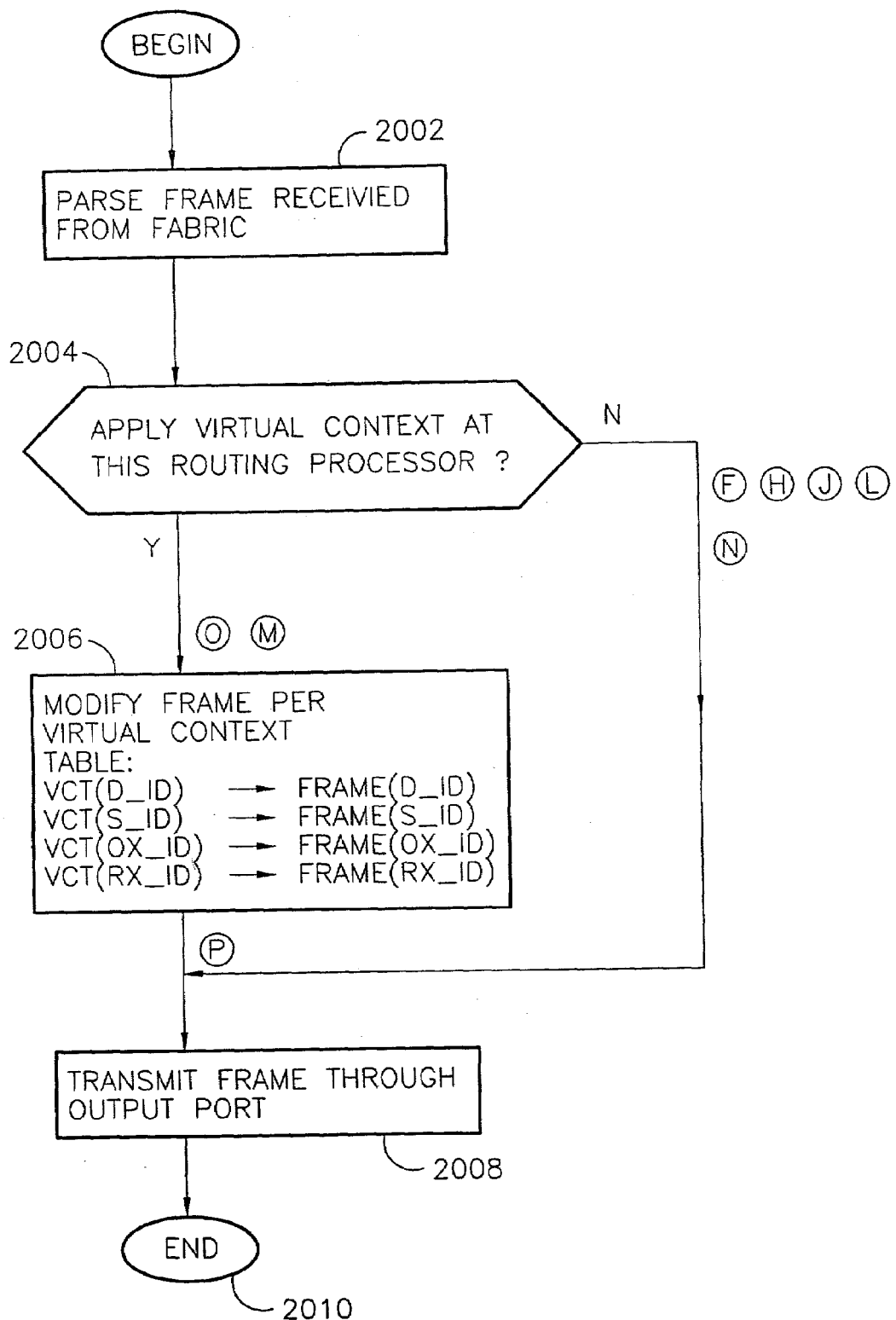

For example, a series of messages 1600 of FIG. 16 includes a non-R/W I/O series 1601, a nonvirtual R/W I/O series 1621, and a virtual R/W I/O series 1631. In the non-R/W I/O series 1601, an initiator (e.g., a nonvirtual member of network 101) 1660 sends at time 1602 a message "A" (e.g., a link service request). Message "A" is addressed to a router (e.g., router 102) using a well known address. Routing processor 1661 (e.g., having a port logic circuit 1186 for a suitable number of ports, a memory circuit 1162, supervisor bus 1164, and route bus 1166) cooperates with supervising processor 1160 as described for link service requests in Table 23, e.g., sending message "B" at time 1604. When a link service request affects the state of a proxy or requires information maintained by a managing process as discussed above, supervising processor 1160 sends at time 1606 a message "C" to managing processor and receives a response message "D" at time 1608. Messages "C" and "D" are conveyed by LAN 210, 1132. Supervising processor 1160, on receipt of status or information from message "D", sends at time 1612 message "E" to routing processor 1661. A response message "F" is sent by routing processor 1661 to initiator 1660 at time 1612. Messages "B" and "E" are conveyed by bus 212, 1164. Messages "A" and "F" are conveyed through fabric 213, 1170, 1402.

In the nonvirtual R/W I/O series 1621, no messages refer to virtual ports. Initiator 1660 sends at time 1622 a message "G" (e.g., an FCP_CMND to read data from a target) that is routed by routing processor 1661 as message "H", sent at time 1624 to target 1662. Target 1662 responds by sending at time 1626 message "I" that is routed by routing processor 1661 as message "J" sent at time 1628 to initiator 1660. When the non-R/W I/O is one sequence of a transaction, the remaining sequences (e.g., FCP_XFER_RDYs, FCP_DATAs, and FCP_RSP, and acknowledgement frames) would follow the same processing path G–H–I–J. As discussed above, architecture 200 of router 201 accomplishes nonblocking routing for, inter alia, nonvirtual R/W I/Os.

In the virtual R/W I/O series 1631, messages "K" and "P" refer to a virtual target as opposed to nonvirtual target 1662. Initiator 1660 at time 1632 sends message "K" addressed to a virtual target (not shown). If routing processor 1661 routes the virtual R/W I/O message "K" at time 1634 to a proxy process 418 using a well known address of the proxy process, the proxy process (hosted by managing processor 1112) at time 1636 responds with message "M". Routing processor 1661 may route message "M" as message "N" addressed from the proxy process to a nonvirtual target 1662 at time 1638. A message "M" may be addressed to initiator 1660 and so be routed back to initiator 1660 as message "P". On the other hand, when no assistance from proxy process is desired, routing processor 1661 may respond to message "K" by sending message "N" addressed to target 1662 from the proxy process. When target 1662 responds, it sends at time 1640 message "O" addressed to the proxy process. Routing processor 1661 intercepts message "O" and, without communication with the proxy process, routes message "P" at time 1642 to initiator 1660 addressed from the virtual target (not shown). Messages "L" and "M" are nonvirtual messages 1635 referring to a suitable proxy. In the message series "K", "N", "O", "P" messages "K" and "P" are virtual and messages "N" and "O" are nonvirtual. The routing of messages "N" and "O" differs from the routing of messages "H" and "I" in that the identifiers for source and destination in messages "G", "H", "I", and "J" are unchanged during routing. By contrast, the routing of messages "N" and "O" may include saving the source and destination identifiers from message "K" and rewriting the source and destination identifiers to form so-called redirected messages "N" and "O" 1339 by routing processor 1661.

A proxy process of managing processor 1112 acting as an initiator may send 1629 a message (e.g., discovery, port log-in, process log-in, or SCSI commands such as RESET_LUNS) to target 1662 (not shown). Target 1662 may reply to such a command by sending a message (not shown) to the proxy (e.g., completion status).

Processing for representative control frames and data frames is described in Table 21. FCP_CMND, FCP_XFER_RDY, and FCP_DATA sequences represent data transactions having data frames. Other sequences in the table represent control transactions having control frames.

TABLE 21

| Received Frame | Description of processing |
|---|---|
| FLOGI (fabric login as defined, e.g., in FC-FS) | Routing processor: identify frame (1702, 1704) as a link service request; identify frame to supervising processor (1706). Supervising processor: reply to FLOGI and accept service parameters according to requested class of service. |
| RTIN (request network topology information as defined, e.g., in FC-FS) | Routing processor: identify frame as link service request, identify frame to supervising processor. Supervising processor: reply to RTIN with identifiers of members and resources. |
| PLOGI (port login as defined, e.g., in FC-FS) | Routing processor: for nonvirtual destination identifier, identify the frame as a link service request, identify frame to supervising processor. For virtual destination identifier, pass the frame to the corresponding proxy in the managing processor. Supervising processor: prepare suitable reply. Managing processor: initiate second PLOGI to nonvirtual target that corresponds to the virtual target indicated in the first PLOGI; respond to the first PLOGI in accordance with the result of the second PLOGI from the nonvirtual target. |
| PRLI (process login as defined, e.g., in FCP-2, not handled herein as a link service request) | Routing processor: for nonvirtual destination identifier route as conventional traffic to the non-virtual destination. For virtual destination identifier, pass the frame to the corresponding proxy in the managing processor. Managing processor: perform operations analogous to PLOGI, discussed above. |
| REPORT LUNS (request for logical unit numbers as defined, e.g., in SPC-3) | Routing processor: for nonvirtual destination identifier route as conventional traffic to the non-virtual destination. For virtual destination identifier, pass the frame to the corresponding proxy in the managing processor. Managing processor: reply with list of LUNs (nonvirtual and virtual) that are permitted to be accessed by this requester; may defer storing LUNs in CAM 1306 until first access attempt is recognized. |
| FCP_CMND (FCP header with SCSI command CDB in payload as defined, e.g., in FCP-2) | Routing processor: for nonvirtual destination identifier route as conventional traffic to the non-virtual destination. For virtual destination port identier, prepare a forward frame to route in place of the received frame as described, inter alia, in FIGS. 17–20. |
| FCP_XFER_RDY (transfer ready sequence with response data as defined, e.g., in FCP-2 and SBC-2) | Supervising processor: no involvement except for initialization and updating maps. Managing processor: no involvement except for initialization and updating maps. |
| FCP_DATA (data transfer for a read or write of the target as defined, e.g., in FCP-2 and SBC-2) | |

A routing processor provides nonblocking routing of R/W I/Os. A method 1700 of FIGS. 17–20 provides routing of non-R/W I/Os, nonvirtual R/W I/Os and virtual R/W I/Os as follows. Routing processor 1161 recognizes a frame received from network 101 via a frame I/O port as R/W I/O (1702, 1704); recalls a flow lookup from CAM 1306 (1716) and if incomplete or missing (1718), gets a supervising processor 1160 to analyze the frame, specify a route, or drop it (1706–1714). If the subflow flag is set in the result of the flow query (1720), the routing processor does subflow lookup (1722) from CAM 1306 and reports errors to the supervising processor (1724, 1706–1714) possibly stalling frame in submitter queue awaiting CAM update by supervising processor.

Context and virtual context may be stored locally (e.g., in memory accessible to a frame processor of a port logic circuit, for example, on the same substrate as the frame processor), stored in multi-purpose memory 1304, or stored in RAM 1312. When context table 626 and/or virtual context table 630 are stored locally, a frame received at a first port logic circuit is tested as to whether the routing processor has access to context (1726); and, if context is stored elsewhere, the flow and subflow results are used to build a forward frame (1728), marked for further processing by another routing processor (1730) where the context is available. Otherwise, it is determined whether the context is already available; and, if not, a new entry for context table 626 and/or virtual context table 630 is created (1734) in the local memory or where context is stored. Assuming that local context and/or virtual context is available, such may be revised with information parsed from the received frame. If a LUN is specified in the CDB (e.g., FCP_CMND frame) (1802), the routing processor sets subflow flag (1804) and stores modified results (1806) in context table 626. If the frame includes an RX_ID value from the target (e.g., an ACC to FCP_CMND, or an FCP_XFER_RDY) or proxy for the virtual target (1808), the routing processor stores (1810) the RX_ID in context table (626). If there were CAM hits on the lookups, the routing processor tests the CAM result flag for virtual (1812). If nonvirtual, an update of the context table with tuple of S_ID, D_ID, LUN, LBA, OX_ID, and RX_ID is accomplished. The flow, subflow, and context table are then used to route frame (1814) to an output queue (1816) per S_ID, router output port identifier and traffic class.

If the received frame is determined to be virtual (e.g., either the flow or subflow lookups indicate the D_ID is associated with a virtual target) and if no suitable nonvirtual transaction identifier (1902) is in virtual context table 630, the routing processor creates a tuple of virtual transaction identifier (e.g., original OX_ID from initiator 1660) and new nonvirtual transaction identifier (NVOX_ID) and stores (1904) as a new entry in virtual context table 630. If there is no known proxy (1912), the routing processor routes the frame to managing processor 1112 for analyzing, revising tables, or dropping the frame. If the frame is virtual and NVOX_ID is available from virtual context table 630 (e.g., from FCP_XFER_RDY, or ACK), then OX_ID, LBA and RO may be used as an index to the virtual context, page, and sector tables to determine nonvirtual destination (NVD_ID), nonvirtual initiator (e.g., a proxy NVS_ID), nonvirtual NVLBA, and whether the amount of data to be read or written will cross a page boundary (1906, 1908). If no page boundary will be crossed, the routing processor modifies (1910) the frame to appear as sent from a proxy in a nonvirtual transaction to the nonvirtual target.

For both nonvirtual and virtual processing, after a frame for the fabric has been prepared (1738, 1910, or 1914), the routing processor enqueues the frame (1816) to the fabric and later this or another routing processor receives the frame from the fabric (2002). If the frame received from the fabric is marked (1730, 2004) as requiring application of virtual context at this routing processor, context and virtual context tables are used to modify (2006) the frame to appear to have been sent by the virtual target to the initiator; else the frame is simply passed (2008) to the output port as for a message ("F", "H", "J", "L", "N" or "P") directed to a nonvirtual destination.

A supervising processor cooperates with a routing processor as follows. If the supervising processor is passed a frame for which a CAM hit is missing, the supervising processor uses the S_ID to get an ACL. If a value for D_ID and LUN are in the ACL (possibly not in CAM because no prior access attempt), the supervising processor updates the appropriate CAM with LUN; else, if D_ID and LUN are not in the ACL, the supervising processor drops the frame, implementing security of access.

A fabric according to various aspects of the present invention provides full-mesh communication using point to point connections. Nodes of the fabric are joined by point to point connections in a topology similar in some ways to a star and in a physical arrangement similar in some ways to a ring. Each node provides a slice of the fabric circuitry. According to various aspects of the present invention, a slice capable of being inserted into a ring coupling a maximum number of frame I/O ports may be used in a ring of any lesser number of frame I/O ports, eliminating costly development of fabric circuits for different routers each having a different number of frame I/O ports. The fabric may include a printed circuit layout that need not be revised for production of various models of routers having support for different numbers of frame I/O ports. An implementation of a fabric according to various aspects of the present invention may have any maximum number of nodes limited perhaps by transmission delays and timing differences that may develop between nodes. Each segment of a fabric may comprise a point to point transmission line driven by one transmitter and terminated by one receiver with suitable impedance matching termination circuitry.

Figure 21:
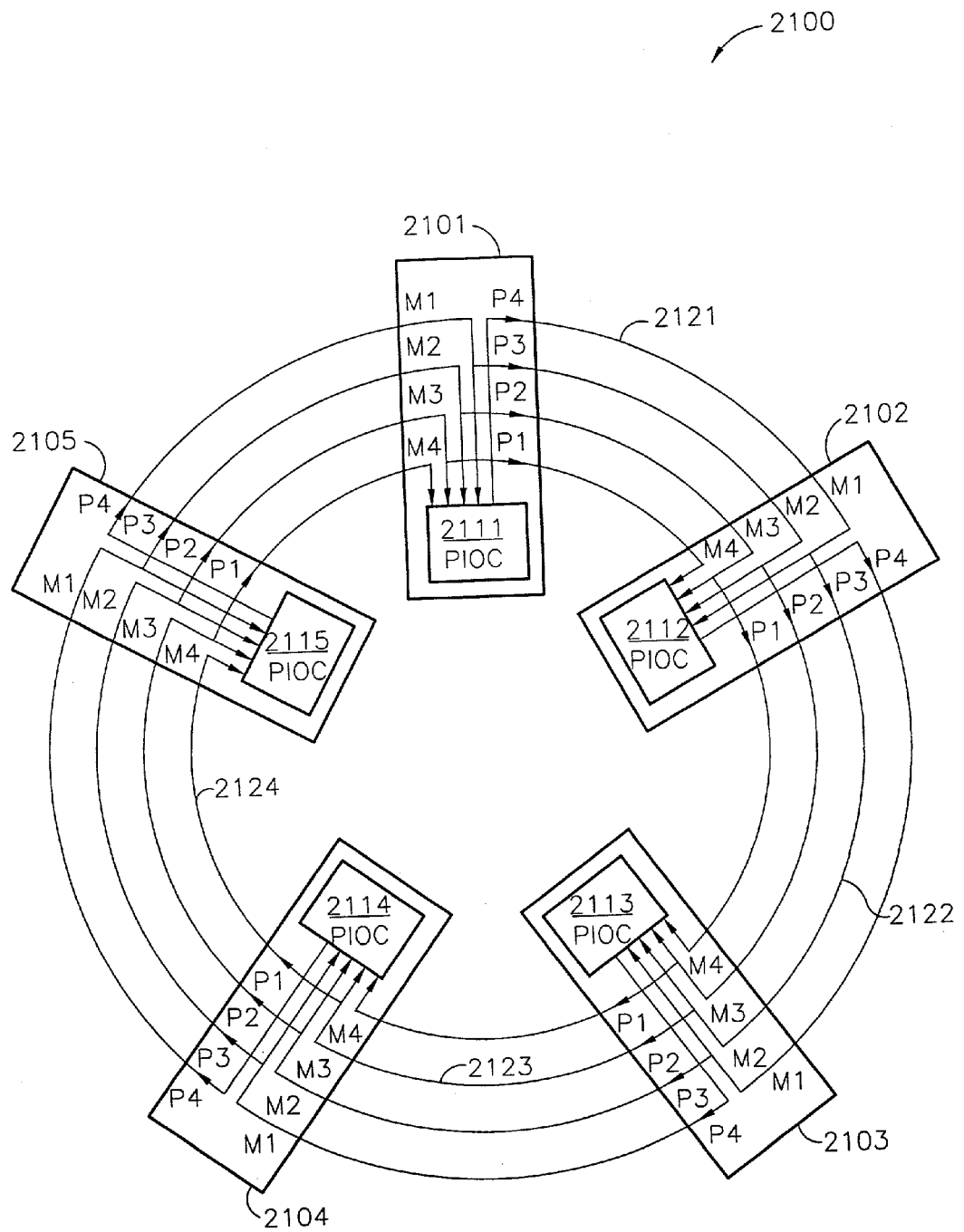
FIG. 21 is a functional block diagram of a fabric having five fabric nodes according to various aspects of the present invention.

In one implementation of fabric 213, for example fabric 2100 of FIG. 21, full mesh communication is provided between all ports at each of five fabric nodes. Fabric 2100 includes five circuits 2101–2105 (one at each fabric node), each having port I/O circuitry (PIOC) that may be similar in some respects to circuitry described above with reference to port logic circuit 1186. Each PIOC provides an interface to a plurality of frame I/O ports (not shown). In the simplified functional block diagram representation of fabric 2100 in FIG. 21, a frame sent to the fabric from PIOC 2111 at node 2101 is coupled to node 2102 by segment 2121, is then coupled to node 2103 by segment 2122, is then coupled to node 2104 by segment 2123, and is then coupled to node 2105 by segment 2124. In other words, fabric circuits (e.g., 2001) in cooperation with coupling segments (e.g., 2021) at each node: (a) couple signals received from the node one position counter-clockwise (e.g., M1 for minus one) to the path that extends three segments clockwise (e.g., P3 for plus three); (b) couple signals received from the node two positions counter-clockwise (M2) to the path that extends two segments clockwise (P2); (c) couple signals received from the node three positions counter-clockwise (M3) to the path that extends one segment clockwise (P1); (d) couple signals received from the node four positions counter-clockwise (M4) to the PIOC at this node; and (e) couple the signal provided by the PIOC at this node to the path that extends three four segments clockwise (P4).

Figure 22:
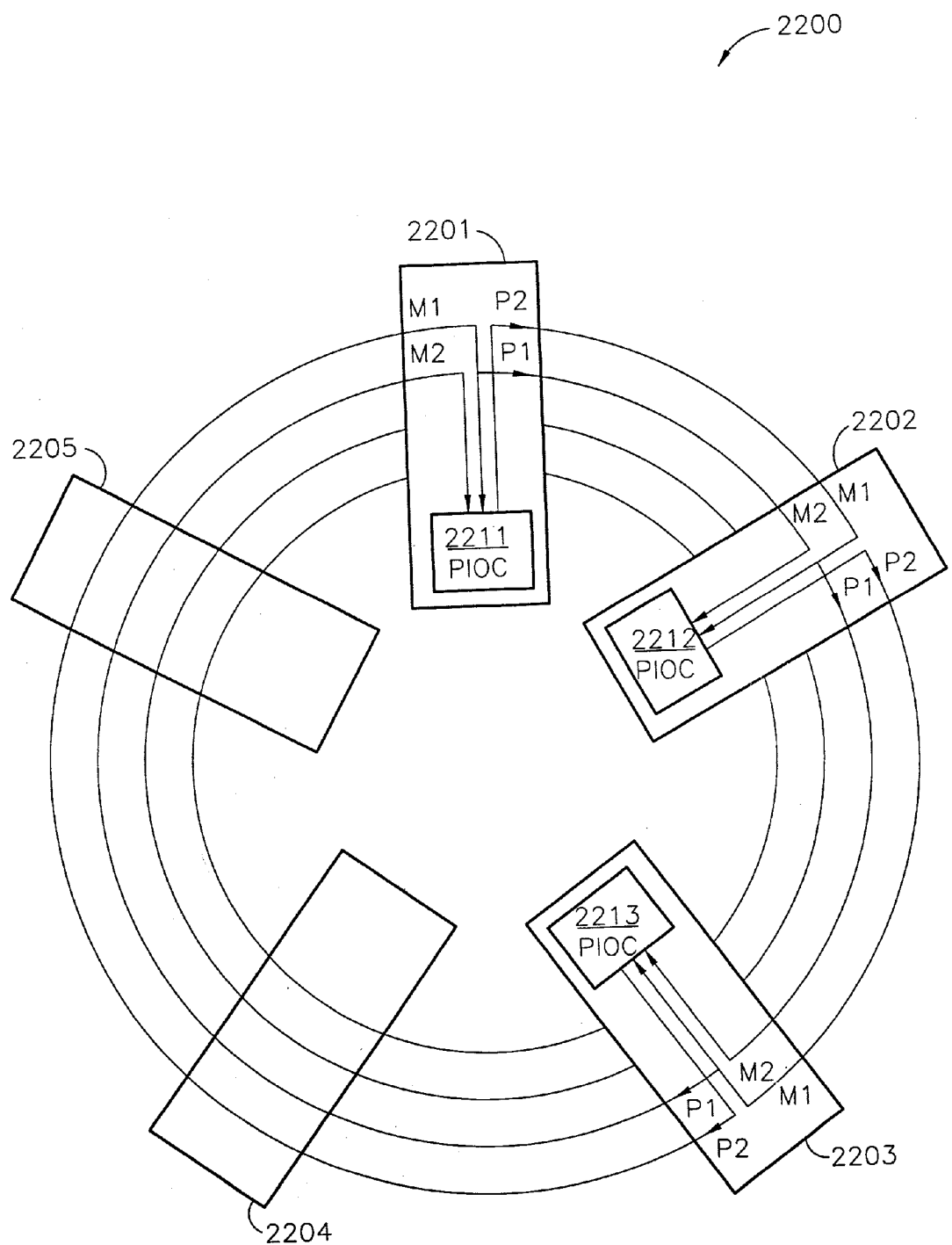
FIG. 22 is a functional block diagram of the fabric of FIG. 20 implemented with three fabric nodes.

In another implementation of fabric 213, fabric 2200 of FIG. 22 provides full mesh communication between all ports at each of three fabric nodes. Fabric 2200 includes three circuits 2201–2203 (one at each fabric node), each having port I/O circuitry (PIOC) that may be identical to the PIOCs discussed with reference to FIG. 21 except that fabric circuits (e.g., 2201) in cooperation with coupling segments at each node: (a) couple signals received from the node one position counter-clockwise (M1) to the path that extends one segment clockwise (P1); (b) couple signals received from the node two positions counter-clockwise (M2) to the PIOC at this node; and (c) couple the signal provided by the PIOC at this node to the path that extends two segments clockwise (P2).

The same physical printed circuit layout (not shown) may be used for both fabrics 2100 and 2200. In fabric 2200 segments may be connected by fillers 2204–2205 across unfilled fabric node positions. Fabric 2200 may be upgraded to fabric 2100 by replacing fillers 2204–2205 with fabric circuits 2104–2105 and reconfiguring switching functions of fabric circuits 2201–2203 to provide the functions of fabric circuits 2101–2103. Such reconfiguration is preferably accomplished by inputs to each fabric circuit; each fabric circuit being of an identical type having internal configuration functions responsive to these inputs.

Figure 14:
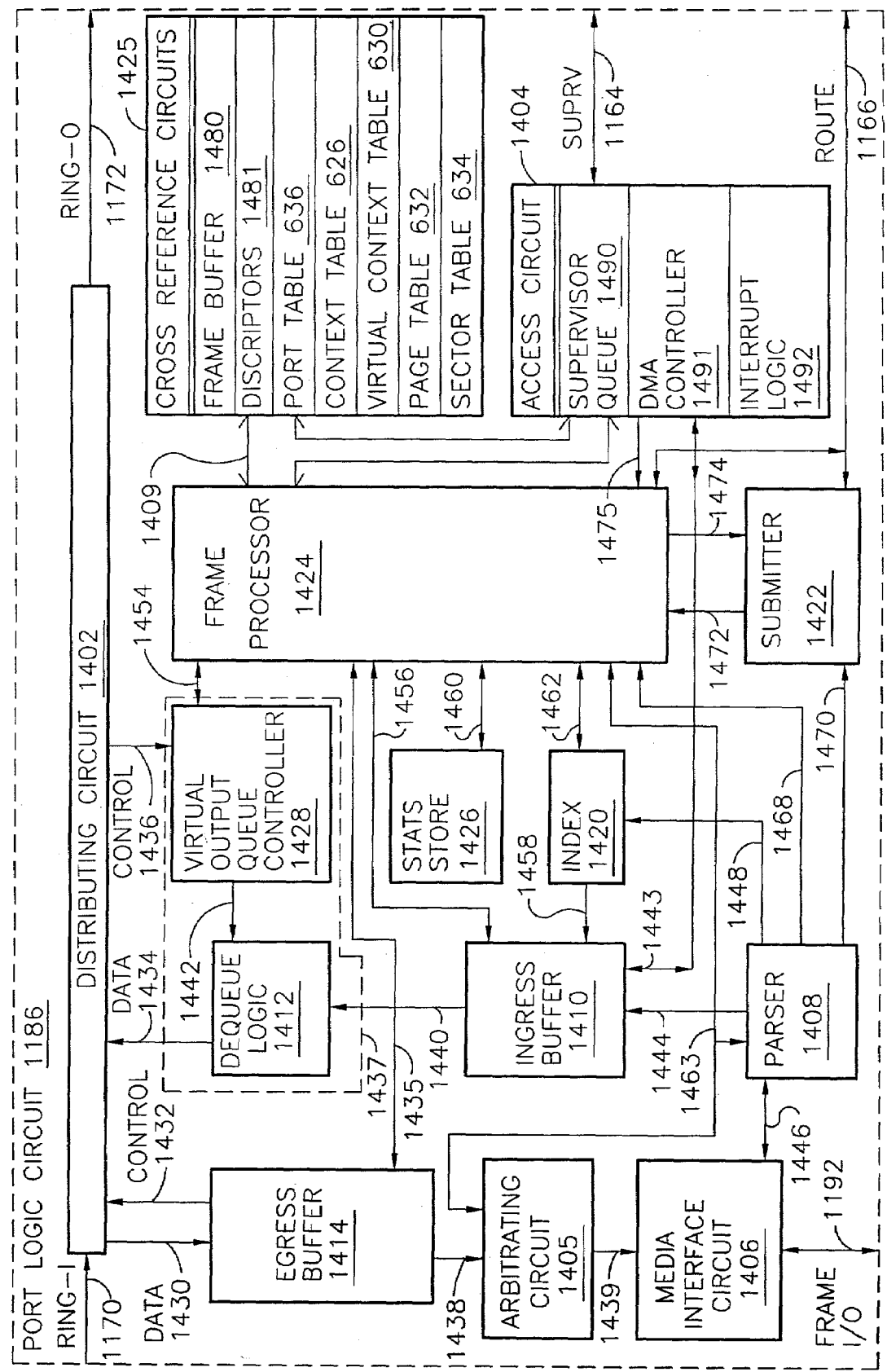
FIG. 14 is a functional block diagram of the port logic circuit of FIG. 11.
Figure 23:
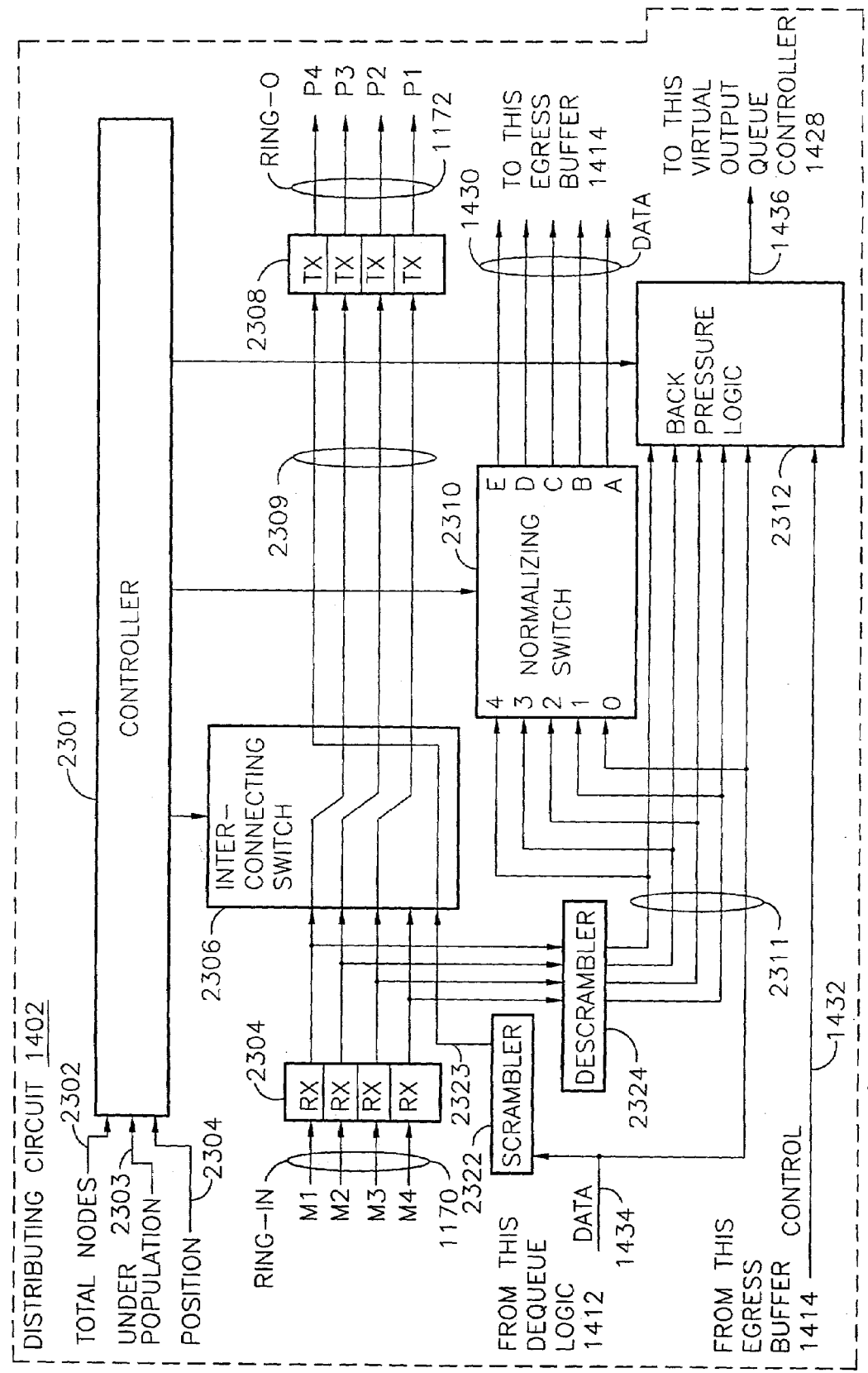
FIG. 23 is a functional block diagram of the distributing circuit of FIG. 11.

Router 102 may include a fabric of the type described above with reference to FIGS. 21 and 22. In one implementation, each port logic circuit (e.g., 1186, 1188) includes a distributing circuit having segment signal switching functions as discussed above. For example, distributing circuit 1402 of FIGS. 14 and 23, provides suitable coupling through port logic circuit 1186 so that port logic circuit 1186 may be installed in any position of a fabric having any number of populated positions (up to a predetermined maximum number of positions). Distribution circuit 1402 includes controller 2301, receivers 2305, interconnecting switch 2306, transmitters 2308, scrambler 2322, descrambler 2324, normalizing switch 2310, and back pressure logic 2312.

A controller establishes a switch configuration and segment termination suitable for a particular under population and total number of fabric nodes of the fabric. For example, controller 2301 (comprising combinatorial logic) receives TOTAL_NODES signal 2302, UNDER_POPULATION signal 2303 that indicates the number of positions counter clockwise of the present position that are occupied by fillers, and POSITION signal 2304 that identifies which fabric node is associated with this distributing circuit (e.g., 2101, or 2102, or 2103, and so on). TOTAL_NODES, UNDER_POPULATION, and POSITION signals may each comprise a binary value having several known logic levels each provided through a printed circuit board trace, a jumper, a manual switch, or an EPM or other memory output. A controller 2301 that receives a non-zero value from the UNDER_POPULATION signal 2303 directs receivers 2305 to use a suitable impedance matching termination circuit. Controller 2302 operates interconnecting switch 2306, operates normalizing switch 2310, and configures back pressure logic 2312 in accordance with TOTAL_NODES signal 2302 and POSITION signal 2304. Typically, operations of switches 2306 and 2310 and configuration of backpressure logic 2312 occur during initialization of router 102 and initial settings are not changed during normal operation of router 102.

Receivers 2305 include an independent receiver circuit for each segment. In other words, each segment is a point to point conductor with no branches so as to simplify high frequency tuning of the conductor and matching of one transmitter to one receiver for each segment. Receivers receive signals RING-IN 1170 from segments of the fabric. For example, signal M1 is received by a first receiver, signal M2 by a second receiver, and so on. Each receiver may include a phase locked loop for clock and data recovery from the signal received from a segment. Demodulation of the signal received from a segment may include any conventional demodulation technique (e.g., demodulation of phase shift keying).

Prior to transmission, data to be transmitted may be scrambled so that energy conveyed by the transmitted signal is distributed among frequencies and/or frequency bands. By distributing transmitted energy, noise immunity of the fabric is improved and noise radiation by the fabric is easier to control. Scrambler 2322 provides a scrambled signal on line 2323 in accordance with DATA signal 1434 from dequeue logic 1412 associated with this distributing circuit 1402.

Interconnecting switch 2306 couples each selected signal of signals 2307 to a suitable transmitter 2308. Signal selection and coupling is accomplished in accordance with control signals received from controller 2301 and in accordance with the fabric architecture discussed above with reference to FIGS. 21 and 22. Signals on lines 2307 include demodulated signals from receivers 2305 and the scrambled data signal on line 2323. Switch output signals on lines 2309 are coupled to transmitters 2308.

Transmitters 2308 provide signals RING-O 1172 to segments of the fabric. Transmitters 2308 include an independent transmitter circuit for each segment. For example, signal M1 of signal group 2309 is transmitted by a first transmitter to provide signal P3 for a first segment, signal M2 of signal group 2309 is transmitted by a second transmitter to provide signal P2 for a second segment, and so on. Each transmitter may include clock generation circuitry to train the corresponding receiver. Modulation of the signal to be transmitted on a segment may include any conventional modulation technique (e.g., phase shift keying).

Descrambler 2324 accepts signals from receivers 2305 and independently descrambles each signal to provide corresponding clear data signals on lines 2311. Signals on lines 2311 are provided to normalizing switch 2310 and to back pressure logic 2312.

Normalizing switch 2310 provides outputs A–E on data lines 1430 to egress buffer 1414 associated with this distributing circuit 1402. The routing of signals received on normalizing switch inputs 0–4 to output A–E is directed by controller 2301 so that adjustments (if any) in routing methods performed by frame processor 1424 to account for differences in the installed position of port logic circuit 1186 or the total number of fabric nodes are simplified.

Back pressure logic 2312 receives clear data signals 2311 that may include back pressure messages transmitted in response to status of an egress buffer coupled to any fabric node (e.g., from any port logic circuit of routing circuits 1150–1152). In addition, back pressure logic may receive CONTROL signals on line 1432 from egress buffer 1414 associated with this distributing circuit 1402. Back pressure logic 2312 provides CONTROL signals on line 1436 to VOQC 1428 associated with this distributing circuit 1402. VOQC responds to CONTROL signals on line 1436 to stall or restart any one or more virtual output queues. In one implementation VOQC 1428 receives an independent signal from back pressure logic 2312 corresponding to each virtual output queue (e.g., one VOQ per tuple of physical output port, physical input port, and traffic class). By forming the egress buffer and distributing circuit on one substrate, a large number of wired signal connections (e.g., for "go" signals from each buffer queue to back pressure logic) are economically and reliably implemented.

In one implementation, each segment is served by a plurality of channels (e.g., four to achieve a data rate up to four times the data rate of one channel). The arbitration circuit for a virtual output queue may place a frame onto a selected one of the four channels. In an alternate implementation each channel has an arbitration circuit that serves virtual output queues (e.g., seventy two queues being four traffic classes times eighteen source port identifiers). A particular virtual output queue may be served by more than one arbitration circuit.

Routing information may be stored local to one routing processor and messages to be routed using that information may be routed from other routing processors via the fabric to that routing processor. For example, router 105 of FIG. 24 includes routing processors 2402 and 2404 each as discussed above with reference to routing processor 1161. Each processor has access to memory for a virtual context table not used by the other processor. Routing processor 2402 includes memory for virtual context table 2403; and, routing processor 2404 includes memory for virtual context table 2405. Virtual context tables (VCT) 2403 and 2405 may be stored in memory on the same integrated circuit substrate as the respective routing processor (e.g., an integrated circuit implementation of a port logic circuit) or may be stored in a memory circuit having areas reserved for access by each processor (e.g., portions of memory circuit 1162 as discussed above with reference to Table 12). Routing processors 2402 and 2404 route packets via fabric 2406 (e.g., as discussed above with reference to fabric 213) using a fabric frame that encloses the frame used on network 101. The enclosing fabric frame header may include a designation indicating one of the following: (type 1) the receiving routing processor is to perform no frame modification; (type 2) the receiving routing processor is to perform virtual to nonvirtual frame modification; or (type 3) the receiving routing processor is to perform nonvirtual to virtual frame modification. The frame modifications for types 2 and 3 above are performed in the egress buffer of the receiving processor before the frame is transmitted onto network 101.

Figure 24:
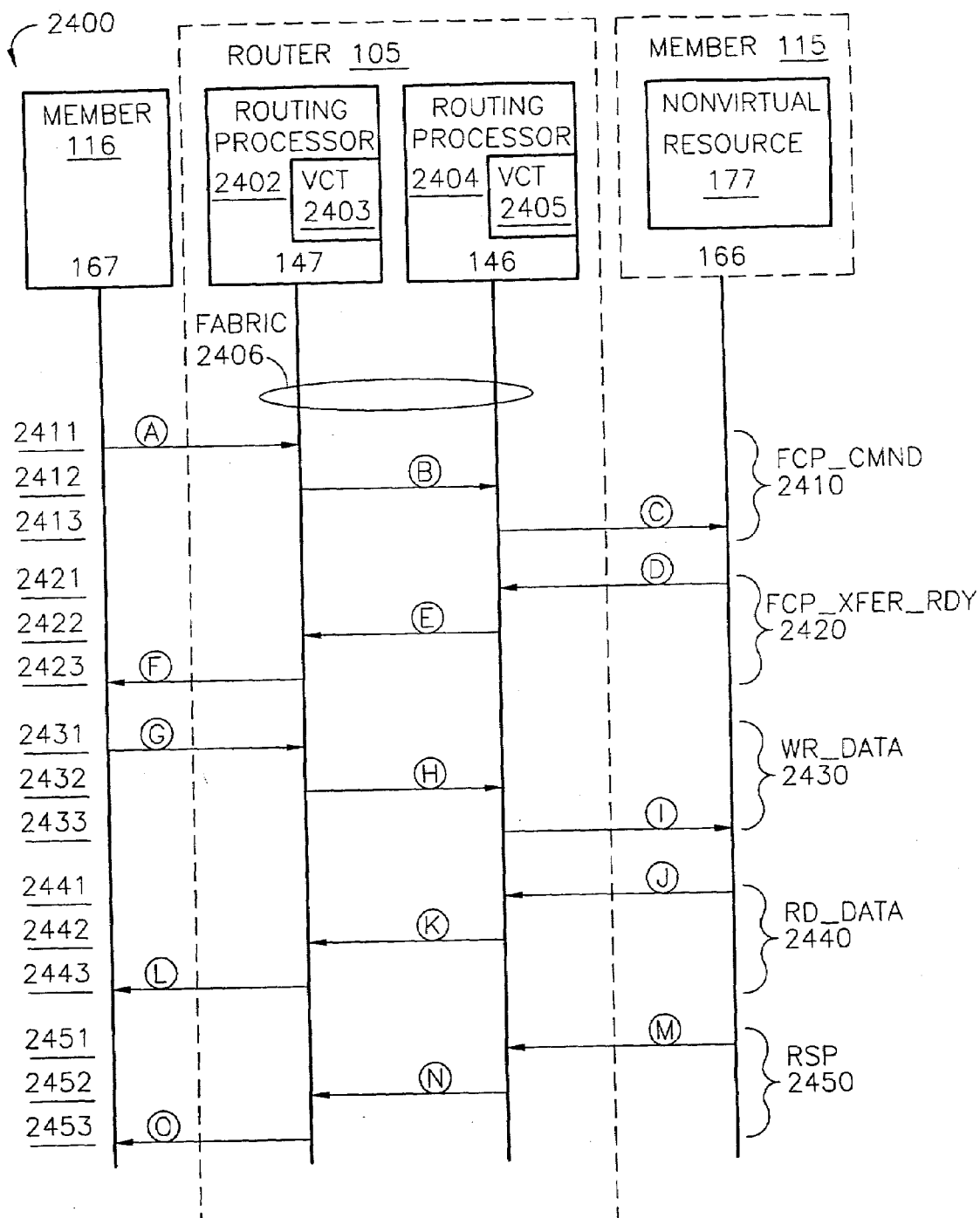
FIG. 24 is a message sequence diagram for operations performed by the system of FIG. 1.

Use of fabric frame headers as discussed above is described by a series of messages 2400 of FIG. 24 that includes routing of virtual R/W I/Os to nonvirtual R/W I/Os and vice versa as discussed above, for example, with reference to FIGS. 6–11, 13, 14, and 16–20. In message sequences 2400 member 116 reads and writes a portion of a virtual resource implemented as nonvirtual resource 177 or member 115 (all of FIG. 1). A transaction that includes an FCP_CMND sequence 2410, one or more pairs of FCP_XFER_RDY and RD_DATA sequences 2420 and 2440, and an FCP_RSP sequence 2450 accomplish a read transfer of data from nonvirtual resource 177 to member 116. A transaction that includes an FCP_CMND sequence 2410, one or more pairs of FCP_XFER_RDY and WR_DATA sequences 2420 and 2430, and an FCP_RSP sequence 2450 accomplish a write transfer of data from member 116 to nonvirtual resource 177. Messages "A" at time 2411, "F" at time 2423, "G" at time 2431, "L" at time 2443, and "O" at time 2453 convey no identity of the nonvirtual entity on which the read and write operations occur. Messages "C" at time 2413, "D" at time 2421, "I" at time 2433, "J" at time 2441, and "M" at time 2451 appear to the resource as nonvirtual network traffic with no indication (other than the network address of the proxy) that the initiator is a proxy as opposed to a nonvirtual member. Field values used in routing messages of series 2400 are described in Tables 22 and 23.

When VCT 2403 has routing information for the transaction identified in message "A" at time 2411 as a virtual transaction from member 116 in FCP_CMND 2410, messages "B" at time 2412 and "H" at time 2432 are marked by routing processor 2402 as type 1. Routing processor 2404 in its egress buffer (e.g., 1414) removes the marking and passes the payload as messages "C" at time 2413 and "I" at time 2433.

When VCT 2405 does not have routing information for the virtual transaction of message "A", routing processor 2404 marks messages "E" at time 2422, "K" at time 2442, and "N" at time 2452 as type 3 (e.g., 1730). In response, routing processor 2402 performs modification to each frame in its egress buffer (e.g., 1910).

In an alternate configuration wherein VCT 2405 has routing information for the transaction identified in message "A" at time 2411 as a virtual transaction and VCT 2403 does not, routing processor 2402 marks messages "B" and "H" as type 2 and receives messages "E", "k", and "N" marked by routing processor 2404 as type 1. The processing burden of performing frame modifications in ingress and egress buffers may be allocated by an administrating process (e.g., managing virtualization). Allocation and reallocated may be accomplished as discussed above with reference to flags returned from a virtual flow lookup in Table 11.

TABLE 22

| | | Field Values | | | | |
|---|---|---|---|---|---|---|
| Message | Frame Type | S_ID | D_ID | OX_ID | RX_ID | LUN and LBA |
| A | FCP_CMND | I | VM | IX | — | VR |
| B | | VM | T | PX | — | NR |
| C | | VM | T | PX | — | NR |
| D | FCP_XFER_ | T | VM | PX | TX | — |
| B | RDY | T | VM | PX | TX | — |
| F | | VM | I | IX | PX | — |
| G | WR_DATA | I | VM | IX | PX | — |
| H | | VM | T | PX | TX | — |
| I | | VM | T | PX | TX | — |
| J | RD_DATA | T | VM | PX | TX | — |
| K | | T | VM | PX | TX | — |
| L | | VM | I | IX | PX | — |
| M | FCP_RSP | T | VM | PX | TX | — |
| N | | T | VM | PX | TX | — |
| O | | VM | I | IX | PX | — |

TABLE 23

| Field Value | Meaning | Assigned By | Description |
|---|---|---|---|
| I | Initiator network port identifier | Manufacturer of the Initiator system | WWPN for initiator (e.g., 167). |
| T | Target network port identifier | Administration | WWPN for target (e.g., 115). |
| VM | Virtual member identifier | Administration when designing zones | A network port identifier intercepted by a router operating according to various aspects of the present invention. For example, an address in a range of addresses that are reserved for designating the router. |
| VR | Virtual resource identifier | Administration when designing zones | A resource logical unit identifier (e.g., LUN) that has no corresponding physical entity. |
| NR | Nonvirtual resource identifier | Manufacturer of the Target system | WWPN for actual LUN (e.g., 177). |

TABLE 23-continued

| Field Value | Meaning | Assigned By | Description |
|---|---|---|---|
| IX | Initiator's transaction identifier | Initiator | Any transaction identifier not currently associated with this initiator. |
| TX | Target's exchange identifier | Target | Any transaction identifier not currently associated with this target. |
| PX | Proxy's exchange identifier | Routing processor | Any transaction identifier not currently associated with this proxy. |

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A router for routing frames in a network, the router comprising:

a first means for processing processor that performs a proxy process for a virtual member of the network, the proxy process responsive to a frame addressed in accordance with a first network address, the virtual member corresponding to at least a portion of a nonvirtual member of the network, the nonvirtual member responsive to frames addressed in accordance with a second network address; and a second means for processing that performs a routing process that routes frames addressed in accordance with the first network address and of a first type to the proxy process; that in response to receiving frames in accordance with the first network address and of a second type, provides a corresponding frame revised in accordance with the second network address; and that routes the revised frames to the nonvirtual member in accordance with the second network address;

wherein the second means for processing comprises: means for storing; means for parsing; a plurality of queues that receive data enqueued by the means for parsing; and means for submitting that submits data from a queue of the plurality to the means for storing to provide a result; wherein the second means for processing determines the second network address in accordance with the result;

wherein the means for storing provides a first result in accordance with first data submitted from the means for parsing, the first data comprising a flag; and the means for storing provides the result in accordance with second data, the second data submitted from the second means for processing, in accordance with the flag; and wherein the result comprises at least one of a resource identifier, a network address of a proxy, and logical unit number.

2. The router of claim 1 wherein the first means for processing stores indicia of the second network address in a routing table in the means for storing.

3. The router of claim 2 wherein the first means for processing further stores indicia of a resource identifier in association with the indicia of the second network address, and the second means for processing routes frames in accordance with the indicia of the resource identifier.

4. The router of claim 3 wherein the resource identifier comprises a logical unit number.

5. The router of claim 1 further comprising: a third means for processing that provides first data to the first means for processing; wherein:

the first means for processing further provides the first data to the second means for processing; and the second means for processing distinguishes the first type from the second type in accordance with the first data.

6. The router of claim 5 wherein the first data further comprises routing information.

* * * * *